(12) United States Patent
Haraguchi et al.

(10) Patent No.: US 10,227,457 B2
(45) Date of Patent: Mar. 12, 2019

(54) FLUORINE-CONTAINING HIGHLY BRANCHED POLYMER AND RESIN COMPOSITION CONTAINING THE SAME

(71) Applicant: NISSAN CHEMICAL INDUSTRIES, LTD., Tokyo (JP)

(72) Inventors: Masayuki Haraguchi, Funabashi (JP); Motonobu Matsuyama, Funabashi (JP); Masaaki Ozawa, Funabashi (JP); Misao Miyamoto, Tokyo (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/161,905

(22) Filed: May 23, 2016

(65) Prior Publication Data

US 2016/0264739 A1    Sep. 15, 2016

Related U.S. Application Data

(62) Division of application No. 13/322,722, filed as application No. PCT/JP2010/059192 on May 31, 2010, now Pat. No. 9,410,006.

(30) Foreign Application Priority Data

May 29, 2009   (JP) ................................ 2009-131608
Feb. 16, 2010  (JP) ................................ 2010-031879
(Continued)

(51) Int. Cl.
  *B32B 3/00*    (2006.01)
  *C08F 8/18*    (2006.01)
  (Continued)

(52) U.S. Cl.
  CPC .................. *C08J 3/28* (2013.01); *C08F 2/48* (2013.01); *C08F 220/18* (2013.01);
  (Continued)

(58) Field of Classification Search
  CPC .... C09D 133/16; C08J 2433/16; C08L 33/16; C08F 222/1006; C08F 212/36
  See application file for complete search history.

(56) References Cited

U.S. PATENT DOCUMENTS 5,235,013 A * 8/1993 Ito .................... C08F 210/14
                                                    526/245
9,410,006 B2 * 8/2016 Haraguchi ............... C08F 2/48
(Continued)

FOREIGN PATENT DOCUMENTS

JP    01-289817      * 11/1989
JP    01-289817 A    11/1989
(Continued)

OTHER PUBLICATIONS

Sato et al., "Initiator-Fragment Incorporation Radical Polymerization of Divinylbenzene in the Presence of Glyoxylic Oxime Ether: Formation of Soluble Hyperbranched Polymer," Journal of Polymer Science: Part A: Polymer Chemistry, 2003, pp. 3038-3047, vol. 41.
(Continued)

*Primary Examiner* — Mark S Kaucher
*Assistant Examiner* — Henry Hu
(74) *Attorney, Agent, or Firm* — Oliff PLC

(57) ABSTRACT

It is an object to provide a compound that can provide a molded article and a coating film excellent not only in solubility in an organic solvent, but also in miscibility with/dispersibility in a matrix resin, causing no aggregation in a matrix resin, excellent in surface modification property, and having high transparency. A fluorine-containing highly branched polymer obtained by polymerizing a monomer A having two or more radical polymerizable double bonds in the molecule thereof with a monomer B having a fluoroalkyl group and at least one radical polymerizable double bond in the molecule thereof in the presence of a polymerization initiator C in a content of 5% by mol or more and 200% by
(Continued)

mol or less, based on the total molar amount of the monomer A and the monomer B; and a resin composition comprising the polymer.

15 Claims, 38 Drawing Sheets

(30) Foreign Application Priority Data

Mar. 10, 2010 (JP) ................................ 2010-053392
Apr. 30, 2010 (JP) ................................ 2010-105541

(51) Int. Cl.
| | |
|---|---|
| C08J 3/28 | (2006.01) |
| C08F 2/48 | (2006.01) |
| C08F 220/18 | (2006.01) |
| C08F 220/22 | (2006.01) |
| C08L 67/04 | (2006.01) |
| C09D 4/06 | (2006.01) |
| C09D 133/16 | (2006.01) |
| C08L 33/12 | (2006.01) |
| C08L 35/02 | (2006.01) |
| C09D 135/02 | (2006.01) |
| C08F 220/24 | (2006.01) |
| C08L 33/16 | (2006.01) |
| C08F 212/36 | (2006.01) |
| C08F 222/10 | (2006.01) |

(52) U.S. Cl.
CPC ............ *C08F 220/22* (2013.01); *C08L 33/12* (2013.01); *C08L 35/02* (2013.01); *C08L 67/04* (2013.01); *C09D 4/06* (2013.01); *C09D 133/16* (2013.01); *C09D 135/02* (2013.01); *C08F 212/36* (2013.01); *C08F 220/24* (2013.01); *C08F 222/1006* (2013.01); *C08J 2335/02* (2013.01); *C08J 2433/16* (2013.01); *C08L 33/16* (2013.01); *Y10T 428/24802* (2015.01)

(56) References Cited

U.S. PATENT DOCUMENTS

| | | | |
|---|---|---|---|
| 2007/0032615 A1* | 2/2007 | Sato ..................... | C08F 2/06 526/82 |
| 2007/0286993 A1* | 12/2007 | Radcliffe ................ | G02B 1/111 428/212 |

FOREIGN PATENT DOCUMENTS

| | | | |
|---|---|---|---|
| JP | 05-105727 | * | 4/1993 |
| JP | 11-228633 A | | 8/1999 |
| JP | 2002-332275 A | | 11/2002 |
| JP | 2005-307059 A | | 11/2005 |
| JP | 4009700 B2 | | 11/2007 |
| JP | 2008-533228 A | | 8/2008 |
| JP | 2008-202006 A | | 9/2008 |
| JP | 2009-007488 A | | 1/2009 |
| JP | 2009-114248 | * | 5/2009 |
| JP | 2009-114248 A | | 5/2009 |
| WO | 2004/024787 A1 | | 3/2004 |
| WO | WO-2004/024787 A1 | * | 3/2004 |
| WO | 2006/114958 A1 | | 11/2006 |
| WO | WO-2006/114958 A1 | * | 11/2006 |
| WO | 2010/137724 A1 | | 12/2010 |
| WO | 2013/157496 A1 | | 10/2013 |
| WO | WO-2013/157496 A1 | * | 10/2013 |

OTHER PUBLICATIONS

Sato et al., "Initiator-Fragment Incorporation Radical Copolymerization of Divinylbenzene and N-Isopropylacrylamide with Dimethyl 2,2'-Azobisisobutyrate: Formation of Soluble Hyperbranched Polymer Nanoparticle," Journal of Polymer Science: Part A: Polymer Chemistry, 2004, pp. 1609-1617, vol. 42.
Hirano et al., "Synthesis and Characterization of Soluble Hyperbranched Polymer via Initiator-Fragment Incorporation Radical Polymerization of Divinylbenzene with Dimethyl 2,2'-Azobisisobutyrate," Journal of Applied Polymer Science, 2006, pp. 664-670, vol. 100.
Sato et al., "Hyperbranched Acrylate Copolymer via Initiator-Fragment Incorporation Radical Copolymerization of Divinylbenzene and Ethyl Acrylate: Synthesis, Characterization, Hydrolysis, Dye-Solubilization, Ag Particle-Stabilization, and Porous Film Formation," Macromolecular Materials and Engineering, 2006, pp. 162-172, vol. 291.
Sato et al., "Initiator-Fragment Incorporation Radical Polymerization of Ethylene Glycol Dimethacrylate in the Presence of 1,1-Diphenylethylene: Synthesis and Characterization of Soluble Hyperbranched Polymer Nanoparticles," Polymer International, 2004, pp. 1503-1511, vol. 53.
Hirano et al.,"Formation of Soluble Hyperbranched Polymer Nanoparticles by Initiator-Fragment Incorporation Radical Polymerization of Ethylene Glycol Dimethacrylate," Macromolecular Chemistry and Physics, 2005, pp. 860-868, vol. 206.
Sato et al., "Initiator-Fragment Incorporation Radical Copolymerization of Diallyl Phthalate: Kinetics, Formation of Hyperbranched Polymer, and Iridescent Porous Film Thereof," Journal of Applied Polymer Science, 2006, pp. 408-415, vol. 102.
Sato et al., "Initiator-Fragment Incorporation Radical Copolymerization of Vinyl Acetate and 1,2-Polybutadiene as Multivinyl Monomer," Journal of Polymer Science: Part A: Polymer Chemistry, 2006, pp. 2328-2337, vol. 44.
Sato et al., "Formation of a Soluble Hyperbranched Polymer via Initiator-Fragment Incorporation Radical Copolymerization of Divinyl Adipate and Isobutyl Vinyl Ether," Polymer International, 2004, pp. 1138-1144, vol. 53.
Translation of International Search Report dated Aug. 24, 2010 issued in International Patent Application No. PCT/JP2010/059192.

* cited by examiner

[FIG. 1]
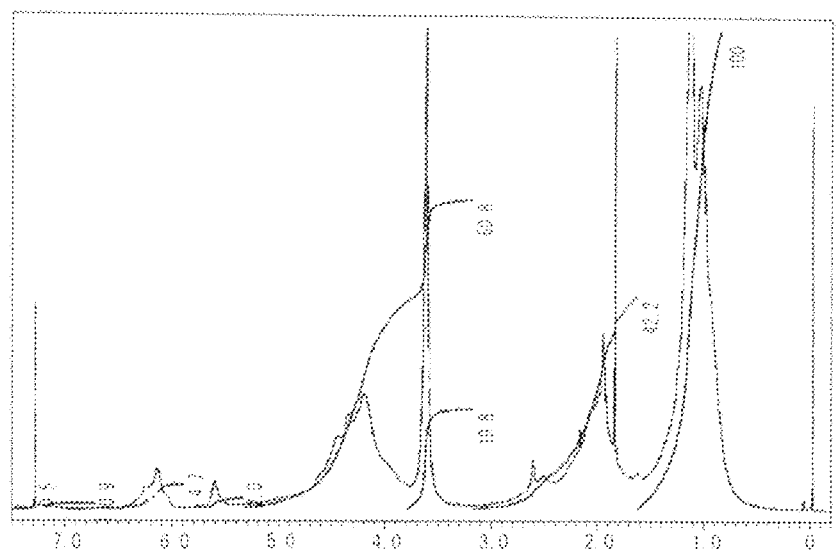
[FIG. 2]
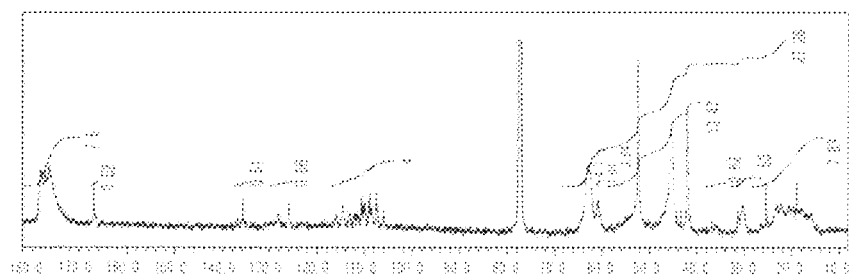

[FIG. 3]
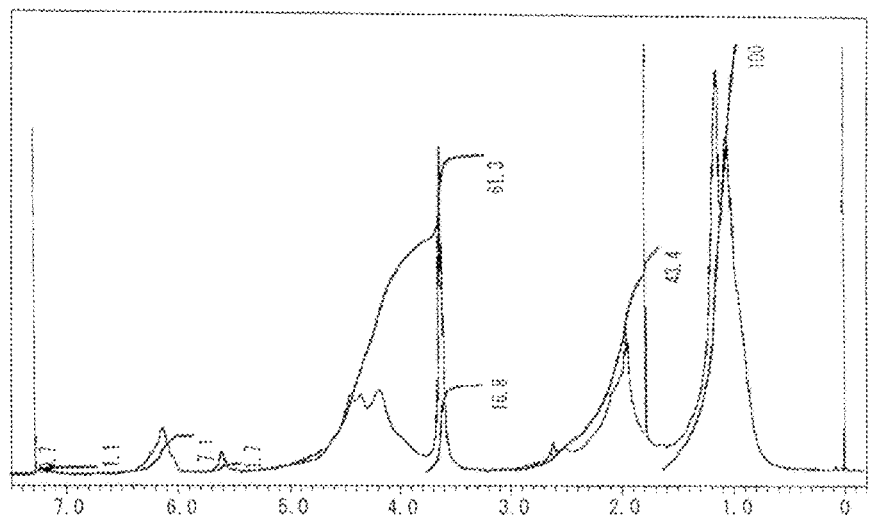
[FIG. 4]
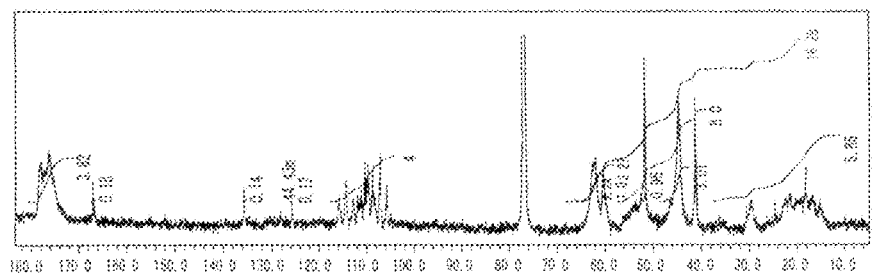

[FIG. 5]
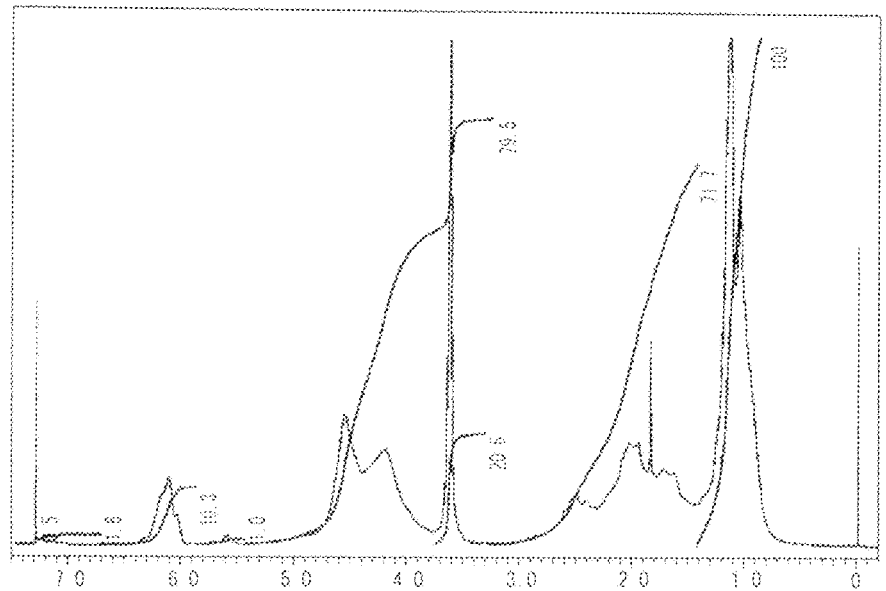
[FIG. 6]
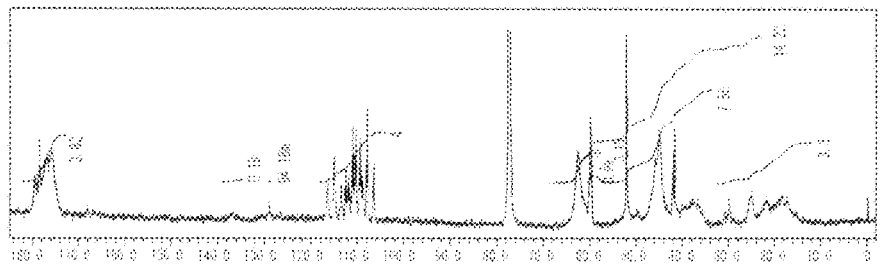
[FIG. 7]
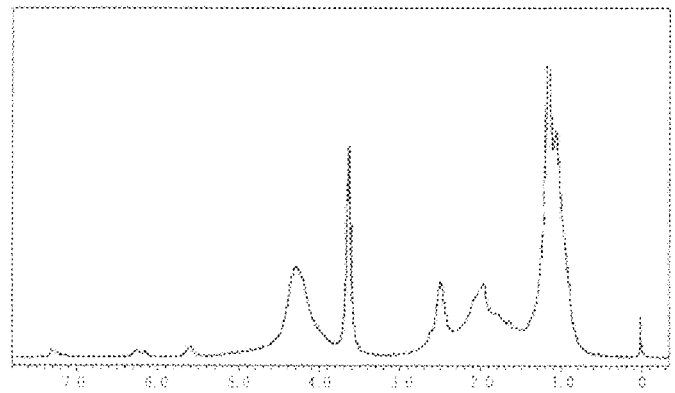

[FIG. 8]
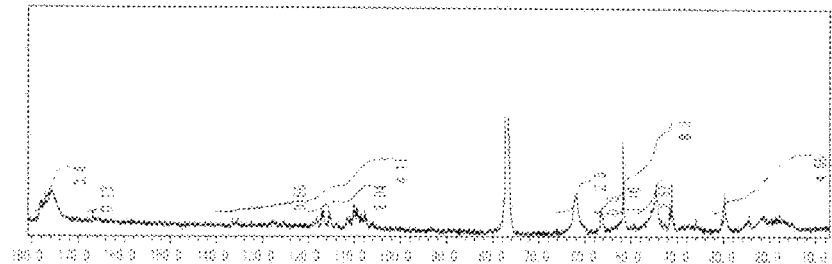
[FIG. 9]
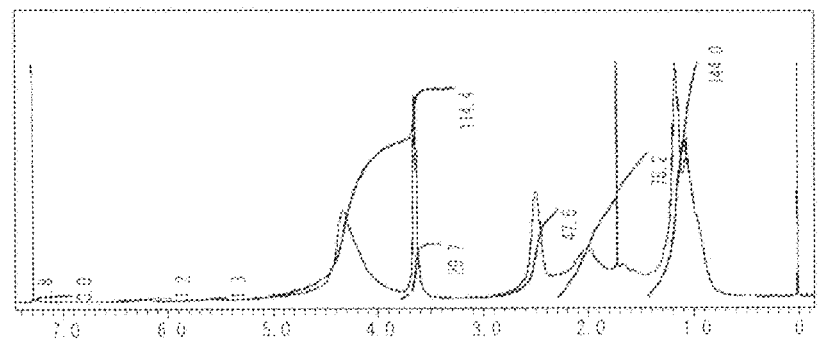
[FIG. 10]
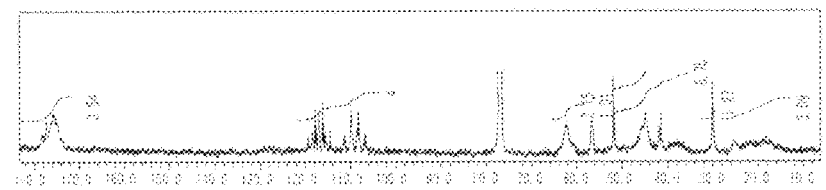

[FIG. 11]
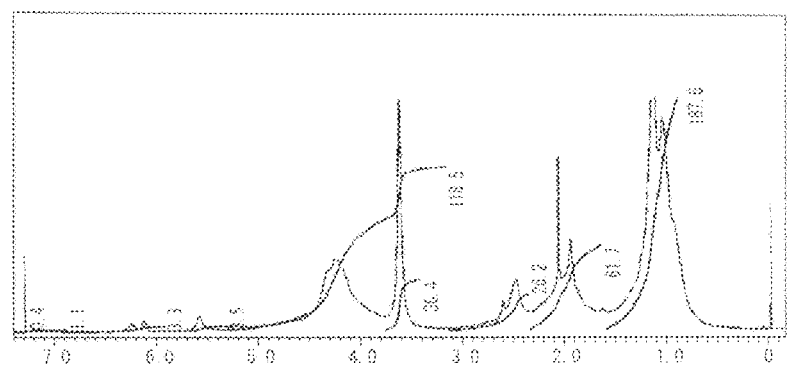
[FIG. 12]
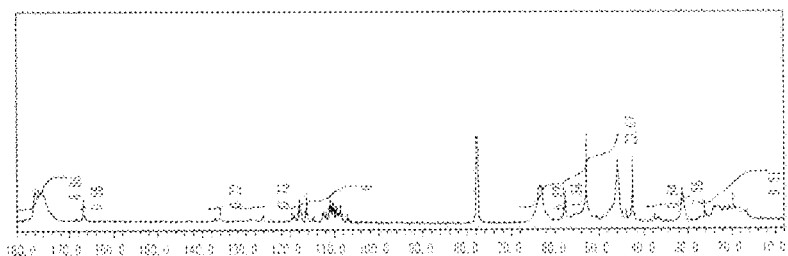
[FIG. 13]
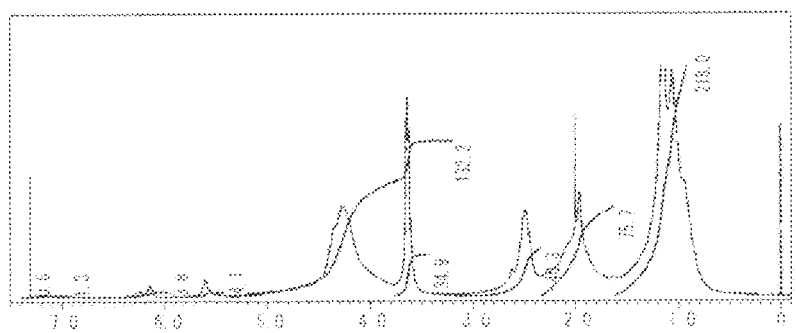

[FIG. 14]
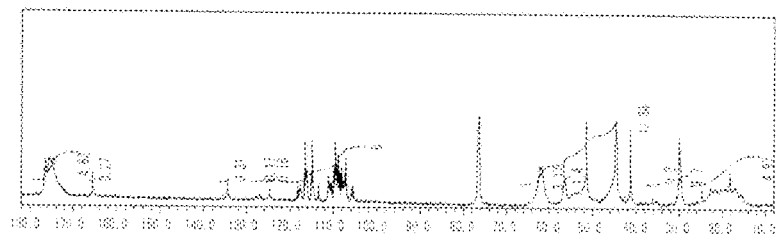
[FIG. 15]
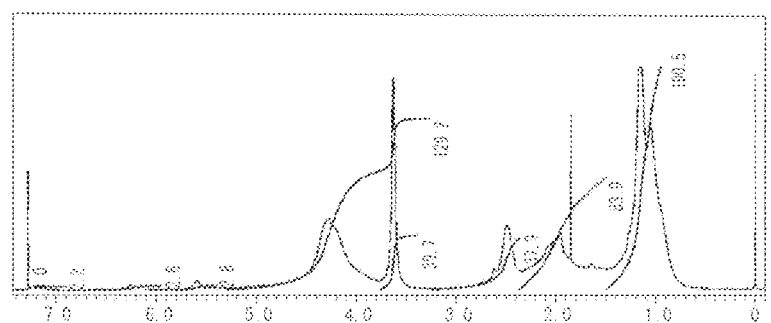
[FIG. 16]
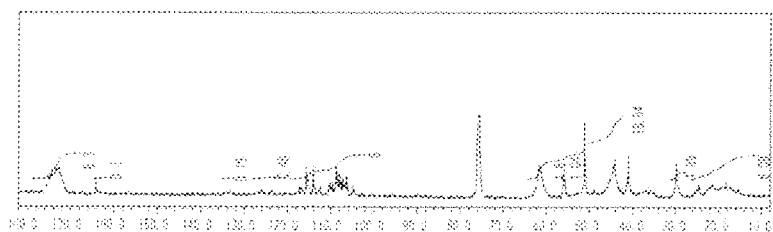

[FIG. 17]
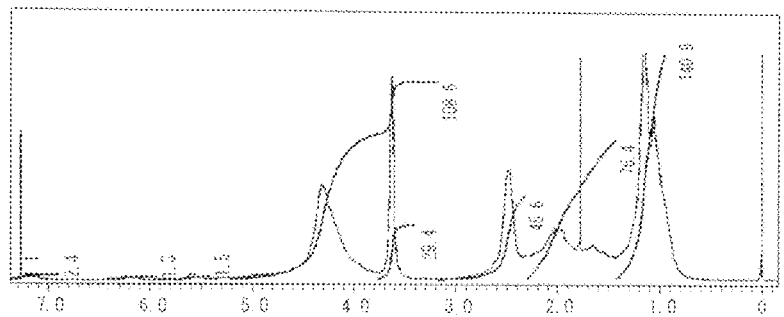
[FIG. 18]
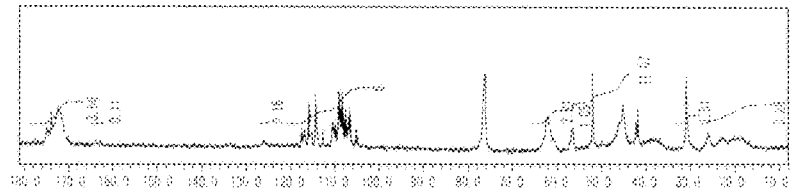
[FIG. 19]
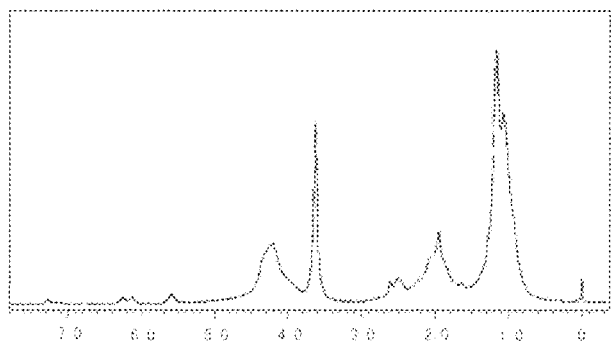

[FIG. 20]
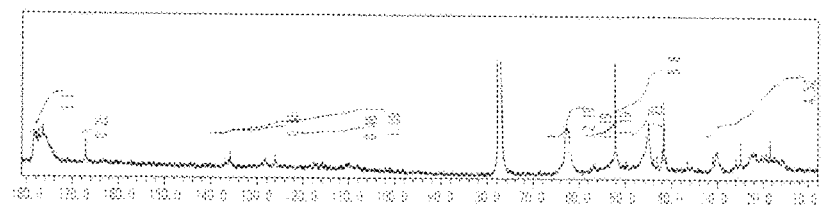
[FIG. 21]
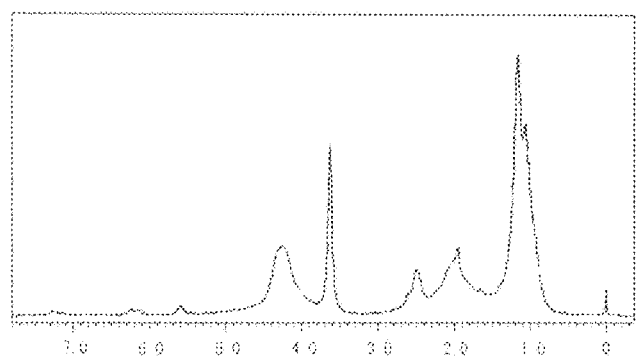
[FIG. 22]
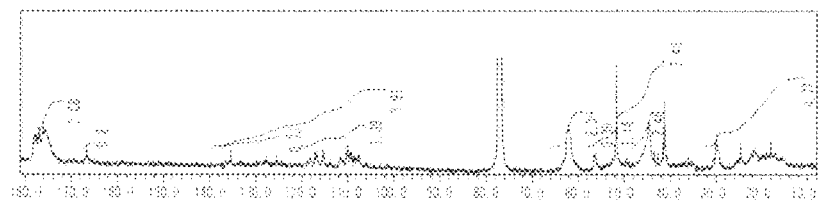

[FIG. 23]
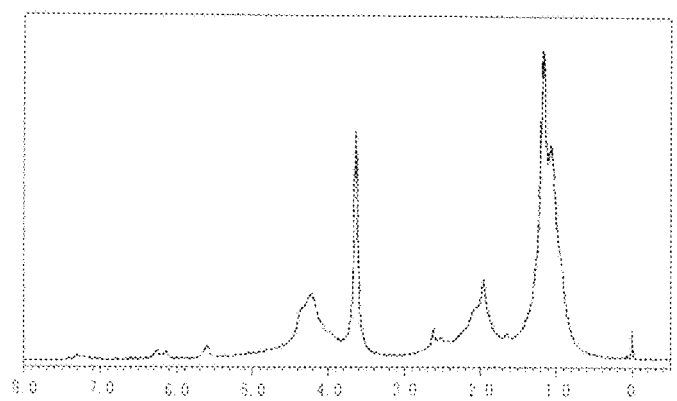
[FIG. 24]
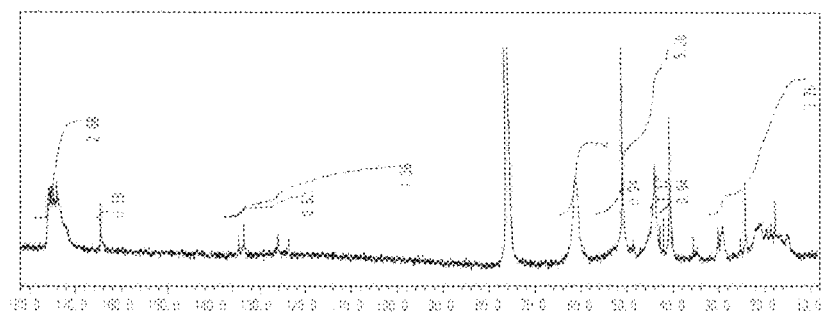

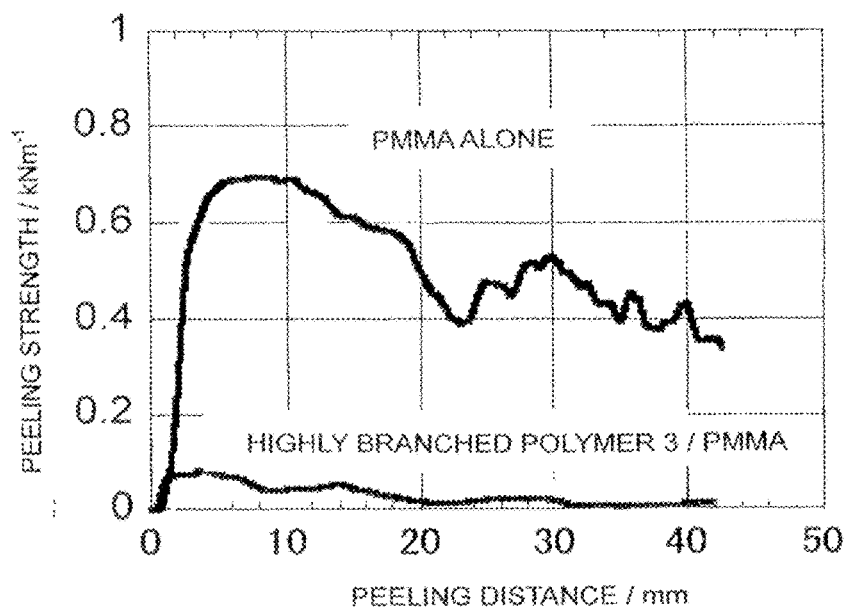
[FIG. 25]

[FIG. 26]
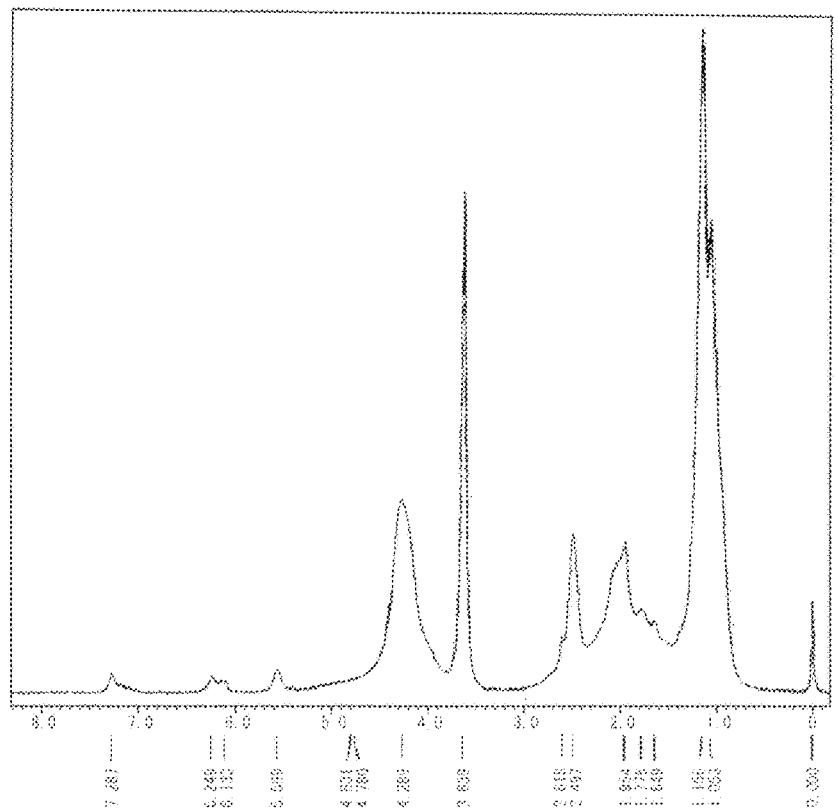
[FIG. 27]
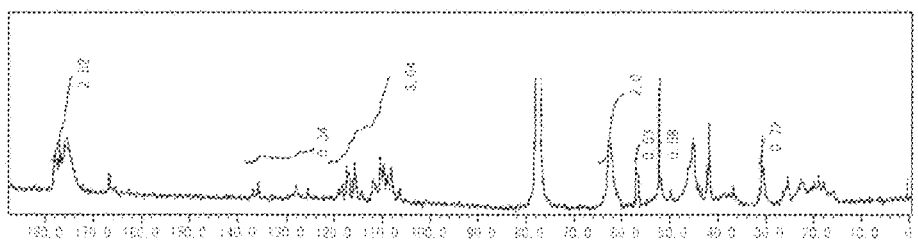

[FIG. 28]
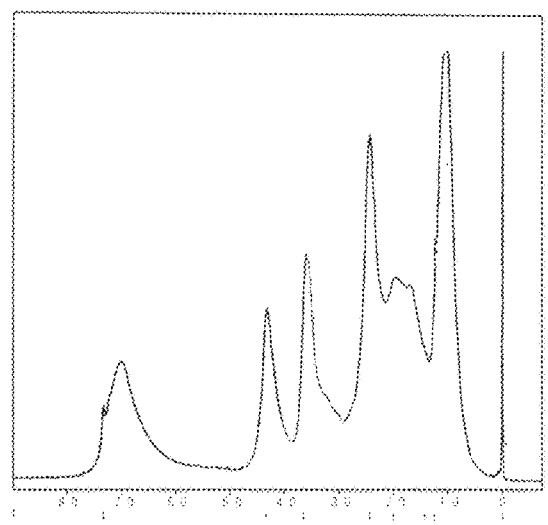
[FIG. 29]
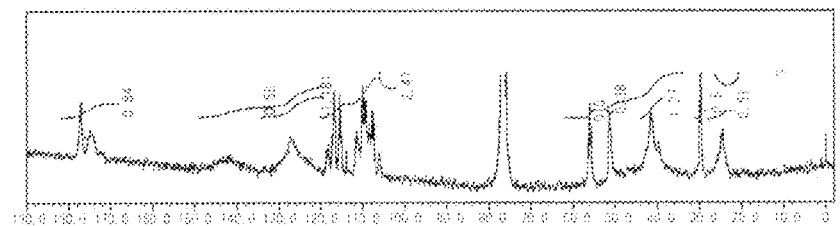

[FIG. 30]
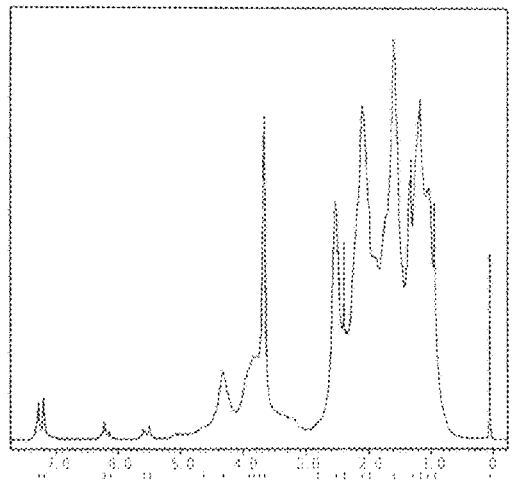
[FIG. 31]
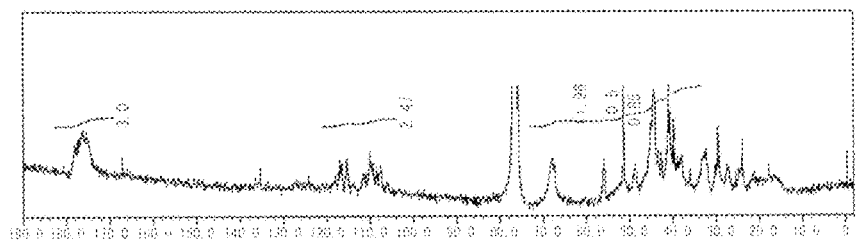
[FIG. 32]
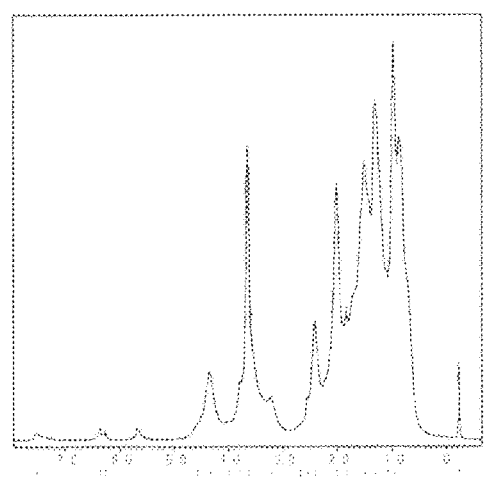

[FIG. 33]
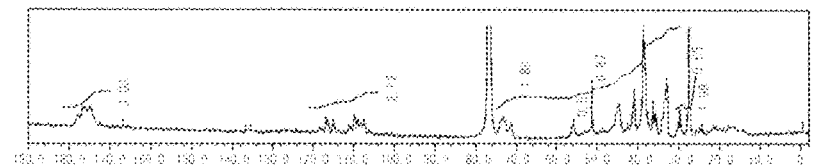
[FIG. 34]
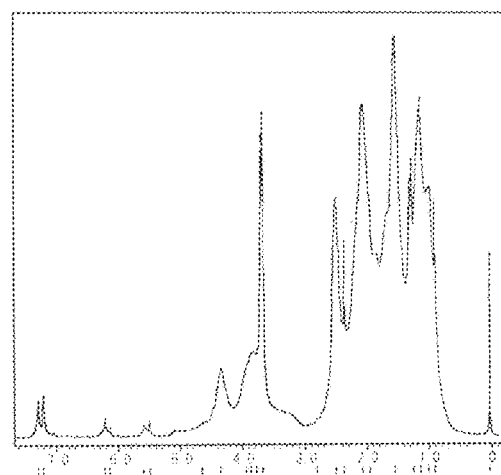
[FIG. 35]
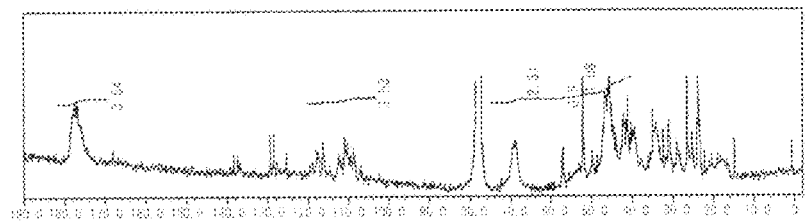
[FIG. 36]
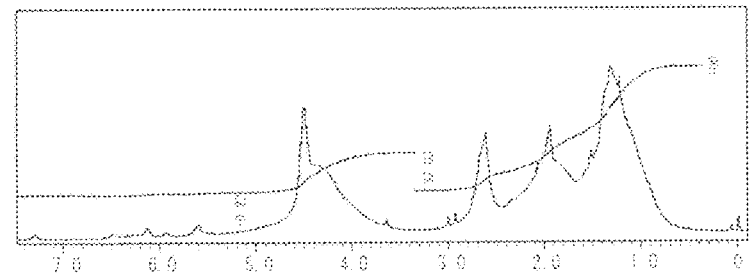

[FIG. 37]
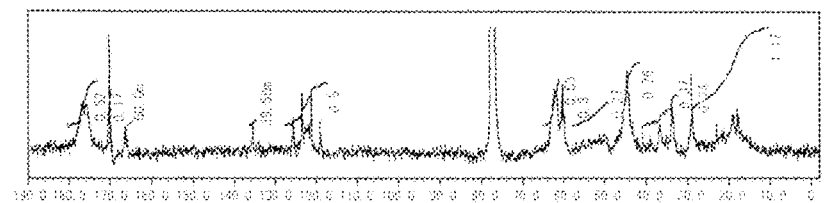
[FIG. 38]
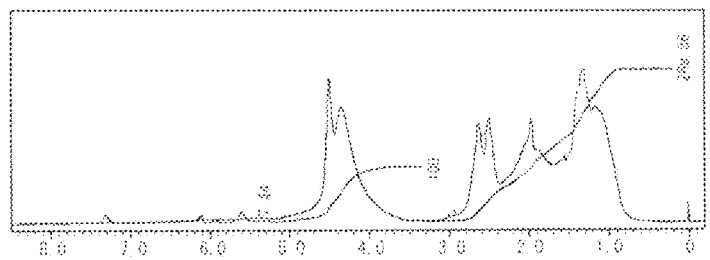
[FIG. 39]
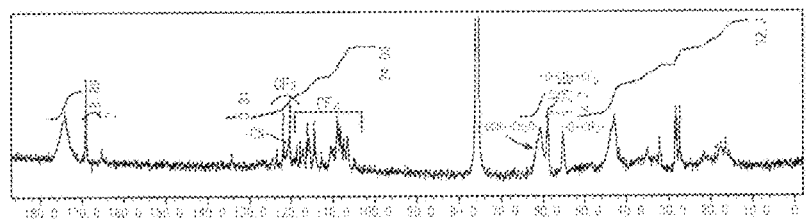
[FIG. 40]
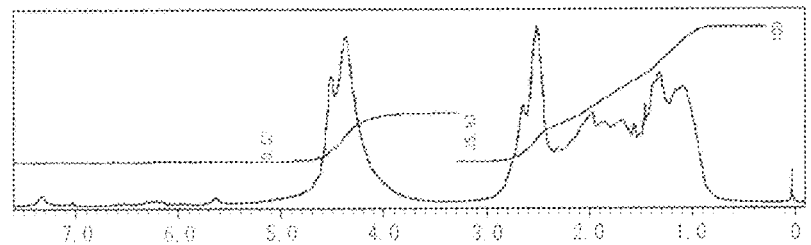

[FIG. 41]
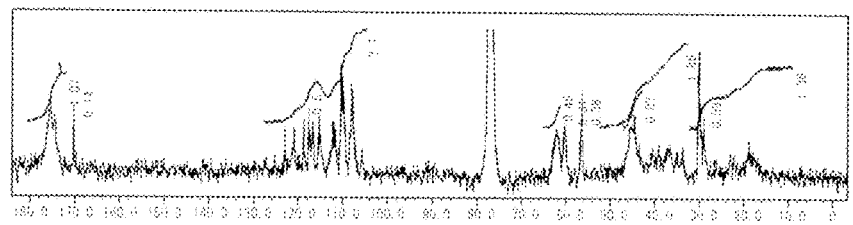
[FIG. 42]
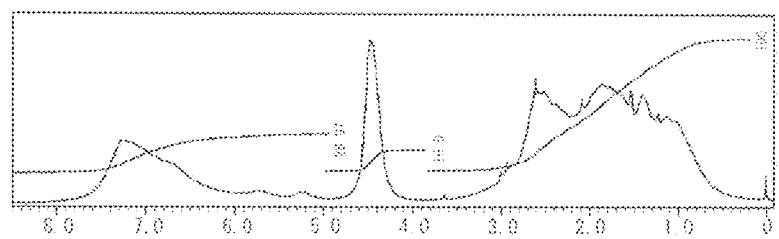
[FIG. 43]
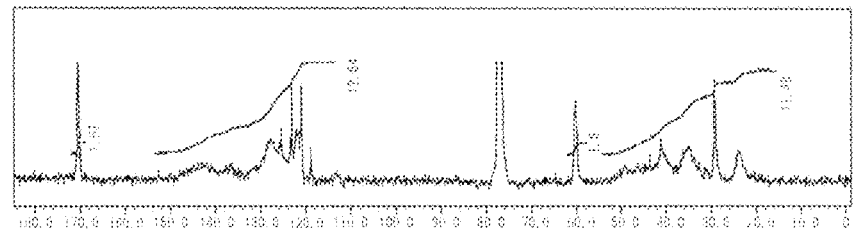
[FIG. 44]
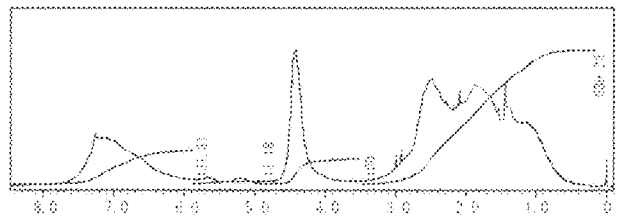
[FIG. 45]
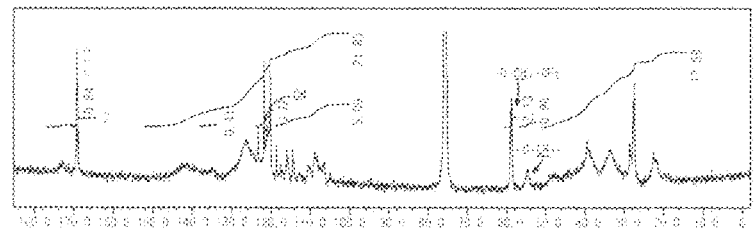

[FIG. 46]
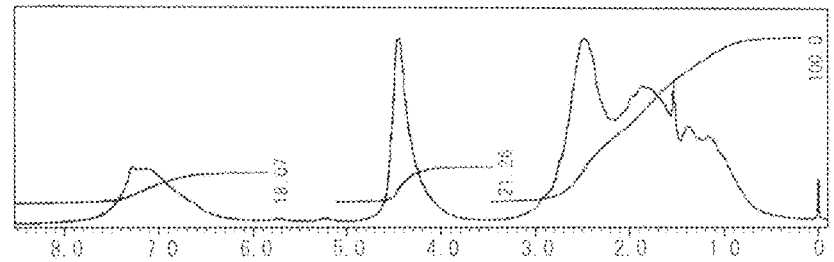
[FIG. 47]
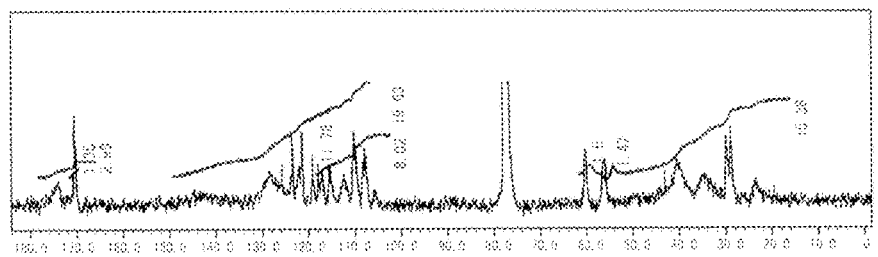
[FIG. 48]
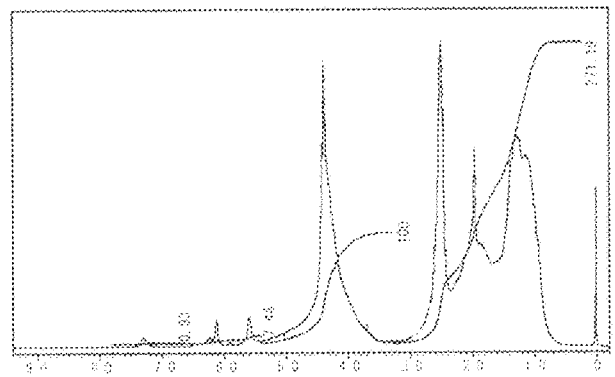

[FIG. 49]
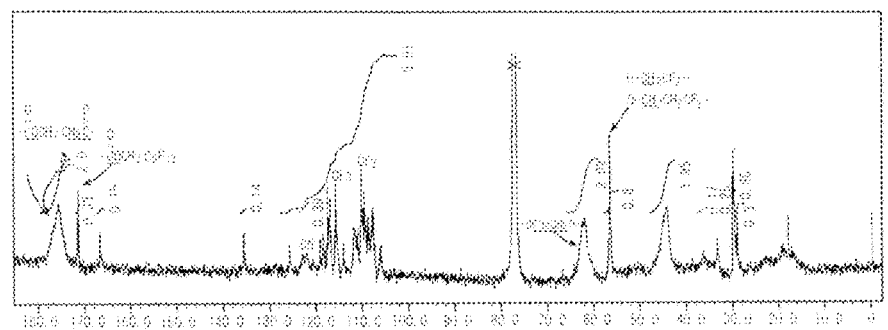
[FIG. 50]
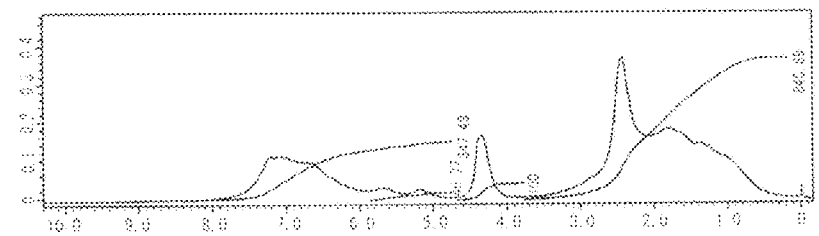
[FIG. 51]
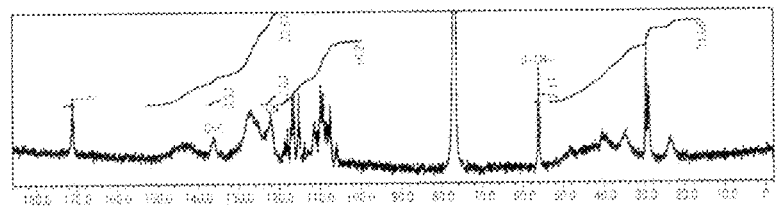

[FIG. 52]
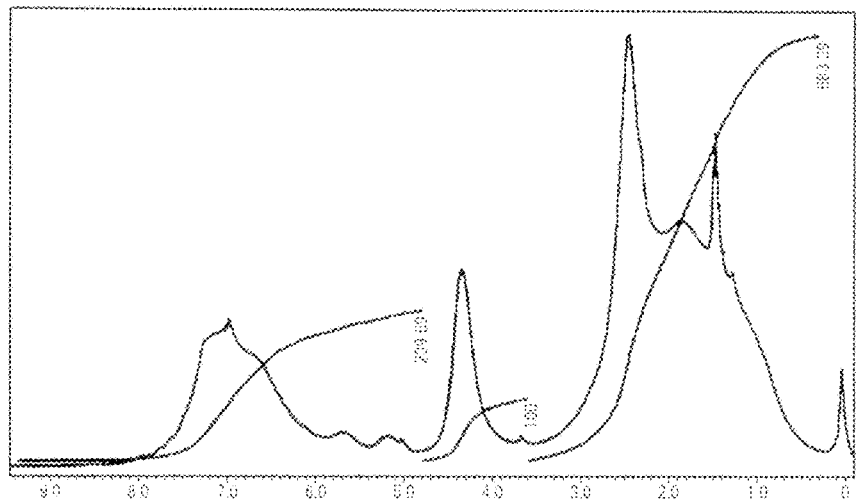
[FIG. 53]
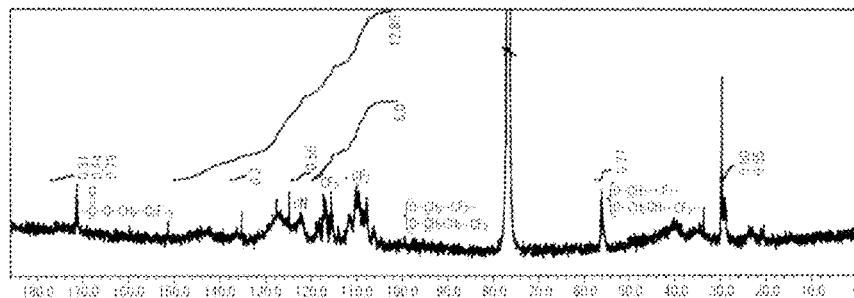
[FIG. 54]
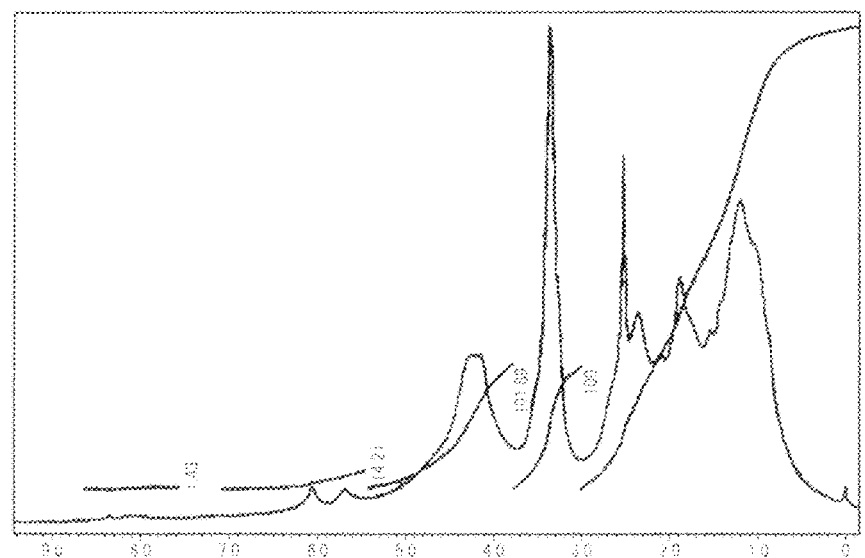

[FIG. 55]
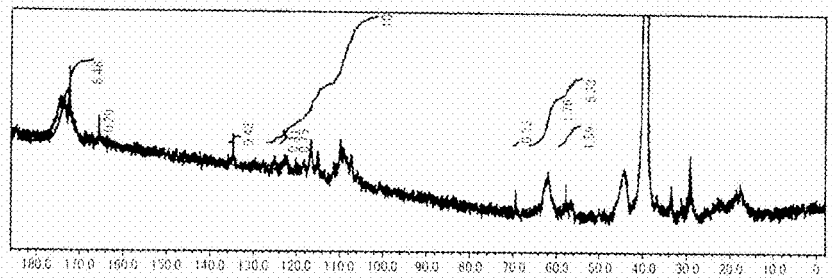
[FIG. 56]
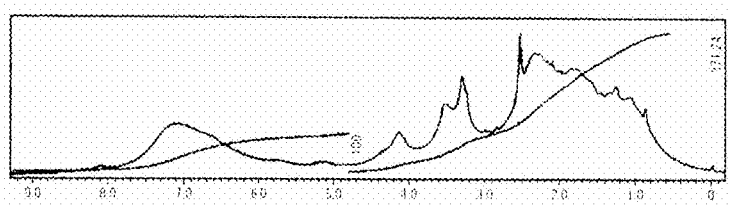
[FIG. 57]
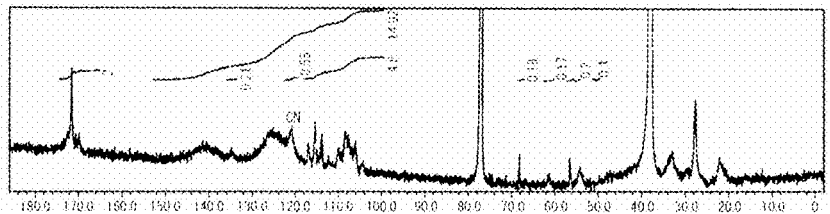
[FIG. 58]
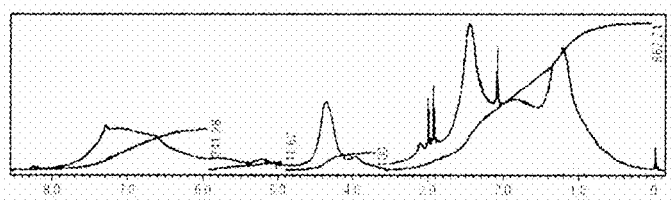
[FIG. 59]
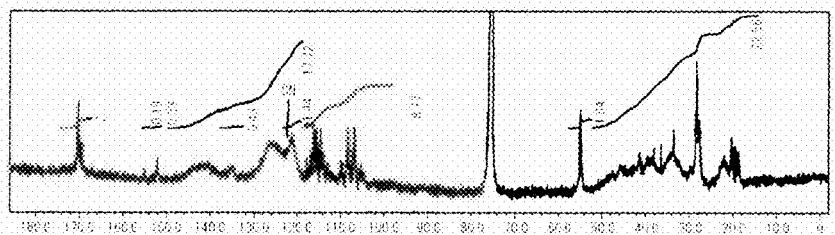

[FIG. 60]
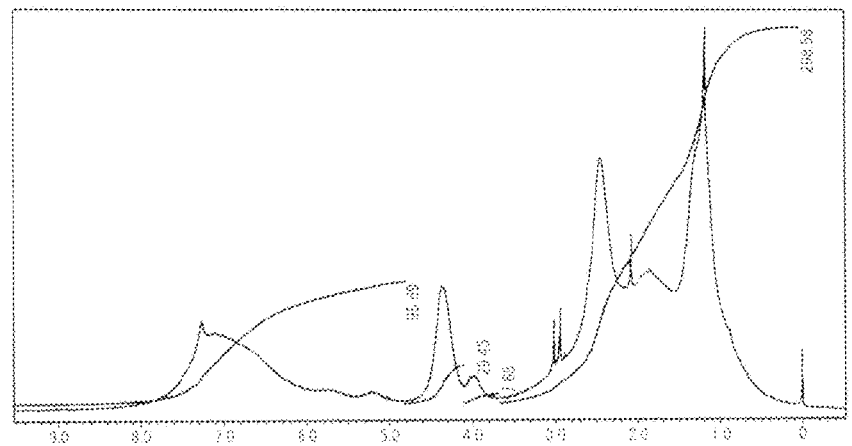
[FIG. 61]
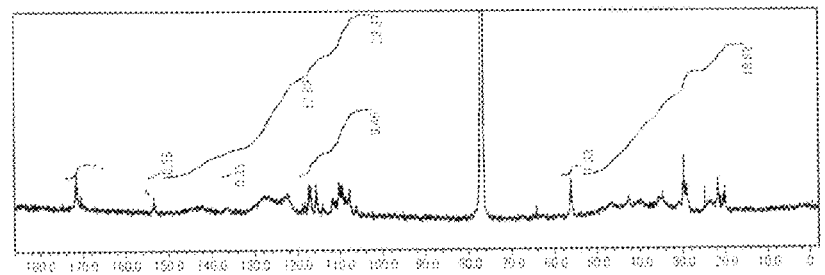
[FIG. 62]
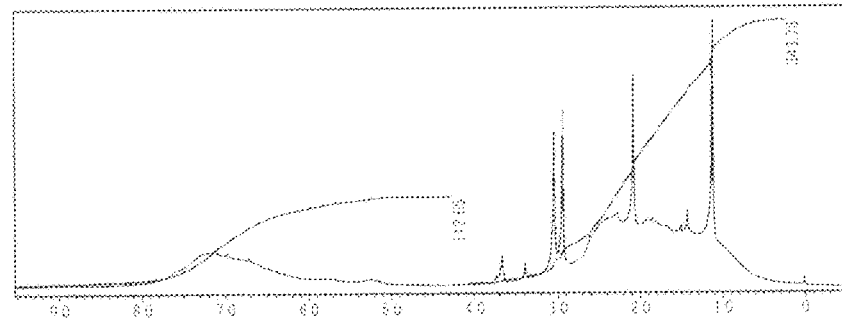

[FIG. 63]
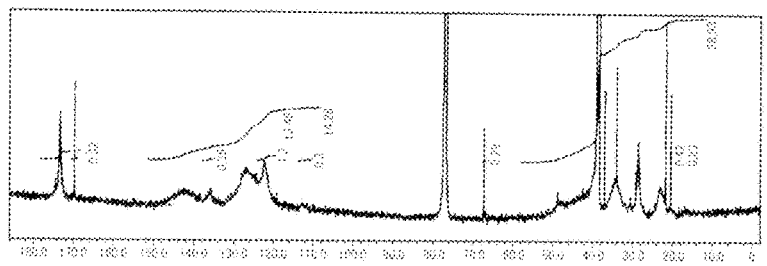
[FIG. 64]
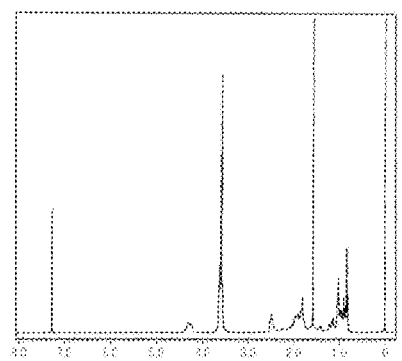
[FIG. 65]
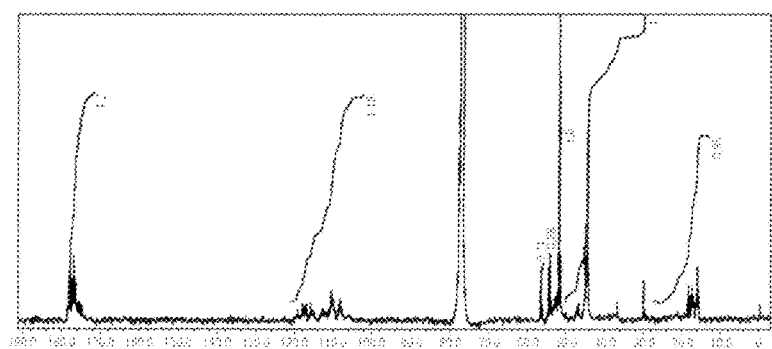

[FIG. 66]
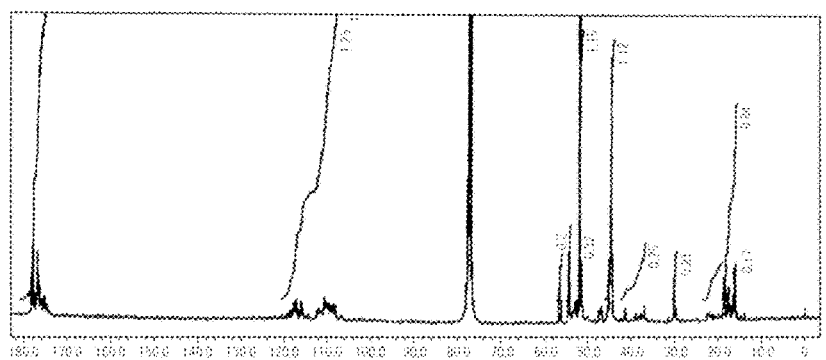
[FIG. 67]
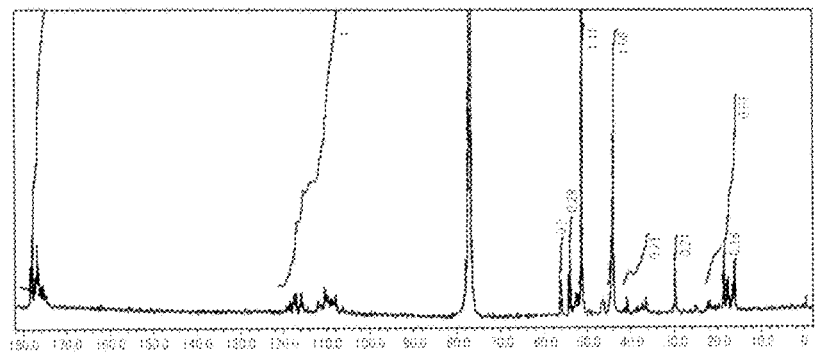

[FIG. 68]
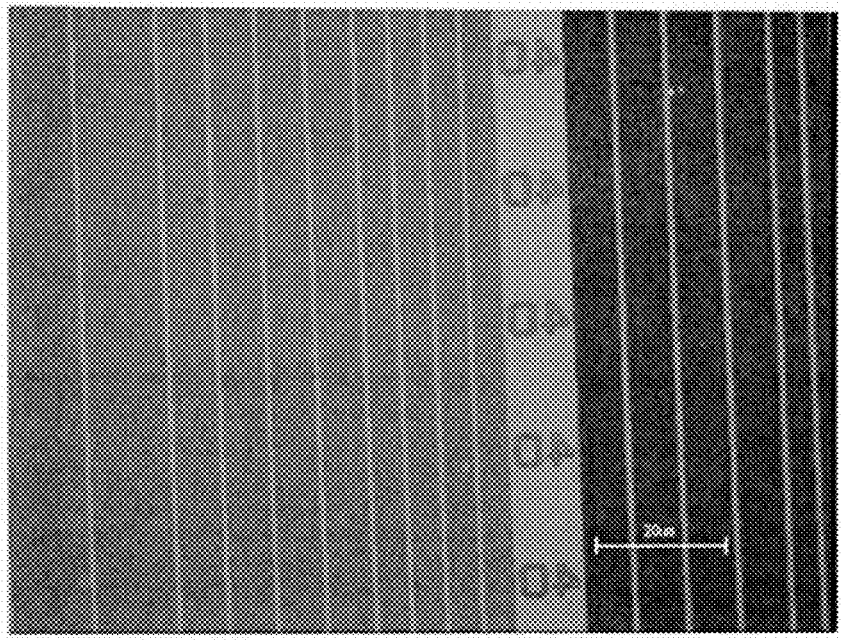
[FIG. 69]
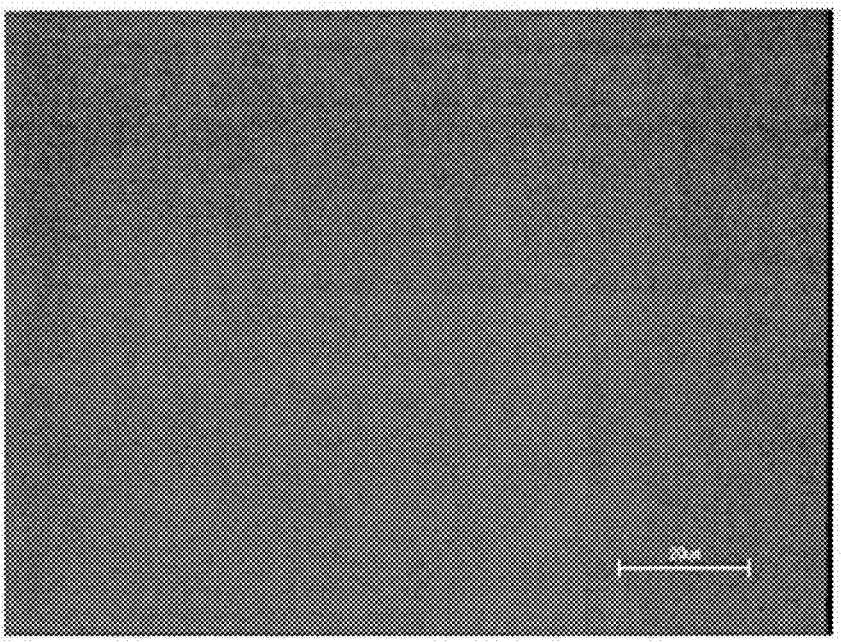

[FIG. 70]
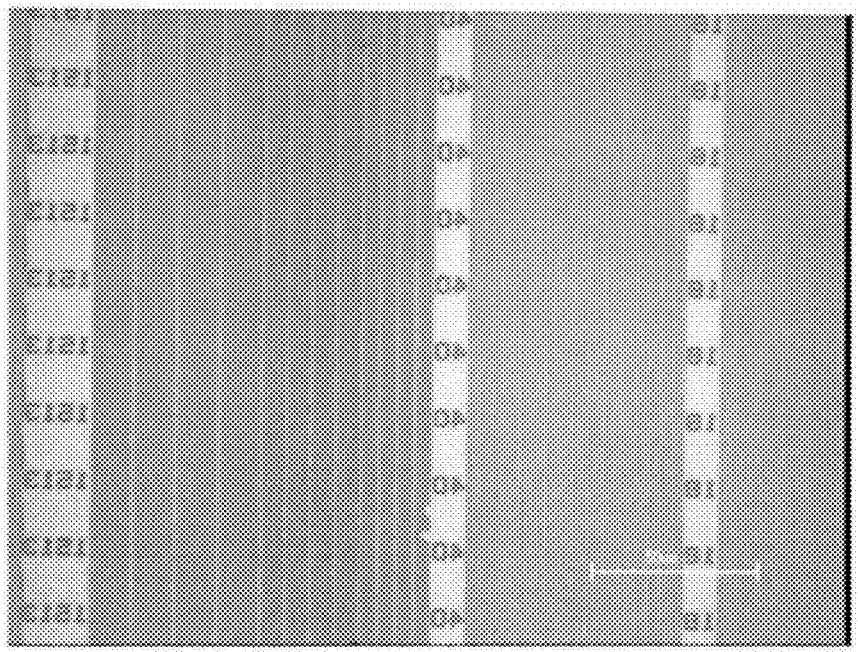
[FIG. 71]
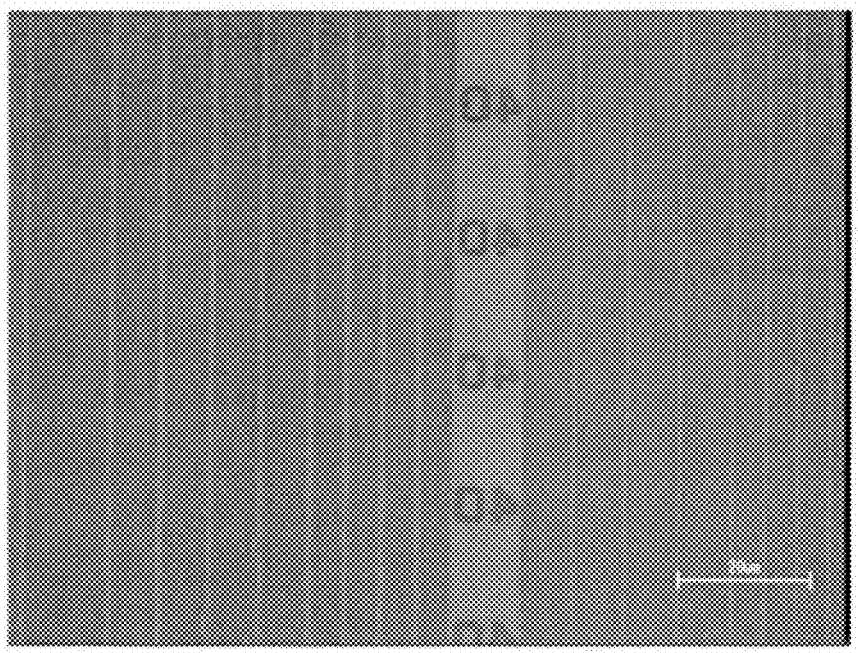

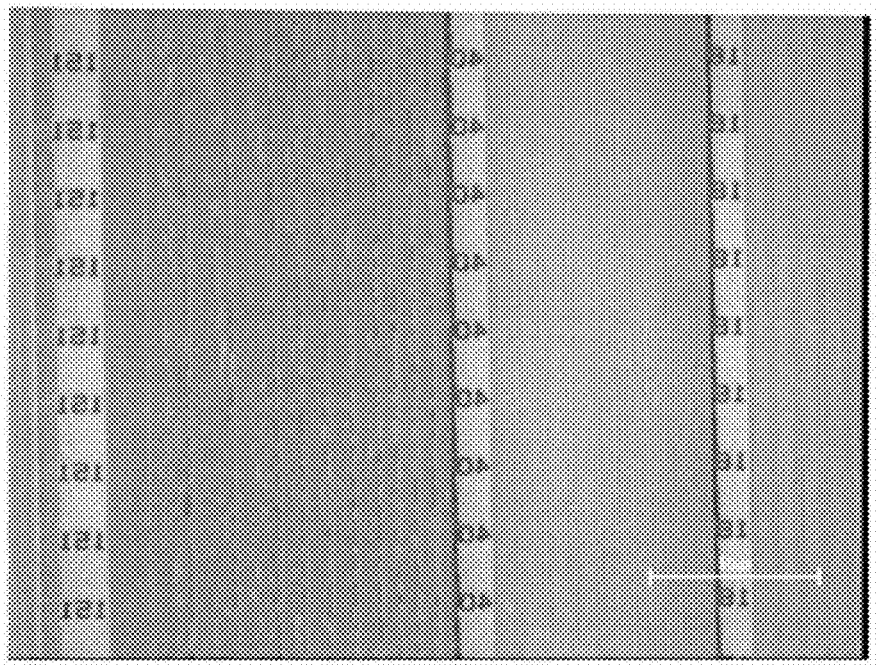
[FIG. 72]

[FIG. 73]
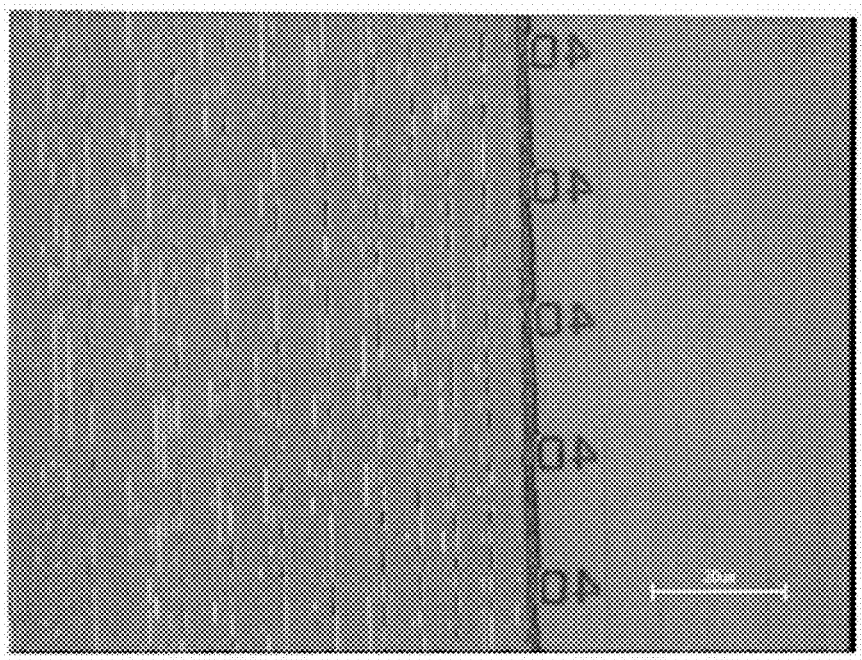
[FIG. 74]
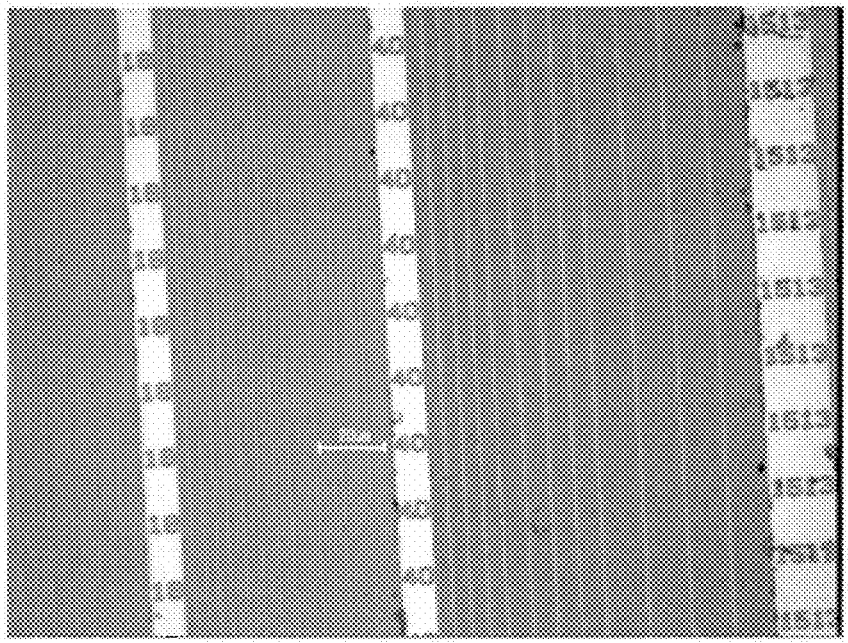

[FIG. 75]
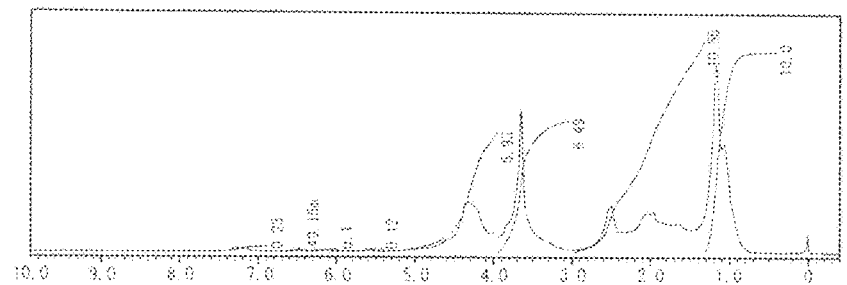
[FIG. 76]
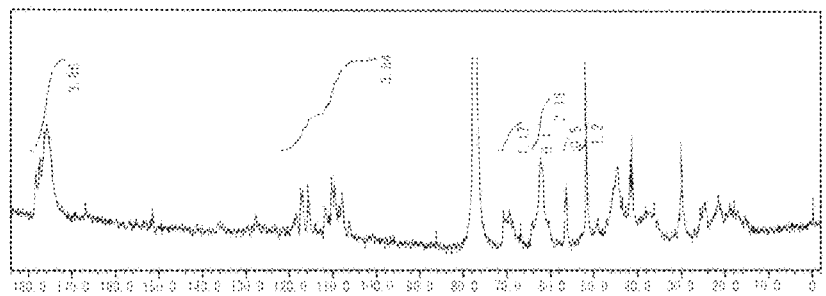
[FIG. 77]
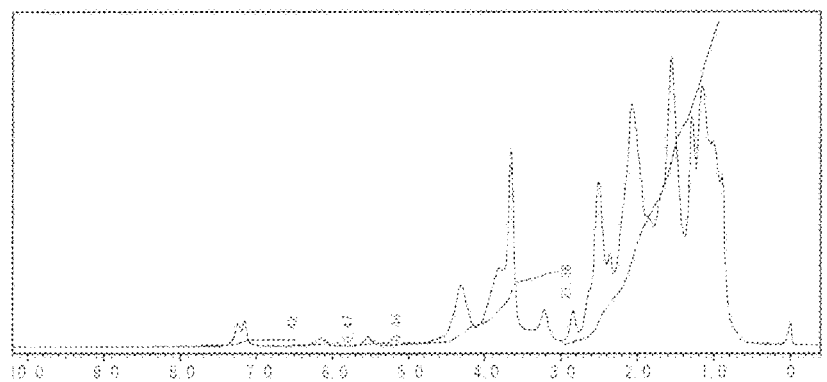

[FIG. 78]
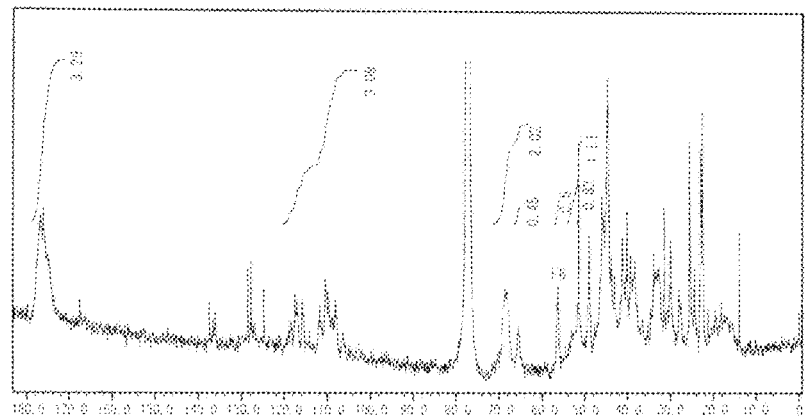
[FIG. 79]
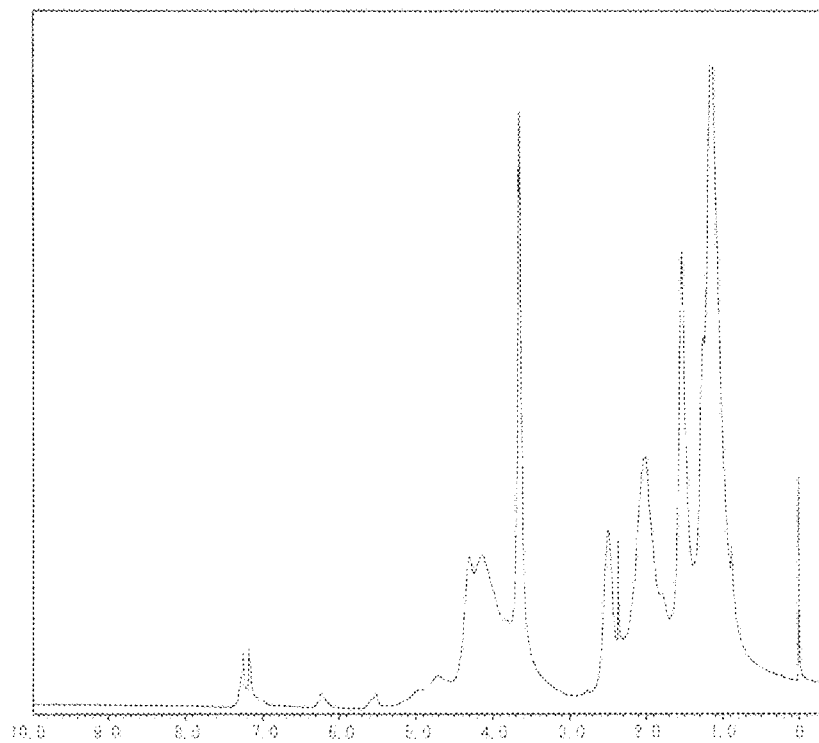

[FIG. 80]
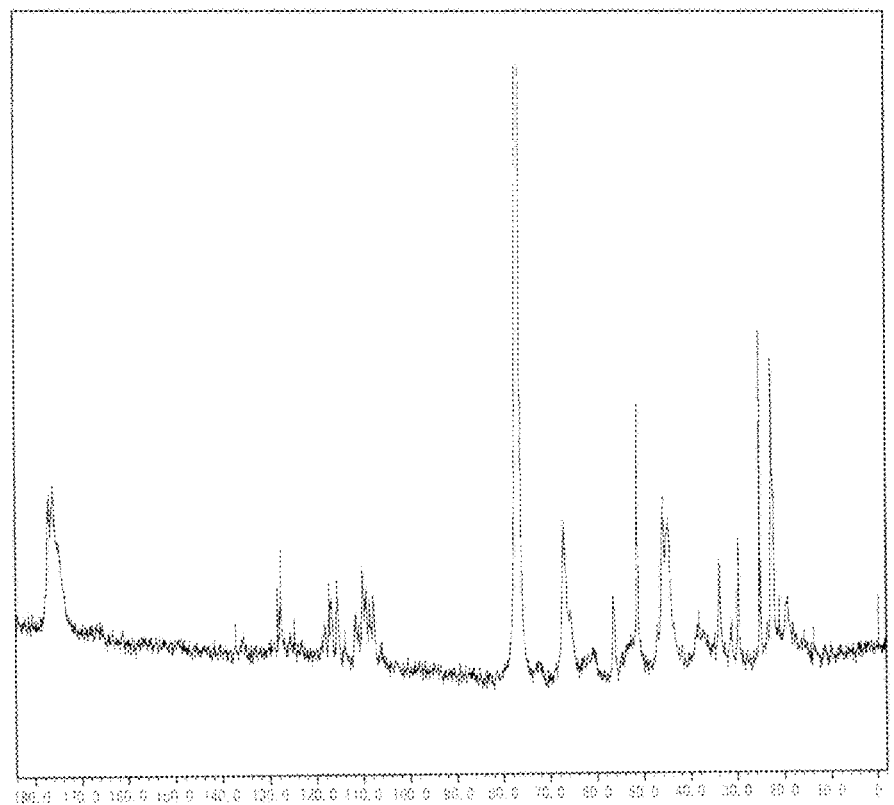

[FIG. 81]
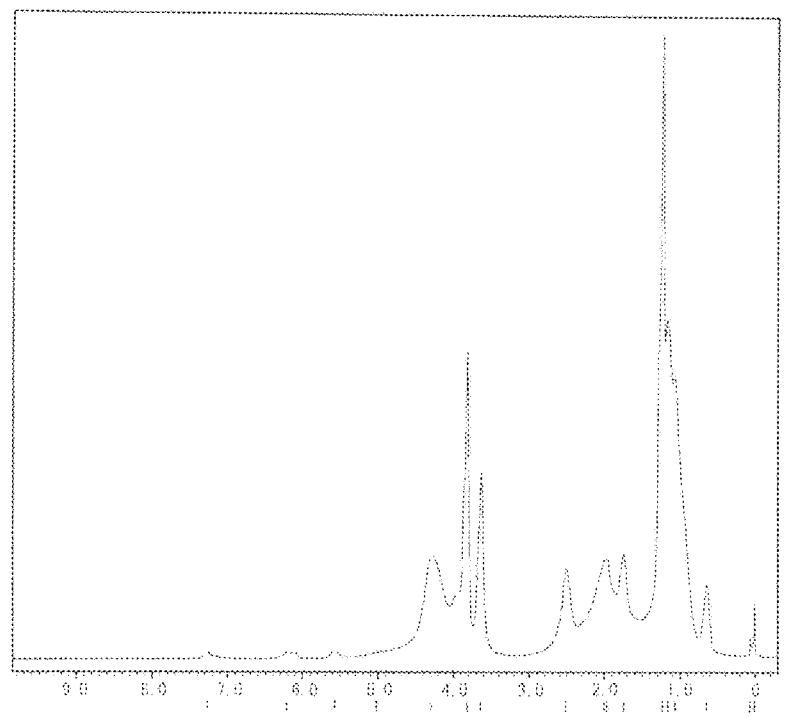
[FIG. 82]
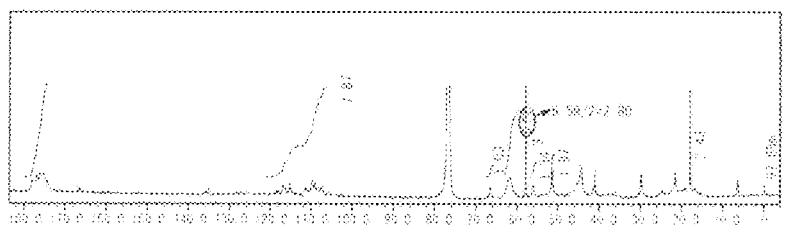

[FIG. 83]
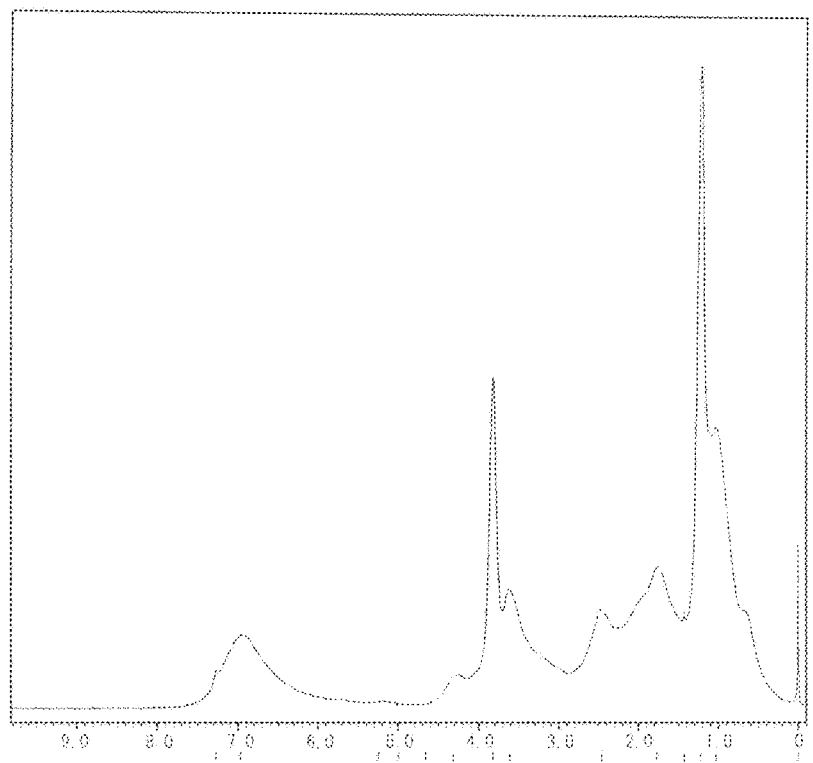
[FIG. 84]
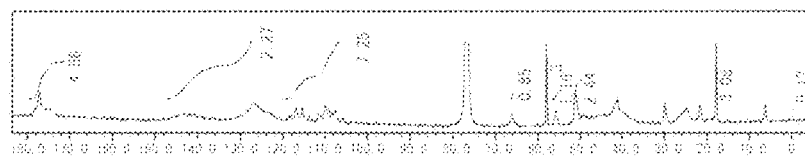

[FIG. 85]
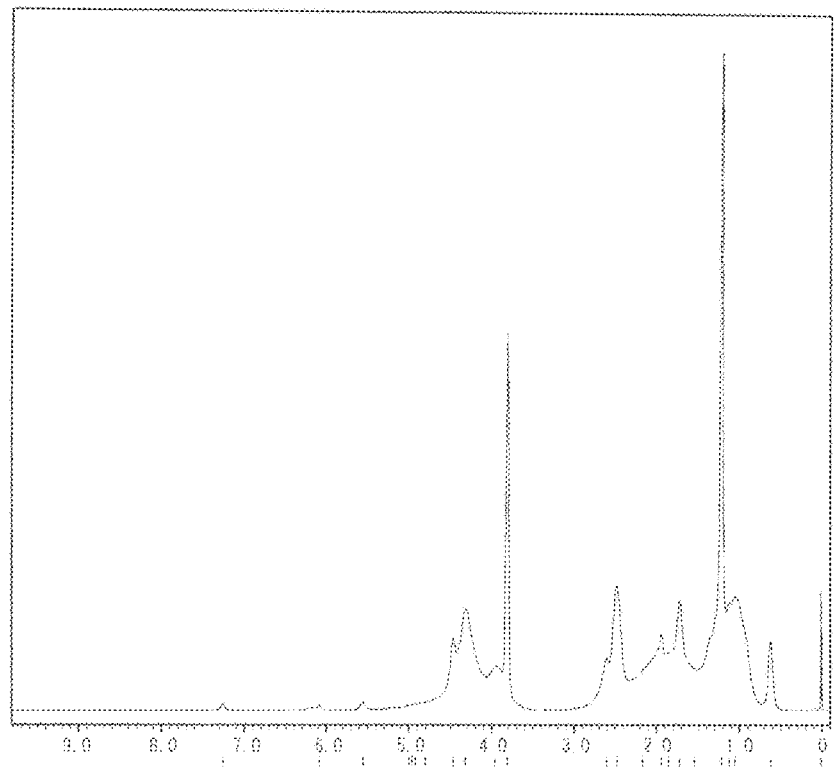
[FIG. 86]
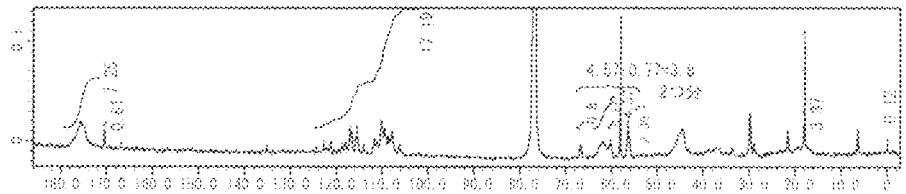

[FIG. 87]
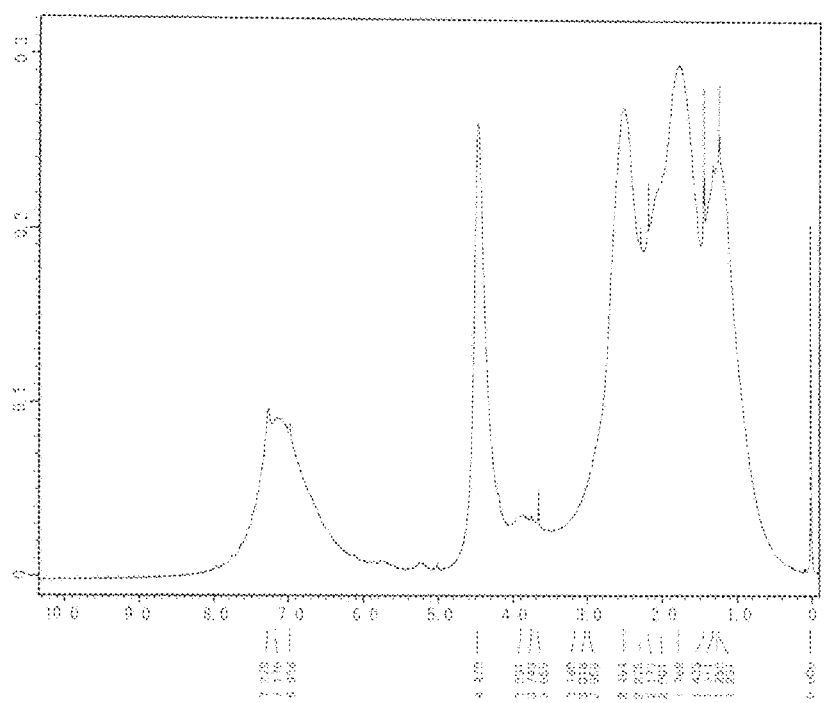
[FIG. 88]
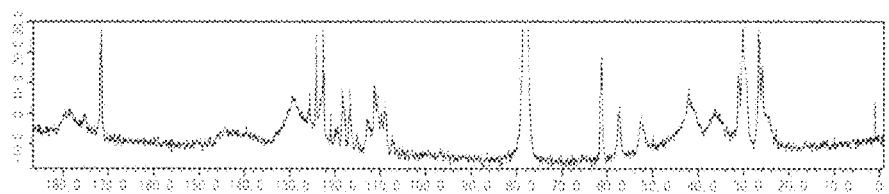

[FIG. 89]
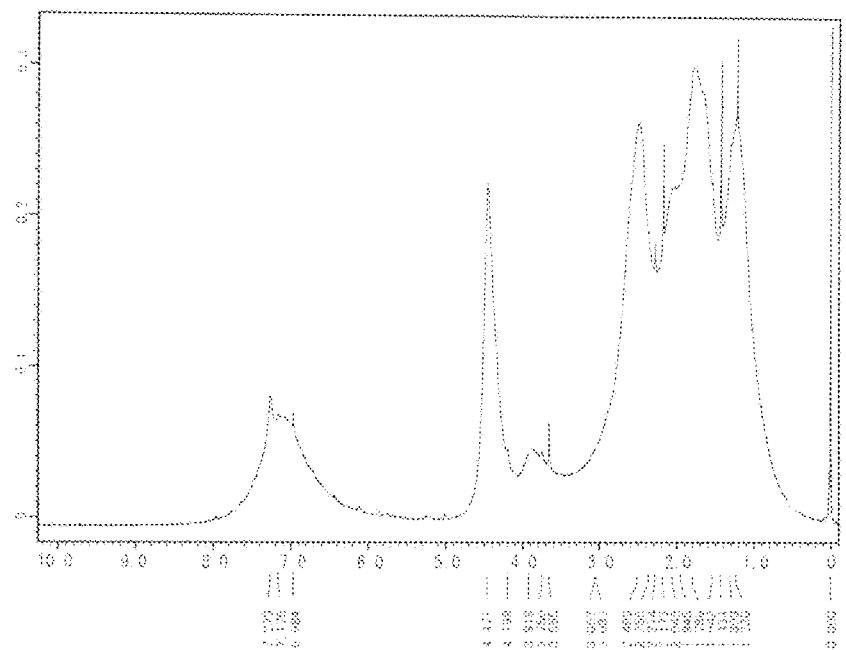
[FIG. 90]
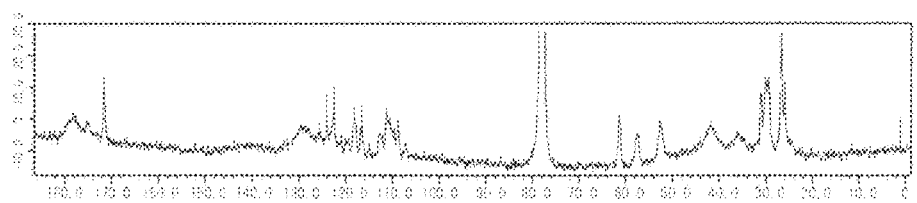

[FIG. 91]
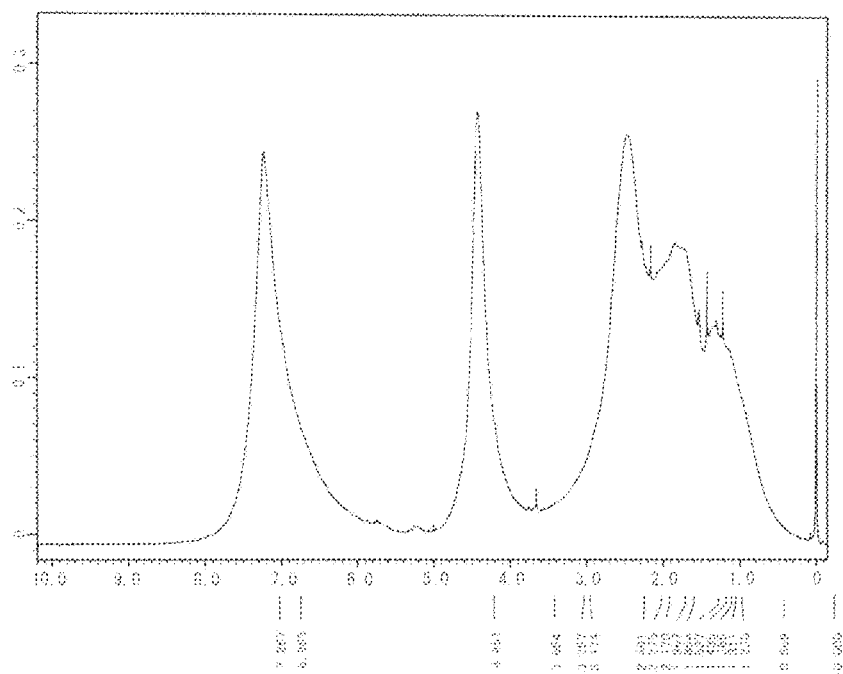
[FIG. 92]

[FIG. 93]
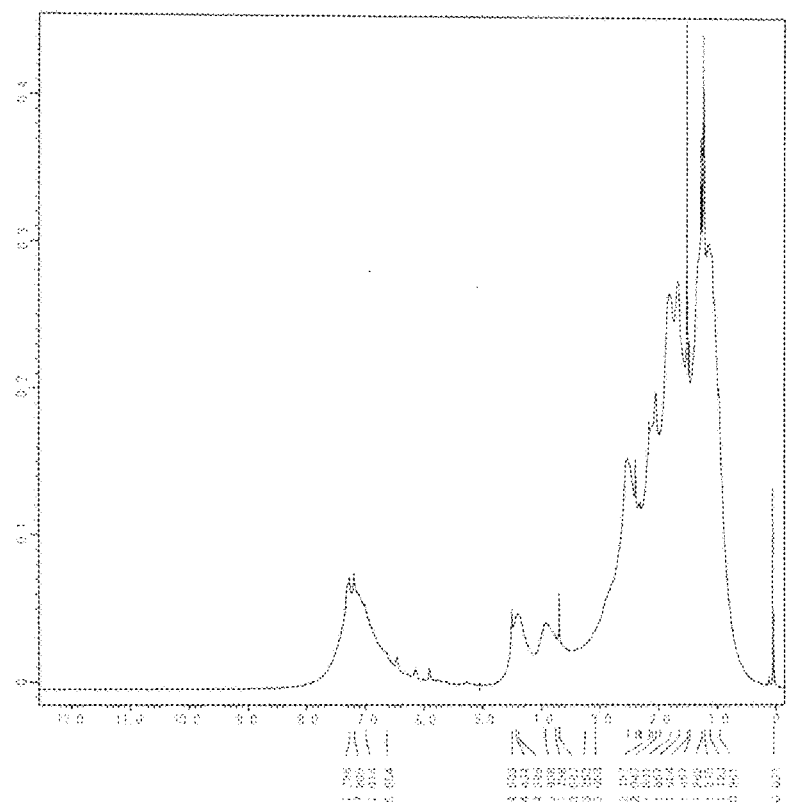
[FIG. 94]
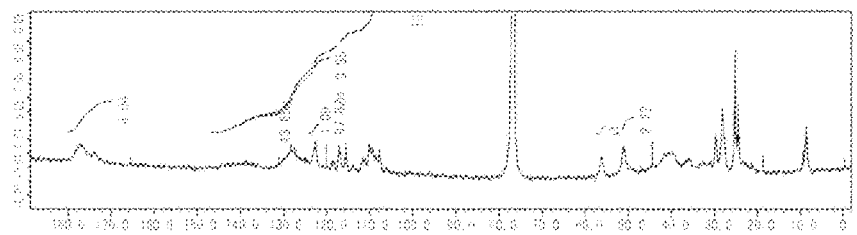

[FIG. 95]
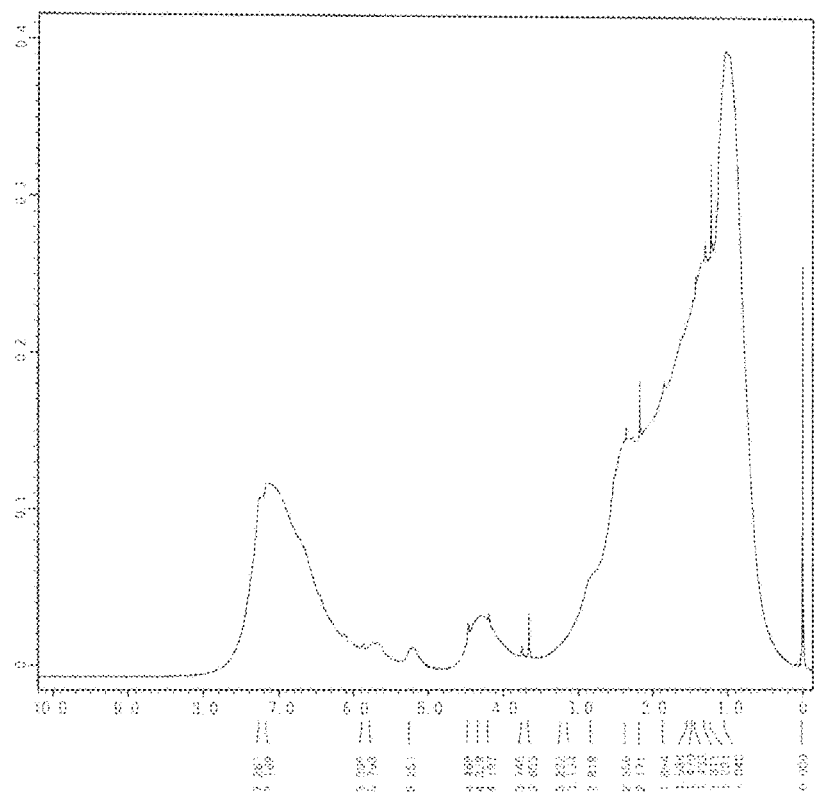
[FIG. 96]
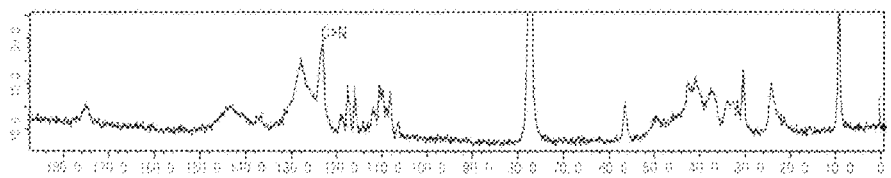

FLUORINE-CONTAINING HIGHLY BRANCHED POLYMER AND RESIN COMPOSITION CONTAINING THE SAME

This is a Division of application Ser. No. 13/322,722 filed Feb. 2, 2012, which in turn is a National Stage Application of International Application No. PCT/JP2010/059192 filed on May 31, 2010, which claims the benefit of Japanese Patent Application No. 2010-105541 filed on Apr. 30, 2010, Japanese Patent Application No. 2010-053392 filed on Mar. 10, 2010, Japanese Patent Application No. 2010-031879 filed on Feb. 16, 2010, and Japanese Patent Application No. 2009-131608 filed on May 29, 2009. The disclosure of the prior applications is hereby incorporated by reference herein in its entirety.

TECHNICAL FIELD

The present invention relates to a fluorine-containing highly branched polymer, and specifically the present invention relates to a highly branched polymer having a fluorinated alkyl group that can be used as a surface modifier for a resin, and a resin composition containing the same.

BACKGROUND ART

In recent years, polymer materials are increasingly utilized in many fields. With such a tendency, in addition to properties of a polymer as a matrix, characteristics of the surface or interface of the polymer for each field have become important. For example, by using a fluorinated compound having a low surface energy as a surface modifier, there is expected the enhancement of characteristics regarding the surface control such as water-repellent/oil-repellent property, antifouling property, nonadherent property, peeling property, mold release property, sliding property, abrasion resistance, antireflection characteristics, and chemical resistance, and various such surface modifiers are disclosed.

As a disclosure regarding surface modification of a thermoplastic resin using a fluorinated polymer, for example, there are disclosed a 4-methyl-1-pentene (PMP) resin film of which mold release property is enhanced by blending a tetrafluoroethylene-ethylene copolymer (ETFE) (Patent Document 1) and a fluorine-containing polyolefin excellent in water-repellent/oil-repellent property (Patent Document 2).

As a disclosure regarding surface modification of a photocurable and thermosetting transparent resin using a fluorinated polymer, for example, there is disclosed a surface treating agent for a thermosetting epoxy resin using a fluorinated polymer having fluoropolyether (Patent Document 3) and there is disclosed that a photocurable acrylic resin containing a fluorine-containing surfactant and/or a fluorinated polymer having a cyclic structure is excellent in mold release property, and by such a resin, surface modification can be performed (Patent Document 4).

On the other hand, as a certain method for synthesizing a highly branched polymer (hyperbranched polymer), there is disclosed a method for polymerizing a monomer having two or more radical polymerizable double bonds in the presence of a radical polymerization initiator. There is disclosed a production method of a highly branched polymer by a so-called initiator-fragment incorporation radical (co)polymerization using, for example, a styrene compound having two vinyl groups (Patent Document 5, Non-patent Documents 1, 2, 3, and 4), or a methacrylic compound having two methacryl groups (Patent Document 5, Non-patent Documents 5 and 6), or an allyl compound having two allyl groups (Non-patent Document 7), or other vinyl compounds having two vinyl groups (Patent Document 5, Non-patent Documents 8 and 9), and an azo-based polymerization initiator.

However, until today, there has not been yet disclosed a method for performing surface modification of a photocurable or thermosetting transparent resin using a highly branched polymer, and particularly with respect to the above initiator-fragment incorporation-type highly branched polymer, there has been no report for a fluoroalkyl group-containing highly branched polymer having a low surface energy.

RELATED-ART DOCUMENT

Patent Document

Patent Document 1: Japanese Patent Application Publication No. JP-A-2005-307059
Patent Document 2: Japanese Patent Application Publication No. JP-A-01-289817
Patent Document 3: Japanese Patent Application Publication No. JP-A-2009-7488
Patent Document 4: International Publication No. WO 2006/114958, pamphlet
Patent Document 5: Japanese Patent No. JP-B-4009700

Non-Patent Document

Non-patent Document 1: Tsuneyuki Sato, Nobuyuki Sato, Makiko Seno, Tomohiro Hirano, J. Polym. Sci. Part A, vol. 41, p. 3038 to 3047 (2003)
Non-patent Document 2: Tsuneyuki Sato, Naoki Higashida, Tomohiro Hirano, Makiko Seno, J. Polym. Sci. Part A, vol. 42, p. 1609 to 1617 (2004)
Non-patent Document 3: Tomohiro Hirano, Naoki Higashida, Hongwai Wang, Makiko Seno, Tsuneyuki Sato, J. Appl. Polym. Sci., vol. 100, p. 664 to 670 (2006)
Non-patent Document 4: Tsuneyuki Sato, Hiroki Nobutane, Tomohiro Hirano, Makiko Seno, Macromol. Mater. Eng., vol. 291, p. 162 to 172 (2006)
Non-patent Document 5: Tsuneyuki Sato, Takashi Miyagi, Tomohiro Hirano, Makiko Seno, Polym. Int., vol. 53, p. 1503 to 1511 (2004)
Non-patent Document 6: Tomohiro Hirano, Hiroshi Ihara, Takashi Miyagi, Hongwei Wang, Makiko Seno, Tsuneyuki Sato, Macromol. Chem. Phys., vol. 206, p. 860 to 868 (2005)
Non-patent Document 7: Tsuneyuki Sato, Kazuki Nomura, Tomohiro Hirano, Makiko Seno, J. Appl. Polym. Sci., vol. 102, p. 408 to 415 (2006)
Non-patent Document 8: Tsuneyuki Sato, Atushi Ono, Tomohiro Hirano, Makiko Seno, J. Polymm. Sci. Part A, vol. 44, p. 2328 to 2337 (2006)
Non-patent Document 9: Tsuneyuki Sato, Yukiko Arima, Makiko Seno, Tomohiro Hirano, Polym. Int., vol. 53, p. 1138 to 1144 (2004)

DISCLOSURE OF THE INVENTION

Problem to be Solved by the Invention

Although the above linear fluorinated polymer can impart a certain surface modification effect to a part of thermoplastic resins, the linear fluorinated polymer has generally poor miscibility with/dispersibility in a resin, so that particularly when such a polymer is dispersed in a thermoplastic transparent resin represented by a poly(methyl methacrylate) (PMMA), a phase separation is caused and there is such a fear that the transparency of the transparent resin is impaired.

Such a fluorinated polymer has a low solubility in an organic solvent, so that when a surface modification of a photocurable or thermosetting resin using such a polymer is attempted, it is difficult to apply such a polymer to a film formation process using an organic solvent.

That is, there is required a novel compound maintaining satisfactory transparency, having a high solubility relative to an organic solvent, and having also a surface modification effect.

Means for Solving the Problem

As a result of assiduous research intended to overcome these disadvantages, the inventors of the present invention have found that by introducing a fluoroalkyl group into a highly branched polymer, which has not conventionally been studied, and by adopting the resultant fluorine-containing highly branched polymer as a surface modifier for a resin, there can be obtained a molded article and a coating film excellent not only in solubility in an organic solvent, but also in miscibility with/dispersibility in a matrix resin, causing no aggregation in a matrix resin, excellent in surface modification property, and having high transparency, and then, the inventors have completed the present invention.

That is, the present invention relates, as a first aspect, to a fluorine-containing highly branched polymer obtained by polymerizing a monomer A having two or more radical polymerizable double bonds in the molecule thereof in the presence of a polymerization initiator C in a content of 5% by mol or more and 200% by mol or less, relative to 1 mol of the monomer A, characterized in that any one of at least a part of the monomer and the polymerization initiator has a fluoroalkyl group in the molecule thereof.

As a second aspect, the present invention relates to a fluorine-containing highly branched polymer obtained by polymerizing a monomer A having two or more radical polymerizable double bonds in the molecule thereof with a monomer B having a fluoroalkyl group and at least one radical polymerizable double bond in the molecule thereof in the presence of a polymerization initiator C in a content of 5% by mol or more and 200% by mol or less, based on the total molar amount of the monomer A and the monomer B.

As a third aspect, the present invention relates to a fluorine-containing highly branched polymer obtained by polymerizing a monomer A having two or more radical polymerizable double bonds in the molecule thereof in the presence of a polymerization initiator C having a fluoroalkyl group in the molecule thereof in a content of 5% by mol or more and 200% by mol or less, relative to 1 mol of the monomer A.

As a fourth aspect, the present invention relates to a fluorine-containing highly branched polymer obtained by polymerizing a monomer A having two or more radical polymerizable double bonds in the molecule thereof with a monomer B having a fluoroalkyl group and at least one radical polymerizable double bond in the molecule thereof in the presence of a polymerization initiator C having a fluoroalkyl group in the molecule thereof in a content of 5% by mol or more and 200% by mol or less, based on the total molar amount of the monomer A and the monomer B.

As a fifth aspect, the present invention relates to the fluorine-containing highly branched polymer according to any one of the second aspect to the fourth aspect in which the monomer A is a compound having at least any one of a vinyl group and a (meth)acryl group.

As a sixth aspect, the present invention relates to the fluorine-containing highly branched polymer according to the fifth aspect in which the monomer A is a divinyl compound or a di(meth)acrylate compound.

As a seventh aspect, the present invention relates to the fluorine-containing highly branched polymer according to the sixth aspect in which the monomer A is an ethylene glycol di(meth)acrylate.

As an eighth aspect, the present invention relates to the fluorine-containing highly branched polymer according to any one of the second aspect to the fourth aspect obtained, when the monomer B is used, by using the monomer B in an amount of 0.05 mol to 3 mol, relative to 1 mol of the monomer A.

As a ninth aspect, the present invention relates to the fluorine-containing highly branched polymer according to the eighth aspect, in which the monomer B is a compound having at least any one of one vinyl group and one (meth)acryl group.

As a tenth aspect, the present invention relates to the fluorine-containing highly branched polymer according to the ninth aspect in which the monomer B is a compound of Formula [1]:

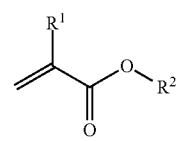

[1]

(where:
$R^1$ is a hydrogen atom or a methyl group; and
$R^2$ is a $C_{2-12}$ fluoroalkyl group that is optionally substituted with a hydroxy group).

As an eleventh aspect, the present invention relates to the fluorine-containing highly branched polymer according to the tenth aspect, in which the monomer B is a compound of Formula [2]:

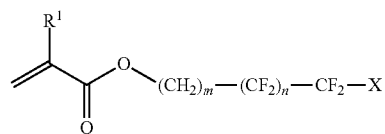

[2]

(where:
$R^1$ is the same as defined in Formula [1];
X is a hydrogen atom or a fluorine atom;
m is 1 or 2; and
n is an integer of 0 to 5).

As a twelfth aspect, the present invention relates to the fluorine-containing highly branched polymer according to any one of the first aspect to the eleventh aspect, in which the polymerization initiator C is an azo-based polymerization initiator.

As a thirteenth aspect, the present invention relates to the fluorine-containing highly branched polymer according to the twelfth aspect, in which the polymerization initiator C is dimethyl 2,2'-azobisisobutyrate.

As a fourteenth aspect, the present invention relates to the fluorine-containing highly branched polymer according to the twelfth aspect, in which the polymerization initiator C is 2,2'-azobis(2,4,4-trimethylpentane).

As a fifteenth aspect, the present invention relates to a varnish containing the fluorine-containing highly branched polymer as described in any one of the first aspect to the fourteenth aspect.

As a sixteenth aspect, the present invention relates to a thin film containing the fluorine-containing highly branched polymer as described in any one of the first aspect to the fourteenth aspect.

As a seventeenth aspect, the present invention relates to a photopolymerizable composition containing the fluorine-containing highly branched polymer (a) as described in any one of the first aspect to the fourteenth aspect, a photopolymerizable compound (b), and a photopolymerization initiator (c).

As an eighteenth aspect, the present invention relates to the photopolymerizable composition according to the seventeenth aspect, in which the photopolymerizable compound (b) is a multifunctional (meth)acrylate compound.

As a nineteenth aspect, the present invention relates to the photopolymerizable composition according to the eighteenth aspect, in which the photopolymerizable compound (b) is tricyclodecanedimethanol di(meth)acrylate.

As a twentieth aspect, the present invention relates to the photopolymerizable composition according to any one of the seventeenth aspect to the nineteenth, in which the content of the fluorine-containing highly branched polymer (a) is 0.01% by mass to 20% by mass, based on the total mass of the photopolymerizable compound (b).

As a twenty-first aspect, the present invention relates to a resin-molded article produced by photopolymerizing the photopolymerizable composition as described in any one of the seventeenth aspect to the twentieth aspect.

As a twenty-second aspect, the present invention relates to a resin composition containing the fluorine-containing highly branched polymer (a) as described in any one of the first aspect to the fourteenth aspect and a thermoplastic resin or thermosetting resin (d).

As a twenty-third aspect, the present invention relates to the resin composition according to the twenty-second aspect, in which the thermoplastic resin (d) is a poly(methyl methacrylate) resin.

As a twenty-fourth aspect, the present invention relates to the resin composition according to the twenty-second aspect, in which the thermoplastic resin (d) is a poly(lactic acid) resin.

As a twenty-fifth aspect, the present invention relates to the resin composition according to any one of the twenty-second aspect to the twenty-fourth aspect, in which the content of the fluorine-containing highly branched polymer (a) is 0.01% by mass to 20% by mass, based on the total mass of the thermoplastic resin or thermosetting resin (d).

As a twenty-sixth aspect, the present invention relates to a resin-molded article produced from the resin composition as described in any one of the twenty-second aspect to the twenty-fifth aspect.

As a twenty-seventh aspect, the present invention relates to a method for producing a fluorine-containing highly branched polymer including polymerizing a monomer A having two or more radical polymerizable double bonds in the molecule thereof with a monomer B having a fluoroalkyl group and at least one radical polymerizable double bond in the molecule thereof in the presence of a polymerization initiator C in a content of 5% by mol or more and 200% by mol or less, based on the total molar amount of the monomer A and the monomer B.

As a twenty-eighth aspect, the present invention relates to a method for producing a fluorine-containing highly branched polymer including polymerizing a monomer A having two or more radical polymerizable double bonds in the molecule thereof in the presence of a polymerization initiator C having a fluoroalkyl group in the molecule thereof in a content of 5% by mol or more and 200% by mol or less, relative to 1 mol of the monomer A.

As a twenty-ninth aspect, the present invention relates to a method for producing a fluorine-containing highly branched polymer including polymerizing a monomer A having two or more radical polymerizable double bonds in the molecule thereof with a monomer B having a fluoroalkyl group and at least one radical polymerizable double bond in the molecule thereof in the presence of a polymerization initiator C having a fluoroalkyl group in the molecule thereof in a content of 5% by mol or more and 200% by mol or less, based on the total molar amount of the monomer A and the monomer B.

As a thirtieth aspect, the present invention relates to a method for producing a fluorine-containing highly branched polymer including:

producing a highly branched polymer by polymerizing a monomer A having two or more radical polymerizable double bonds in the molecule thereof in the presence of a polymerization initiator C in a content of 5% by mol or more and 200% by mol or less, relative to 1 mol of the monomer A; and reacting the obtained highly branched polymer with a fluoroalkyl group-containing alcohol D.

As a thirty-first aspect, the present invention relates to a mold release agent for an imprint containing the fluorine-containing highly branched polymer as described in any one of the first aspect to the fourteenth aspect.

As a thirty-second aspect, the present invention relates to a photo-imprinted molded article in which a fine pattern is transferred, obtained by: pressing a mold having the fine pattern to a layer of the photopolymerizable composition as described in any one of the seventeenth aspect to the twentieth aspect; curing the layer by light irradiation; and removing the mold.

As a thirty-third aspect, the present invention relates to a thermo-imprinted molded article in which a fine pattern is transferred, obtained by: pressing a mold having the fine pattern to a layer of the resin composition as described in any one of the twenty-second aspect to the twenty-fifth aspect; heating the layer to a glass transition temperature of the resin or higher; cooling down the layer; and removing the mold.

Effects of the Invention

In the fluorine-containing highly branched polymer of the present invention, in contrast to a conventional linear polymer having generally a string shape, a branched structure is in a positive manner introduced, so that molecular entanglements are in a small amount in comparison with a linear polymer, and consequently, the highly branched polymer exhibits particle-like behaviors. That is, the highly branched polymer moves easily in a resin matrix.

Therefore, when the fluorine-containing highly branched polymer of the present invention is blended in a photopolymerizable composition or a resin composition containing a thermoplastic resin or a thermosetting resin to be converted into a resin-molded article, the fluorine-containing highly branched polymer moves easily to the interface (surface of the molded article) and can contribute to the interface control, which leads to an enhancement of the surface modification of a resin.

The fluorine-containing highly branched polymer of the present invention has high miscibility with/dispersibility in a resin matrix, and can be mixed with/dispersed in a resin without causing aggregation or the like, and can produce a resin-molded article excellent in transparency.

Further, the fluorine-containing highly branched polymer of the present invention as it is can form a thin film-shaped structure by a simple coating and drying operation, making use of the characteristics as a polymer compound. Moreover, the fluorine-containing highly branched polymer of the present invention is soluble not only in N,N-dimethylformamide (DMF) and tetrahydrofuran (THF), but also in acetone and toluene, so that the fluorine-containing highly branched polymer can be converted into a varnish state without limiting the type of the solvent and can be formed as a thin film.

The resin-molded article of the present invention can be converted into not only a molded article excellent in transparency as described above, but also a surface-modified resin-molded article. The molded article of the present invention can be a molded article excellent in, for example, mold release property relative to various machines such as mixing/molding machines, and molds, or peeling property relative to other resin-molded articles such as films, and further also water-repellent/oil-repellent property and antifouling property.

BRIEF DESCRIPTION OF THE DRAWINGS

FIG. 1 is a graph showing $^1$H NMR spectrum of the highly branched polymer 1 produced in Example 1.
FIG. 2 is a graph showing $^{13}$C NMR spectrum of the highly branched polymer 1 produced in Example 1.
FIG. 3 is a graph showing $^1$H NMR spectrum of the highly branched polymer 2 produced in Example 2.
FIG. 4 is a graph showing $^{13}$C NMR spectrum of the highly branched polymer 2 produced in Example 2.
FIG. 5 is a graph showing $^1$H NMR spectrum of the highly branched polymer 3 produced in Example 3.
FIG. 6 is a graph showing $^{13}$C NMR spectrum of the highly branched polymer 3 produced in Example 3.
FIG. 7 is a graph showing $^1$H NMR spectrum of the highly branched polymer 4 produced in Example 4.
FIG. 8 is a graph showing $^{13}$C NMR spectrum of the highly branched polymer 4 produced in Example 4.
FIG. 9 is a graph showing $^1$H NMR spectrum of the highly branched polymer 5 produced in Example 5.
FIG. 10 is a graph showing $^{13}$C NMR spectrum of the highly branched polymer 5 produced in Example 5.
FIG. 11 is a graph showing $^1$H NMR spectrum of the highly branched polymer 6 produced in Example 6.
FIG. 12 is a graph showing $^{13}$C NMR spectrum of the highly branched polymer 6 produced in Example 6.
FIG. 13 is a graph showing $^1$H NMR spectrum of the highly branched polymer 7 produced in Example 7.
FIG. 14 is a graph showing $^{13}$C NMR spectrum of the highly branched polymer 7 produced in Example 7.
FIG. 15 is a graph showing $^1$H NMR spectrum of the highly branched polymer 8 produced in Example 8.
FIG. 16 is a graph showing $^{13}$C NMR spectrum of the highly branched polymer 8 produced in Example 8.
FIG. 17 is a graph showing $^1$H NMR spectrum of the highly branched polymer 9 produced in Example 9.
FIG. 18 is a graph showing $^{13}$C NMR spectrum of the highly branched polymer 9 produced in Example 9.
FIG. 19 is a graph showing $^1$H NMR spectrum of the highly branched polymer 10 produced in Example 10.
FIG. 20 is a graph showing $^{13}$C NMR spectrum of the highly branched polymer 10 produced in Example 10.
FIG. 21 is a graph showing $^1$H NMR spectrum of the highly branched polymer 11 produced in Example 11.
FIG. 22 is a graph showing $^{13}$C NMR spectrum of the highly branched polymer 11 produced in Example 11.
FIG. 23 is a graph showing $^1$H NMR spectrum of the highly branched polymer 12 produced in Comparative Example 1.
FIG. 24 is a graph showing $^{13}$C NMR spectrum of the highly branched polymer 12 produced in Comparative Example 1.
FIG. 25 is a graph showing a peeling strength test result of the highly branched polymer 3/PMMA bulk film or the PMMA single film obtained in Example 17.
FIG. 26 is a graph showing $^1$H NMR spectrum of the highly branched polymer 13 produced in Example 18.
FIG. 27 is a graph showing $^{13}$C NMR spectrum of the highly branched polymer 13 produced in Example 18.
FIG. 28 is a graph showing $^1$H NMR spectrum of the highly branched polymer 14 produced in Example 19.
FIG. 29 is a graph showing $^{13}$C NMR spectrum of the highly branched polymer 14 produced in Example 19.
FIG. 30 is a graph showing $^1$H NMR spectrum of the highly branched polymer 15 produced in Example 20.
FIG. 31 is a graph showing $^{13}$C NMR spectrum of the highly branched polymer 15 produced in Example 20.
FIG. 32 is a graph showing $^1$H NMR spectrum of the highly branched polymer 16 produced in Example 21.
FIG. 33 is a graph showing $^{13}$C NMR spectrum of the highly branched polymer 16 produced in Example 21.
FIG. 34 is a graph showing $^1$H NMR spectrum of the highly branched polymer 17 produced in Example 22.
FIG. 35 is a graph showing $^{13}$C NMR spectrum of the highly branched polymer 17 produced in Example 22.
FIG. 36 is a graph showing $^1$H NMR spectrum of the highly branched polymer 19 produced in Example 24.
FIG. 37 is a graph showing $^{13}$C NMR spectrum of the highly branched polymer 19 produced in Example 24.
FIG. 38 is a graph showing $^1$H NMR spectrum of the highly branched polymer 20 produced in Example 25.
FIG. 39 is a graph showing $^{13}$C NMR spectrum of the highly branched polymer 20 produced in Example 25.
FIG. 40 is a graph showing $^1$H NMR spectrum of the highly branched polymer 21 produced in Example 26.
FIG. 41 is a graph showing $^{13}$C NMR spectrum of the highly branched polymer 21 produced in Example 26.
FIG. 42 is a graph showing $^1$H NMR spectrum of the highly branched polymer 22 produced in Example 27.
FIG. 43 is a graph showing $^{13}$C NMR spectrum of the highly branched polymer 22 produced in Example 27.
FIG. 44 is a graph showing $^1$H NMR spectrum of the highly branched polymer 23 produced in Example 28.
FIG. 45 is a graph showing $^{13}$C NMR spectrum of the highly branched polymer 23 produced in Example 28.
FIG. 46 is a graph showing $^1$H NMR spectrum of the highly branched polymer 24 produced in Example 29.
FIG. 47 is a graph showing $^{13}$C NMR spectrum of the highly branched polymer 24 produced in Example 29.
FIG. 48 is a graph showing $^1$H NMR spectrum of the highly branched polymer 25 produced in Example 30.

FIG. 49 is a graph showing $^{13}$C NMR spectrum of the highly branched polymer 25 produced in Example 30.

FIG. 50 is a graph showing $^1$H NMR spectrum of the highly branched polymer 26 produced in Example 31.

FIG. 51 is a graph showing $^{13}$C NMR spectrum of the highly branched polymer 26 produced in Example 31.

FIG. 52 is a graph showing $^1$H NMR spectrum of the highly branched polymer 27 produced in Example 32.

FIG. 53 is a graph showing $^{13}$C NMR spectrum of the highly branched polymer 27 produced in Example 32.

FIG. 54 is a graph showing $^1$H NMR spectrum of the highly branched polymer 28 produced in Example 33.

FIG. 55 is a graph showing $^{13}$C NMR spectrum of the highly branched polymer 28 produced in Example 33.

FIG. 56 is a graph showing $^1$H NMR spectrum of the highly branched polymer 29 produced in Example 34.

FIG. 57 is a graph showing $^{13}$C NMR spectrum of the highly branched polymer 29 produced in Example 34.

FIG. 58 is a graph showing $^1$H NMR spectrum of the highly branched polymer 30 produced in Example 35.

FIG. 59 is a graph showing $^{13}$C NMR spectrum of the highly branched polymer 30 produced in Example 35.

FIG. 60 is a graph showing $^1$H NMR spectrum of the highly branched polymer 31 produced in Example 36.

FIG. 61 is a graph showing $^{13}$C NMR spectrum of the highly branched polymer 31 produced in Example 36.

FIG. 62 is a graph showing $^1$H NMR spectrum of the highly branched polymer 32 produced in Comparative Example 2.

FIG. 63 is a graph showing $^{13}$C NMR spectrum of the highly branched polymer 32 produced in Comparative Example 2.

FIG. 64 is a graph showing $^1$H NMR spectrum of the linear polymer 1 produced in Comparative Example 3.

FIG. 65 is a graph showing $^{13}$C NMR spectrum of the linear polymer 1 produced in Comparative Example 3.

FIG. 66 is a graph showing $^{13}$C NMR spectrum of the linear polymer 2 produced in Comparative Example 4.

FIG. 67 is a graph showing $^{13}$C NMR spectrum of the linear polymer 3 produced in Comparative Example 5.

FIG. 68 is a figure showing a photograph of the fine pattern obtained in Example 43 taken under an optical microscope.

FIG. 69 is a figure showing a photograph of the fine pattern obtained in Comparative Example 6 taken under an optical microscope.

FIG. 70 is a figure showing a photograph of the fine pattern obtained in Example 44 taken under an optical microscope.

FIG. 71 is a figure showing a photograph of the fine pattern obtained in Example 44 taken under an optical microscope.

FIG. 72 is a figure showing a photograph of the fine pattern obtained in Comparative Example 7 taken under an optical microscope.

FIG. 73 is a figure showing a photograph of the fine pattern obtained in Comparative Example 7 taken under an optical microscope.

FIG. 74 is a figure showing a photograph of a fine pattern of the silicon mold used in Example 43 and Example 44, and Comparative Example 6 and Comparative Example 7 taken under an optical microscope.

FIG. 75 is a graph showing $^1$H NMR spectrum of the highly branched polymer 33 produced in Example 45.

FIG. 76 is a graph showing $^{13}$C NMR spectrum of the highly branched polymer 33 produced in Example 45.

FIG. 77 is a graph showing $^1$H NMR spectrum of the highly branched polymer 34 produced in Example 46.

FIG. 78 is a graph showing $^{13}$C NMR spectrum of the highly branched polymer 34 produced in Example 46.

FIG. 79 is a graph showing $^1$H NMR spectrum of the highly branched polymer 35 produced in Example 47.

FIG. 80 is a graph showing $^{13}$C NMR spectrum of the highly branched polymer 35 produced in Example 47.

FIG. 81 is a graph showing $^1$H NMR spectrum of the highly branched polymer 36 produced in Example 48.

FIG. 82 is a graph showing $^{13}$C NMR spectrum of the highly branched polymer 36 produced in Example 48.

FIG. 83 is a graph showing $^1$H NMR spectrum of the highly branched polymer 37 produced in Example 49.

FIG. 84 is a graph showing $^{13}$C NMR spectrum of the highly branched polymer 37 produced in Example 49.

FIG. 85 is a graph showing $^1$H NMR spectrum of the highly branched polymer 38 produced in Example 50.

FIG. 86 is a graph showing $^{13}$C NMR spectrum of the highly branched polymer 38 produced in Example 50.

FIG. 87 is a graph showing $^1$H NMR spectrum of the highly branched polymer 39 produced in Example 54.

FIG. 88 is a graph showing $^{13}$C NMR spectrum of the highly branched polymer 39 produced in Example 54.

FIG. 89 is a graph showing $^1$H NMR spectrum of the highly branched polymer 40 produced in Example 55.

FIG. 90 is a graph showing $^{13}$C NMR spectrum of the highly branched polymer 40 produced in Example 55.

FIG. 91 is a graph showing $^1$H NMR spectrum of the highly branched polymer 41 produced in Example 56.

FIG. 92 is a graph showing $^{13}$C NMR spectrum of the highly branched polymer 41 produced in Example 56.

FIG. 93 is a graph showing $^1$H NMR spectrum of the highly branched polymer 42 produced in Example 57.

FIG. 94 is a graph showing $^{13}$C NMR spectrum of the highly branched polymer 42 produced in Example 57.

FIG. 95 is a graph showing $^1$H NMR spectrum of the highly branched polymer 43 produced in Example 58.

FIG. 96 is a graph showing $^{13}$C NMR spectrum of the highly branched polymer 43 produced in Example 58.

BEST MODES FOR CARRYING OUT THE INVENTION

<Fluorine-Containing Highly Branched Polymer>

The fluorine-containing highly branched polymer of the present invention can be obtained by polymerizing a monomer A having two or more radical polymerizable double bonds in the molecule thereof with a monomer B having a fluoroalkyl group and at least one radical polymerizable double bond in the molecule thereof in the presence of a polymerization initiator C in an amount of 5% by mol or more and 200% by mol or less, based on the total molar amount of the monomer A and the monomer B.

The fluorine-containing highly branched polymer of the present invention can be obtained by polymerizing a monomer A having two or more radical polymerizable double bonds in the molecule thereof in the presence of a polymerization initiator C in an amount of 5% by mol or more and 200% by mol or less, relative to 1 mol of the monomer A. At this time, any one of at least a part of the monomer and the polymerization initiator has a fluoroalkyl group in the molecule thereof.

Preferably, the fluorine-containing highly branched polymer of the present invention is obtained by polymerizing a monomer A having two or more radical polymerizable double bonds in the molecule thereof with a monomer B having a fluoroalkyl group and at least one radical polymerizable double bond in the molecule thereof in the presence of a polymerization initiator C in an amount of 5% by mol or more and 200% by mol or less, based on the total molar amount of the monomer A and the monomer B.

Or, the fluorine-containing highly branched polymer of the present invention is obtained by polymerizing a monomer A having two or more radical polymerizable double bonds in the molecule thereof in the presence of a polymerization initiator C having a fluoroalkyl group in the molecule thereof in an amount of 5% by mol or more and 200% by mol or less, relative to 1 mol of the monomer A.

Or, the fluorine-containing highly branched polymer of the present invention is obtained by polymerizing a monomer A having two or more radical polymerizable double bonds in the molecule thereof with a monomer B having a fluoroalkyl group and at least one radical polymerizable double bond in the molecule thereof in the presence of a polymerization initiator C having a fluoroalkyl group in the molecule thereof in an amount of 5% by mol or more and 200% by mol or less, based on the total molar amount of the monomer A and the monomer B.

In the present invention, the monomer A having two or more radical polymerizable double bonds in the molecule thereof has preferably any one of or both of a vinyl group and a (meth)acryl group, and is particularly preferably a divinyl compound or a di(meth)acrylate compound. Here, in the present invention, the (meth)acrylate compound refers to both of an acrylate compound and a methacrylate compound. For example, (meth)acrylic acid refers to acrylic acid and methacrylic acid.

Examples of such a monomer A include organic compounds given in (A-1) to (A-7) below.

(A1) Vinyl hydrocarbon:

(A1-1) Aliphatic vinyl hydrocarbons; isoprene, butadiene, 3-methyl-1,2-butadiene, 2,3-dimethyl-1,3-butadiene, 1,2-polybutadiene, pentadiene, hexadiene, octadiene, and the like (A1-2) Alicyclic vinyl hydrocarbons; cyclopentadiene, cyclohexadiene, cyclooctadiene, norbornadiene, and the like (A1-3) Aromatic vinyl hydrocarbons; divinylbenzene, divinyltoluene, divinylxylene, trivinylbenzene, divinylbiphenyl, divinylnaphthalene, divinylfluorene, divinylcarbazole, divinylpyridine, and the like (A2) Vinyl ester, allyl ester, vinyl ether, allyl ether, and vinyl ketone:

(A2-1) Vinyl esters; divinyl adipate, divinyl maleate, divinyl phthalate, divinyl isophthalate, divinyl itaconate, vinyl (meth)acrylate, and the like (A2-2) Allyl esters; diallyl maleate, diallyl phthalate, diallyl isophthalate, diallyl adipate, allyl (meth)acrylate, and the like (A2-3) Vinyl ethers; divinyl ether, diethylene glycol divinyl ether, triethylene glycol divinyl ether, and the like (A2-4) Allyl ethers; diallyl ether, diallyloxyethane, triallyloxyethane, tetraallyloxyethane, tetraallyloxypropane, tetraallyloxybutane, tetramethallyloxyethane, and the like (A2-5) Vinyl ketones; divinyl ketone, diallyl ketone, and the like (A3) (Meth)acrylic acid ester: ethylene glycol di(meth)acrylate, triethylene glycol di(meth)acrylate, propylene glycol di(meth)acrylate, neopentyl glycol di(meth)acrylate, trimethylolpropane tri(meth)acrylate, ditrimethylolpropane tetra(meth)acrylate, glycerol tri(meth)acrylate, pentaerythritol tetra(meth)acrylate, alkoxytitanium tri(meth)acrylate, 1,6-hexanediol di(meth)acrylate, 2-methyl-1,8-octanediol di(meth)acrylate, 1,9-nonanediol di(meth)acrylate, 1,10-decanediol di(meth)acrylate, tricyclodecanedimethanol di(meth)acrylate, dioxane glycol di(meth)acrylate, 2-hydroxy-1-acryloyloxy-3-methacryloyloxypropane, 2-hydroxy-1,3-di(meth)acryloyloxypropane, 9,9-bis[4-(2-(meth)acryloyloxyethoxy)phenyl]fluorene, undecylenoxy ethyleneglycol di(meth)acrylate, bis[4-(meth)acryloylthiophenyl]sulfide, bis[2-(meth)acryloylthioethyl]sulfide, 1,3-adamantanediol di(meth)acrylate, 1,3-adamantanedimethanol di(meth)acrylate, and the like (A4) Vinyl compound having poly(alkylene glycol) chain: poly(ethylene glycol) (molecular weight: 300) di(meth)acrylate, poly(propylene glycol) (molecular weight: 500) di(meth)acrylate, and the like (A5) Nitrogen-containing vinyl compound: diallyl amine, diallylisocyanurate, diallylcyanurate, methylenebis(meth)acrylamide, bismaleimide, and the like (A6) Silicon-containing vinyl compound: dimethyldivinylsilane, divinylmethylphenylsilane, diphenyldivinylsilane, 1,3-divinyl-1,1,3,3-tetramethyldisilazane, 1,3-divinyl-1,1,3,3-tetraphenyldisilazane, diethoxyvinylsilane, and the like (A7) Fluorine-containing vinyl compound: 1,4-divinylperfluorobutane, 1,6-divinylperfluorohexane, 1,8-divinylperfluorooctane, and the like Among them, preferred are aromatic vinyl hydrocarbon compounds of the group (A1-3), vinyl esters, allyl esters, vinyl ethers, allyl ethers, and vinyl ketones of the group (A2), (meth)acrylic acid esters of the group (A3), vinyl compounds having poly(alkylene glycol) chain of the group (A4), and nitrogen-containing vinyl compounds of the group (A5).

Particularly preferred are divinylbenzene belonging to the group (A1-3), diallyl phthalate belonging to the group (A2), ethylene glycol di(meth)acrylate, 1,3-adamantanedimethanol di(meth)acrylate, and tricyclodecanedimethanol di(meth)acrylate belonging to the group (A3), and methylenebis(meth)acrylamide belonging to the group (A5). Among them, divinylbenzene, ethylene glycol di(meth)acrylate, and tricyclodecanedimethanol di(meth)acrylate are preferred and ethylene glycol di(meth)acrylate is particularly preferred.

In the present invention, the monomer B having a fluoroalkyl group and at least one radical polymerizable double bond in the molecule thereof has preferably at least any one of one vinyl group and one (meth)acryl group, is particularly preferably a compound of Formula [1], and is more preferably a compound of Formula [2].

Examples of such a monomer B include 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl)ethyl (meth)acrylate, 1H,1H,3H-tetrafluoropropyl (meth)acrylate, 1H,1H,5H-octafluoropentyl (meth)acrylate, 1H, 1H,7H-dodecafluoroheptyl (meth)acrylate, 1H,1H,9H-hexadecafluorononyl (meth)acrylate, 1H-1-(trifluoromethyl)trifluoroethyl (meth)acrylate, 1H,1H,3H-hexafluorobutyl (meth)acrylate, 3-perfluorobutyl-2-hydroxypropyl (meth)acrylate, 3-perfluorohexyl-2-hydroxypropyl (meth)acrylate, 3-perfluorooctyl-2-hydroxypropyl (meth)acrylate, 3-(perfluoro-3-methylbutyl)-2-hydroxypropyl (meth)acrylate, 3-(perfluoro-5-methylhexyl)-2-hydroxypropyl (meth)acrylate, and 3-(perfluoro-7-methyloctyl)-2-hydroxypropyl (meth)acrylate.

In the present invention, the ratio between the monomer A and the monomer B that are copolymerized with each other is, from the viewpoints of the reactivity and the surface modification effect, preferably 0.05 mol to 3.0 mol of the monomer B, particularly preferably 0.1 mol to 1.5 mol of the monomer B, relative to 1 mol of the monomer A.

The fluorine-containing highly branched polymer of the present invention may also be produced by copolymerizing, together with the monomer A or together with the monomer A and the monomer B, a monomer E having at least one radical polymerizable double bond and no fluoroalkyl group in the molecule thereof. Preferred examples of such a monomer E include a compound having at least any one of one vinyl group and one (meth)acryl group, and a maleimide compound.

Among them, preferred are a vinyl ether group-containing (meth)acrylate compound such as 2-(2-vinyloxyethoxy) ethylacrylate, an epoxy group-containing (meth)acrylate compound such as glycidyl methacrylate, an alkoxysilyl group-containing (meth)acrylate compound such as 3-methacryloxypropyltriethoxysilane, and a maleimide compound such as cyclohexylmaleimide and N-benzylmaleimide.

In the present invention, the ratio of the monomer E to be copolymerized is, from the viewpoints of the reactivity and the surface modification effect, preferably 0.05 mol to 3.0 mol of the monomer E, particularly preferably 0.1 mol to 1.5 mol of the monomer E, relative to 1 mol of the monomer A.

Preferred examples of the polymerization initiator C of the present invention include azo-based polymerization initiators. Specific examples of the azo-based polymerization initiator include compounds given in (1) to (6) below.

(1) Azonitrile compound: 2,2'-azobisisobutyronitrile, 2,2'-azobis(2-methylbutyronitrile), 2,2'-azobis(2,4-dimethylvaleronitrile), 1,1'-azobis(1-cyclohexanecarbonitrile), 2,2'-azobis(4-methoxy-2,4-dimethylvaleronitrile), 2-(carbamoylazo)isobutyronitrile, and the like (2) Azoamide compound: 2,2'-azobis{2-methyl-N-[1,1-bis(hydroxymethyl)-2-hydroxyethyl]propionamide}, 2,2'-azobis{2-methyl-N-[2-(1-hydroxybutyl)]propionamide}, 2,2'-azobis[2-methyl-N-(2-hydroxyethyl)propionamide], 2,2'-azobis[N-(2-propenyl)-2-methylpropionamide], 2,2'-azobis(N-butyl-2-methylpropionamide), 2,2'-azobis(N-cyclohexyl-2-methylpropionamide), and the like (3) Cyclic azoamidine compound: 2,2'-azobis[2-(2-imidazoline-2-yl)propane]dihydrochloride, 2,2'-azobis[2-(2-imidazoline-2-yl)propane]disulfatedihydrate, 2,2'-azobis[2-[1-(2-hydroxyethyl)-2-imidazoline-2-yl]propane]dihydrochloride, 2,2'-azobis[2-(2-imidazoline-2-yl) propane], 2,2'-azobis(1-imino-1-pyrrolidino-2-methylpropane)dihydrochloride, and the like (4) Azoamidine compound: 2,2'-azobis (2-methylpropionamidine)dihydrochloride, 2,2'-azobis[N-(2-carboxyethyl)-2-methylpropionamidine]tetrahydrate, and the like (5) Other compound: dimethyl 2,2'-azobisisobutyrate, 4,4'-azobis-4-cyanovaleric acid, 2,2'-azobis(2,4,4-trimethylpentane), 1,1'-azobis(1-acetoxy-1-phenylethane), dimethyl 1,1'-azobis(1-cyclohexanecarboxylate), 4,4'-azobis(4-cyanopentanoic acid), and the like (6) Fluoroalkyl group-containing azo-based polymerization initiator: 4,4'-azobis(2-(perfluoromethyl)ethyl 4-cyanopentanoate), 4,4'-azobis(2-(perfluorobutyl)ethyl 4-cyanopentanoate), 4,4'-azobis(2-(perfluorohexyl)ethyl 4-cyanopentanoate), and the like Among the above azo-based polymerization initiators, from the viewpoint of the surface energy of the obtained highly branched polymer, a polymerization initiator having a substituent having a relatively low polarity is preferred, and dimethyl 2,2'-azobisisobutyrate or 2,2'-azobis(2,4,4-trimethylpentane) is particularly preferred.

As the fluoroalkyl group-containing azo-based polymerization initiator, 4,4'-azobis(2-(perfluoromethyl)ethyl 4-cyanopentanoate) and 4,4'-azobis(2-(perfluorohexyl)ethyl 4-cyanopentanoate) can preferably be used.

The polymerization initiator C is used in an amount of 5% by mol to 200% by mol, preferably 15% by mol to 200% by mol, more preferably 15% by mol to 170% by mol, more preferably 50% by mol to 100% by mol, relative to 1 mol of the monomer A or based on the total number of moles of the monomer A and the monomer B.

<Production Method of Fluorine-Containing Highly Branched Polymer>

The fluorine-containing highly branched polymer of the present invention is obtained by polymerizing the monomer A or the monomer A with the monomer B in the presence of a predetermined amount of the polymerization initiator C, and examples of the polymerization method include publicly known methods such as solution polymerization, dispersion polymerization, precipitation polymerization, and bulk polymerization. Among them, solution polymerization or precipitation polymerization is preferred. Particularly in terms of the molecular weight control, the reaction is preferably effected by solution polymerization in an organic solvent.

Examples of the organic solvent used at this time include: an aromatic hydrocarbon solvent such as benzene, toluene, xylene, ethylbenzene, and tetralin; an aliphatic or alicyclic hydrocarbon solvent such as n-hexane, n-heptane, mineral spirits, and cyclohexane; a halogen-based solvent such as methyl chloride, methyl bromide, methyl iodide, methylene dichloride, chloroform, carbon tetrachloride, trichloroethylene, perchloroethylene, and ortho-dichlorobenzene; an ester or ester ether solvent such as ethyl acetate, butyl acetate, methoxybutyl acetate, methylcellosolve acetate, ethylcellosolve acetate, and propylene glycol monomethyl ether acetate; an ether solvent such as diethyl ether, tetrahydrofuran, 1,4-dioxane, methylcellosolve, ethylcellosolve, butylcellosolve, and propylene glycol monomethyl ether; a ketone solvent such as acetone, methyl ethyl ketone, methyl isobutyl ketone, di-n-butyl ketone, and cyclohexanone; an alcohol solvent such as methanol, ethanol, n-propanol, isopropanol, n-butanol, isobutanol, tert-butanol, 2-ethylhexyl alcohol, and benzyl alcohol; an amide solvent such as N,N-dimethylformamide and N,N-dimethylacetamide; a sulfoxide solvent such as dimethylsulfoxide; a heterocyclic compound solvent such as N-methyl-2-pyrrolidone; and a solvent mixture of two or more types thereof.

Among them, preferred are an aromatic hydrocarbon solvent, a halogen-based solvent, an ester solvent, an ether solvent, a ketone solvent, an alcohol solvent, an amide solvent, a sulfoxide solvent, and the like, and particularly preferred are toluene, xylene, ortho-dichlorobenzene, butyl acetate, propylene glycol monomethyl ether acetate, propylene glycol monomethyl ether, 1,4-dioxane, methylcellosolve, methyl isobutyl ketone, N,N-dimethylformamide, N,N-dimethylacetamide, and the like.

When the polymerization reaction is effected in the presence of an organic solvent, the content of the organic solvent in the whole polymerization reactant is preferably 1 to 100 part(s) by mass, more preferably 5 to 50 parts by mass, relative to 1 part by mass of the monomer A.

The polymerization reaction is effected under normal pressure, under pressurized pressure in a closed system, or under reduced pressure, and in terms of easiness of the apparatus and the operation, the polymerization reaction is preferably effected under normal pressure. The polymerization reaction is more preferably effected in an inert gas atmosphere such as N₂.

The temperature for the polymerization reaction is preferably 50 to 200° C., more preferably 70 to 150° C.

More preferably, the polymerization reaction is effected at a temperature higher than a temperature for the 10 hours half-life of the polymerization initiator C by 20° C. or more, and more specifically, the polymerization reaction is preferably effected by dropping a solution containing the monomer A, the monomer B, the polymerization initiator C, and an organic solvent into the organic solvent maintained at a temperature higher than a temperature for the 10 hours half-life of the polymerization initiator C by 20° C. or more.

Furthermore preferably, the polymerization reaction is effected at a reflux temperature of the organic solvent under the reaction pressure.

After the completion of the polymerization reaction, the obtained fluorine-containing highly branched polymer is recovered by an arbitrary method, and if necessary, the highly branched polymer is subjected to post-treatment such as washing. Examples of the method for recovering the polymer from the reaction solution include a method of re-precipitation.

Here, also by: polymerizing a monomer A containing no fluoroalkyl group in the molecule thereof in the presence of a predetermined amount of a polymerization initiator C containing no fluoroalkyl group in the molecule thereof to produce a highly branched polymer containing no fluorine; and then reacting the obtained highly branched polymer containing no fluorine with a fluoroalkyl group-containing alcohol D, a fluorine-containing highly branched polymer can be produced. The here used polymerization initiator C is preferably a polymerization initiator containing carboxylic acid at a terminal thereof so that the polymerization initiator can be subjected to a condensation reaction with the fluoroalkyl group-containing alcohol D.

Examples of the fluoroalkyl group-containing alcohol D used here include 1H,1H-trifluoroethanol, 1H,1H-pentafluoroethanol, 2-(perfluorobutyl)ethanol, 3-(perfluorobuty)propanol, 2-(perfluorohexyl)ethanol, 3-(perfluorohexyl)propanol, 1H,1H,3H-tetrafluoropropanol, 1H,1H,5H-octafluoropentanol, 1H,1H,7H-dodecafluoroheptanol, 2H-hexafluoro-2-propanol, and 1H,1H,3H-hexafluorobutanol.

Here, the used amount of the fluoroalkyl group-containing alcohol D is 0.05 mol to 3.0 mol, particularly preferably 0.1 mol to 1.5 mol, relative to 1 mol of the monomer A.

The actual reaction is effected by: dissolving a highly branched polymer containing no fluorine and a fluoroalkyl group-containing alcohol D in an appropriate solvent (such as DMF and DMAc) capable of dissolving these compounds; and subjecting the resultant solution to a condensation reaction in the presence of a catalyst such as 4,4'-dimethylaminopyridine (DMAP) and triethylamine and in the presence of a dehydration agent such as N,N'-diisopropylcarbodiimide (DIC) and N,N'-dicyclohexylcarbodiimide (DCC).

The condensation reaction is effected under normal pressure, under pressurized pressure in a closed system, or under reduced pressure, and in terms of easiness of the apparatus and the operation, the condensation reaction is preferably effected under normal pressure. The condensation reaction is more preferably effected in an inert gas atmosphere such as N₂.

The temperature for the condensation is preferably room temperature (about 25° C.) to 200° C., more preferably 50 to 150° C.

The weight average molecular weight (hereinafter, abbreviated as Mw) of the obtained fluorine-containing highly branched polymer measured by gel permeation chromatography (GPC) in terms of polystyrene is preferably 1,000 to 200,000, more preferably 2,000 to 100,000, most preferably 5,000 to 60,000.

<Production Method of Varnish and Thin Film>

A specific method for forming a thin film containing the fluorine-containing highly branched polymer of the present invention is: firstly dissolving or dispersing the fluorine-containing highly branched polymer in a solvent to convert the highly branched polymer into a varnish state (film forming material) thereof; applying the varnish on a substrate by a cast coating method, a spin coating method, a blade coating method, a dip coating method, a roll coating method, a bar coating method, a die coating method, an inkjet method, a printing method (such as letterpress-, plate-, planographic-, and screen-printing), or the like; and then drying the varnish on a hotplate, in an oven, or the like to form a film.

Among these coating methods, a spin coating method is preferred. When the spin coating method is used, the coating can be performed in a short time, so that a high-volatile solution can also be utilized and there is such an advantage as capable of performing a coating having high homogeneity.

The solvent used for converting the highly branched polymer into a varnish state may be a solvent capable of dissolving the fluorine-containing highly branched polymer and examples thereof include acetone, tetrahydrofuran (THF), toluene, N,N-dimethylformamide (DMF), cyclohexanone, propylene glycol monomethyl ether (PGME), propylene glycol monomethyl ether acetate (PGMEA), propylene glycol monoethyl ether, ethyl lactate, diethylene glycol monoethyl ether, butylcellosolve, γ-butyrolactone, and 1,1,2,3,3,3-hexafluoropropyl=3,3,4,5,5,5-hexafluoro-2-pentyl=ether. These solvents may be used individually or in combination of two or more types thereof.

Although the concentration of the fluorine-containing highly branched polymer dissolved or dispersed in the above solvent is arbitrary, the concentration of the fluorine-containing highly branched polymer is 0.001 to 90% by mass, preferably 0.002 to 80% by mass, more preferably 0.005 to 70% by mass, based on the total mass of the fluorine-containing highly branched polymer and the solvent.

Although the thickness of the formed thin film containing the fluorine-containing highly branched polymer is not particularly limited, the thickness is ordinarily 0.01 μm to 50 μm, preferably 0.05 μm to 20 μm.

<Photopolymerizable Composition and Molded Article Produced Therefrom>

The present invention also relates to a photopolymerizable composition containing the fluorine-containing highly branched polymer (a), a photopolymerizable compound (b), and a photopolymerization initiator (c).

The photopolymerizable compound (b) is not particularly limited so long as the photopolymerizable compound is a compound having one or more, preferably one to six polymerizable moiety(ies) to be polymerized by an action of a photopolymerization initiator in the molecule thereof. Here, in the present invention, the polymerizable compound means a compound that is not a so-called polymer substance and encompasses not only a monomer compound (monomer) in the narrow sense, but also a dimer, a trimer, an oligomer, and a reactive polymer.

Examples of the polymerizable moiety include a radical polymerizable moiety such as an ethylenic unsaturated bond, and a cation-polymerizable moiety such as a vinyl ether structure, a vinyl thioether structure, and a cyclic ether structure such as an epoxy ring and an oxetane ring. Accordingly, examples of the photopolymerizable compound include a compound having a radical polymerizable moiety such as an ethylenic unsaturated bond and a compound having a cation-polymerizable moiety such as a vinyl ether structure, an epoxy ring, and an oxetane ring.

Among the above photopolymerizable compounds, preferred is a multifunctional (meth)acrylate compound having two or more (meth)acryl groups having an ethylenic unsaturated bond moiety.

Examples of such a polymerizable compound include (A3) a (meth)acrylic acid ester and (A4) a vinyl compound having a poly(alkylene glycol) chain both of which are exemplified above with respect to the monomer A.

Among them, preferred are tricyclodecanedimethanol di(meth)acrylate, ethylene glycol di(meth)acrylate, trimethylolpropane tri(meth)acrylate, ditrimethylolpropane tetra (meth)acrylate, pentaerythritol tetra(meth)acrylate, dipentaerythritol hexa(meth)acrylate, 1,6-hexanediol di(meth) acrylate, dioxane glycol di(meth)acrylate, 9,9-bis[4-(2-(meth)acryloyloxyethoxy)phenyl]fluorene, and ethoxylated bisphenol A (meth)acrylate, and particularly preferred is tricyclodecanedimethanol di(meth)acrylate.

Examples of the compound having a vinyl ether structure include 2-chloroethyl=vinyl=ether, n-butyl vinyl ether, triethylene glycol divinyl ether, 1,4-cyclohexanedimethanol divinyl ether, trimethylolethane trivinyl ether, and vinyl glycidyl ether.

Examples of the compound having an epoxy ring include diglycerol polyglycidyl ether, pentaerythritol polyglycidyl ether, 1,4-bis(2,3-epoxypropoxyperfluoroisopropyl)cyclohexane, sorbitol polyglycidyl ether, trimethylolpropane polyglycidyl ether, resorcin diglycidyl ether, 1,6-hexanediol diglycidyl ether, poly(ethylene glycol) diglycidyl ether, phenyl glycidyl ether, p-tert-butylphenyl glycidyl ether, adipic acid diglycidyl ester, o-phthalic acid diglycidyl ester, dibromophenyl glycidyl ether, 1,2,7,8-diepoxyoctane, 1,6-dimethylolperfluorohexane diglycidyl ether, 4,4'-bis(2,3-epoxypropoxyperfluoroisopropyl) diphenyl ether, 2,2-bis(4-glycidyloxyphenyl)propane, 3,4-epoxycyclohexylmethyl-3', 4'-epoxycyclohexane carboxylate, 3,4-epoxycyclohexenylmethyl-3',4'-epoxycyclohexene carboxylate, 3,4-epoxycyclohexyloxysilane, 2-(3,4-epoxycyclohexyl)-3',4'-epoxy-1,3-dioxane-5-spirocyclohexane, 1,2-ethylenedioxybis(3,4-epoxycyclohexylmethane), 4',5'-epoxy-2'-methylcyclohexylmethyl-4,5-epoxy-2-methylcyclohexane carboxylate, ethylene glycol bis(3,4-epoxycyclohexane carboxylate), bis(3,4-epoxycyclohexylmethyl) adipate, di-2,3-epoxycyclopentyl ether, EHPE 3150 (trade name; manufactured by Daicel Chemical Industries, Ltd.), and 157 S 70 (trade name; manufactured by Mitsubishi Chemical Corporation).

Examples of the compound having an oxetane ring include: a compound having one oxetane ring such as 3-ethyl-3-hydroxymethyloxetane, 3-ethyl-3-(phenoxymethyl)oxetane, 3,3-diethyloxetane, and 3-ethyl-3-(2-ethylhexyloxymethyl)oxetane; and a compound having two or more oxetane rings such as 1,4-bis{[(3-ethyl-3-oxetanyl) methoxy]methyl}benzene, di(3-ethyl-3-oxetanylmethyl) ether, and pentaerythritoltetrakis(3-ethyl-3-oxetanylmethyl) ether.

As the photopolymerization initiator (c), a publicly known photopolymerization initiator can be used and examples thereof include benzoins, benzophenones, benzylketals, α-hydroxyketones, α-aminoketones, acylphosphine oxides, thioxanthones, iodonium salts, and sulfonium salts. Specific examples thereof include: IRGACURE (registered trade mark) 184, ditto 369, ditto 500, ditto 651, ditto 784, ditto 819, ditto 907, ditto 1000, ditto 1300, ditto 1700, ditto 1800, ditto 1850, and ditto 2959, and DAROCUR (registered trade mark) 1173 (until here, trade names; manufactured by Ciba Japan K.K.); ADEKA OPTOMER SP-170 and ditto CP-77 (manufactured by Adeka Corporation); and ESACURE (registered trade mark) 1720 (manufactured by Lamberti S.p.A.), and the specific examples are not limited to these photopolymerization initiators. Such photopolymerization initiators may also be used in a combination of a plurality of types thereof.

When, as the photopolymerizable compound, a compound having a cation-polymerizable moiety such as a vinyl ether structure, an epoxy ring, or an oxetane ring is used, as the photopolymerization initiator, there is fundamentally used a photo acid generator generating a Lewis acid or a Brønsted acid during exposure.

Although the photo acid generator is not particularly limited so long as the photo acid generator is a compound generating a Lewis acid or a Brønsted acid during exposure, examples thereof include: an onium salt compound such as a diaryl iodonium salt compound, a triaryl sulfonium salt compound, and a diazonium salt compound; and an iron-arene complex compound.

Examples of the diaryl iodonium salt compound include tetrafluoroborate, hexafluorophosphate, hexafluoroarsenate, and hexafluoroantimonate of an iodonium such as diphenyliodonium, 4,4'-dichlorodiphenyliodonium, 4,4'-dimethoxydiphenyliodonium, 4,4'-di-tert-butyldiphenyliodonium, (4-methylphenyl)[4-(2-methylpropyl)phenyl]iodonium, and 3,3'-dinitrophenyliodonium.

Examples of the triaryl sulfonium salt compound include tetrafluoroborate, hexafluorophosphate, hexafluoroarsenate, and hexafluoroantimonate of a sulfonium such as triphenylsulfonium, 4-tert-butyltriphenylsulfonium, tris(4-methylphenyl)sulfonium, tris(4-methoxyphenyl)sulfonium, and 4-thiophenyltriphenylsulfonium.

Examples of the iron-arene complex compound include biscyclopentadienyl-($\eta^6$-isopropylbenzene)-iron(II) hexafluorophosphate.

In the photopolymerizable composition, the blending amounts of the fluorine-containing highly branched polymer (a), the photopolymerizable compound (b), and the photopolymerization initiator (c) are as follows.

That is, the amount of the fluorine-containing highly branched polymer (a) is preferably 0.01% by mass to 20% by mass, particularly preferably 0.1% by mass to 20% by mass, based on the mass of the photopolymerizable compound (b).

The amount of the photopolymerization initiator (c) is preferably 0.1% by mass to 20% by mass, preferably 0.5% by mass to 10% by mass, based on the mass of the photopolymerizable compound (b). When the blending amounts are within the above range, the photopolymerizable compound (b) can be polymerized without lowering the transmittance of the resultant polymer.

In the photopolymerizable composition, if necessary, there may be accordingly blended, so long as the effect of the present invention is not impaired, additives that are generally blended such as a photosensitizer, a polymerization inhibitor, a polymerization initiator, a leveling agent, a surfactant, an adhesion imparting agent, a plasticizer, an ultraviolet-ray absorber, an antioxidant, a storage stabilizer, an antistatic agent, an inorganic filler, a pigment, and a dye.

The photopolymerizable composition of the present invention can be converted into a molded article such as a cured film and a laminate by applying the composition on a base material and by photopolymerizing (curing) the composition.

Examples of the base material include a plastic (such as polycarbonate, polymethacrylate, polystyrene, polyester, polyolefin, epoxy, melamine, triacetyl cellulose, ABS, AS, and norbornene-based resins), a metal, a wood, a paper, a glass, and a slate. The shape of these base materials may be a plate-shape, a film-shape, or a 3-D molded article-shape.

As the coating method of the photopolymerizable composition of the present invention, various coating methods described above in <Production method of varnish and thin film> may be used. Here, the photopolymerizable composition is preferably filtered using a filter having a pore diameter of around 0.2 μm or the like beforehand to be applied.

After coating, subsequently, the photopolymerizable composition is preferably pre-dried on a hot plate, in an oven, or the like and then is irradiated with an active light ray such as an ultraviolet ray to be photo-cured. Examples of the active light ray include an ultraviolet ray, an electron beam, and an X-ray. Examples of the light source capable of being used for an ultraviolet ray irradiation include a solar light ray, a chemical lamp, a low pressure mercury vapor lamp, a high pressure mercury vapor lamp, a metal halide lamp, and a xenon lamp.

Then, the composition is subjected to post-bake, specifically is heated using a hot plate, an oven, or the like, so that the polymerization can be completed.

Here, the film thickness of the resultant coating after drying and curing is ordinarily 0.01 μm to 50 μm, preferably 0.05 μm to 20 μm.

<Resin Composition and Molded Article Produced Therefrom>

The present invention also relates to a resin composition containing the fluorine-containing highly branched polymer (a) and the thermoplastic resin or thermosetting resin (d).

Although the thermoplastic resin is not particularly limited, examples thereof include: a polyolefin-based resin such as PE (polyethylene), PP (polypropylene), EVA (ethylene-vinyl acetate copolymer), and EEA (ethylene-ethyl acrylate copolymer); a polystyrene-based resin such as PS (polystyrene), HIPS (high impact polystyrene), AS (acrylonitrile-styrene copolymer), ABS (acrylonitrile-butadiene-styrene copolymer), and MS (methyl methacrylate-styrene copolymer); a polycarbonate resin; a vinyl chloride resin; a polyamide resin; a polyimide resin; a (meth)acrylic resin such as PMMA (poly(methyl methacrylate)); a polyester resin such as PET (poly(ethylene terephthalate)), poly(butylene terephthalate), poly(ethylene naphthalate), poly(butylene naphthalate), PLA (poly(lactic acid)), poly(3-hydroxybutyric acid), polycaprolactone, poly(butylene succinate), and poly(ethylene succinate/adipate); a poly(phenylene ether) resin; a modified poly(phenylene ether) resin; a polyacetal resin; a polysulfone resin; a poly(phenylene sulfide) resin; a polyvinylalcohol resin; a poly(glycolic acid); a modified starch; cellulose acetate and cellulose triacetate; chitin and chitosan; lignin; and a silicone resin such as a methyl-based silicone resin, a methylphenyl-based silicone resin, and a modified silicone resin.

Among them, a polyimide resin, a (meth)acrylic resin, a polyester resin, and a silicone resin are preferred, and a poly(methyl methacrylate) resin or a poly(lactic acid) resin is more preferred.

Here, when the thermoplastic resin is a silicone resin, a reaction accelerator is preferably blended in the resin composition.

Although the reaction accelerator is not particularly limited, examples thereof include: an organic metal compound containing aluminum, titanium, tin, or the like; an inorganic or organic acid such as sulfuric acid, hydrochloric acid, acetic acid, and phosphoric acid; an alkali such as sodium hydroxide and potassium hydroxide; and an amine compound such as ammonia, diethanolamine, and triethanolamine.

When the thermoplastic resin is a silicone resin, in terms of enhancing the dispersibility of the fluorine-containing highly branched polymer in the thermoplastic resin, the fluorine-containing highly branched polymer is preferably a fluorine-containing highly branched polymer having an alkoxysilyl structure in the molecule thereof.

Examples of the polyimide resin include a polyimide resin produced from an acid dianhydride component such as ethylenetetracarboxylic acid dianhydride, cyclobutanetetracarboxylic acid dianhydride, pyromellitic acid dianhydride, 3,3'4,4'-benzophenonetetracarboxylic acid dianhydride, and 2,2',3,3'-biphenyltetracarboxylic acid dianhydride, and a diamine component such as p-phenylenediamine, m-phenylenediamine, o-phenylenediamine, 3,4'-diaminodiphenyl ether, 4,4'-diaminodiphenyl ether, 3,3'-diaminodiphenylsulfide, 4,4'-diaminodiphenylsulfone, 3,3',4,4'-diaminobenzophenone, and 4,4'-diaminodiphenylmethane.

When the thermoplastic resin is a polyimide resin, in terms of enhancing the dispersibility of the fluorine-containing highly branched polymer in the thermoplastic resin, the fluorine-containing highly branched polymer is preferably a fluorine-containing highly branched polymer having an imide structure in the molecule thereof.

Although the thermosetting resin is also not particularly limited, examples thereof include a phenolic resin, a urea resin, a melamine resin, an unsaturated polyester resin, a polyurethane resin, and an epoxy resin.

Examples of the epoxy resin include: a bisphenol-based epoxy resin such as a bisphenol A-based epoxy resin, a bisphenol F-based epoxy resin, a bisphenol S-based epoxy resin, and a halogenated bisphenol A-based epoxy resin; a dimer acid glycidyl ester-based epoxy resin; a polyalkylene ether-based epoxy resin; a novolac-based epoxy resin such as a phenolnovolac-based epoxy resin and an ortho-cresol-novolac-based epoxy resin; a biphenyl-based epoxy resin; an alicyclic epoxy resin such as a dicyclopentadiene-based epoxy resin; a naphthol-based epoxy resin; a naphthalene-based epoxy resin; a heterocycle-containing epoxy resin; a diglycidyl epoxy resin; and a glycidylamine-based epoxy resin.

Among them, an alicyclic epoxy resin or a novolac-based epoxy resin is preferred.

Here, when the thermosetting resin is an epoxy resin, a curing agent is preferably blended in the resin composition.

Although the curing agent is not particularly limited, examples thereof include an organic acid anhydride, a phenol resin, aliphatic amines, aromatic amines, and dicyandiamides. Among them, the organic acid anhydride is preferred. When the thermosetting resin is an epoxy resin, in terms of enhancing the dispersibility of the fluorine-containing highly branched polymer in the thermosetting resin, the fluorine-containing highly branched polymer is preferably a fluorine-containing highly branched polymer having an alicyclic structure such as adamantane, tricyclodecane, and cyclohexane, or an epoxy group and/or a hydroxy group in the molecule thereof.

Examples of the organic acid anhydride include tetrahydrophthalic anhydride, methyltetrahydrophthalic anhydride, hexahydrophthalic anhydride, methylhexahydrophthalic anhydride, nadic anhydride, methylnadic anhydride, trialkyltetrahydrophthalic anhydride, phthalic anhydride, trimellitic anhydride, pyromellitic anhydride, benzophenonetetracarboxylic anhydride, dodecenylsuccinic anhydride, ethylene glycol anhydrotrimellitate, and glycerol tris(anhydrotrimellitate).

In the resin composition, the blending amount of the fluorine-containing highly branched polymer (a) is preferably 0.01% by mass to 20% by mass, particularly preferably 0.1% by mass to 20% by mass, based on the mass of the thermoplastic resin or thermosetting resin (d).

In the resin composition, there can be used, in combination with the thermoplastic resin or the thermosetting resin, a generally added adhesive such as an antistatic agent, a lubricant, a heat stabilizer, an antioxidant, a light stabilizer, a fluorescer, a processing assistant, a crosslinker, a dispersant, a foaming agent, a flame retardant, an antifoamer, a reinforcer, and a pigment.

The resin composition of the present invention can obtain a resin-molded article such as a film, a sheet, or a molded article by an arbitrary molding method such as injection molding, extrusion molding, press molding, and blow molding.

The resin-molded article of the present invention is, as described above, in a state in which the fluorine-containing highly branched polymer exists in a larger amount in the surface (interface) of a molded article than in the inside (deep part) of the molded article. Therefore, the resin-molded article of the present invention can be produced as a molded article excellent in mold release property relative to various machines such as a mixing/molding machine used for the production of the molded article and a mold, peeling property relative to other resin-molded articles such as a film, and water-repellent/oil-repellent property and antifouling property.

Hereinafter, the present invention will be described more specifically referring to Examples, which should not be construed as limiting the scope of the present invention.

Here, the apparatuses and the conditions used for the preparation of the sample and the analysis of the physical properties are as follows.

(1) Gel Permeation Chromatography (GPC)
Apparatus: manufactured by Tosoh Corporation; HLC-8220 GPC
Column: Shodex KF-804L, KF-805L
Column temperature: 40° C.
Solvent: tetrahydrofuran
Detector: RI
(2) $^1$H NMR Spectrum and $^{13}$C NMR Spectrum
Apparatus: manufactured by JEOL Datum Ltd.; JNM-ECA 700
Solvent: CDCl$_3$
Internal standard: tetramethylsilane
(3) Ion Chromatography (F Quantitative Analysis)
Apparatus: manufactured by Nippon Dionex K.K.; ICS-1500
Solvent: 2.7 mmol/L Na$_2$CO$_3$+0.3 mmol/L NaHCO$_3$
Detector: electric conductivity
(4) Glass Transition Temperature (Tg) Measurement
Apparatus: manufactured by PerkinElmer, Inc.; Diamond DSC
Measuring condition: in a nitrogen atmosphere
Heating rate: 5° C./min (25 to 160° C.)
(5) 5% Weight Loss Temperature (Td$_5$%) Measurement
Apparatus: manufactured by Rigaku Corporation; TG 8120
Measuring condition: in an air atmosphere
Heating rate: 10° C./min (25 to 500° C.)
(6) Ellipsometry (Measurement of Refractive Index and Film Thickness)
Apparatus: manufactured by J. A. Woollam Co., Inc.; ESM-300
(7) Contact Angle Measurement
Apparatus: manufactured by AST Products, Inc.; VCA Optima
Measuring solvent: water and diiodomethane
Measuring temperature: 20° C.
(8) Spin Coater
Apparatus 1: manufactured by Mikasa Co., Ltd.; MS-A 100 Apparatus 2 (Example 16): manufactured by Kyowariken Co., Ltd.; spin coater K-359 SD2
(9) Hot Plate
Apparatus: manufactured by AS ONE Corporation; MH-180CS, MH-3CS
(10) UV Irradiation Apparatus
Apparatus: manufactured by EYE GRAPHICS Co., Ltd.; H02-L41
(11) High-Precision Microfigure Measuring Instrument (Film Thickness Measurement)
Apparatus: manufactured by Kosaka Laboratory Ltd.; ET-4000A
(12) Haze Meter (Total Light Transmittance and Haze Measurement)
Apparatus: manufactured by Nippon Denshoku Industries Co., Ltd.; NDH 5000
(13) Vacuum-Heating
Apparatus: manufactured by Tokyo Rikakikai Co., Ltd.; Vacuum drying oven VOS-201 SD
(14) Press Molding
Apparatus: manufactured by Tester Sangyo Co., Ltd.; Tabletop test press type-S SA-303-II-S
(15) X-Ray Photoelectron Spectroscopy (XPS)
Apparatus: manufactured by Physical Electronics, Inc.; PHI ESCA 5800
X-ray source: monochromatized Al Kα ray (2 mmφ)
X-ray output: 200 W, 14 mA
Photoelectron discharge angle: 45°
(16) Tension Tester
Apparatus: manufactured by A&D Company, Limited; TENSILON universal material testing instrument
(17) Doctor Blade (for Preparation of Coating Film)
Apparatus: manufactured by Yoshimitsu Seiki Co., Ltd.; doctor blade model-YD-1 (coating thickness: 1 mil)
(18) Prism Coupler (Film Thickness Measurement)
Apparatus: manufactured by Metricon Corporation; MODEL 2010 PRISM COUPLER
(19) Nano-Imprinting Apparatus
Apparatus: manufactured by Meisyo Kiko Co., Ltd.; NANOIMPRINTER NM-0801HB
Abbreviated symbols mean as follows.
EGDMA: ethylene glycol dimethacrylate (manufactured by Shin-Nakamura Chemical Co., Ltd., trade name: 1G)
DVB: divinylbenzene (manufactured by Nippon Steel Chemical Co., Ltd.; trade name: DVB-960)

DCP: tricyclodecanedimethanol dimethacrylate (manufactured by Shin-Nakamura Chemical Co., Ltd.; trade name: DCP)

PGHM: 2-hydroxy-1,3-dimethacryloxypropane (manufactured by Shin-Nakamura Chemical Co., Ltd.; trade name: 701)

ADM: 1,3-adamantanedimethanol dimethacrylate (manufactured by Idemitsu Kosan Co., Ltd.)

MMA: methyl methacrylate (manufactured by Junsei Chemical Co., Ltd.)

C4FHM: 1H,1H,5H-octafluoropentyl methacrylate (manufactured by Osaka Organic Chemical Industry Ltd.; trade name: V-8FM)

C4FHA: 1H,1H,5H-octafluoropentyl acrylate (manufactured by Osaka Organic Chemical Industry Ltd.; trade name: V-8F)

C6FHA: 1H,1H,7H-dodecafluoroheptyl acrylate (manufactured by Daikin Chemical Sales, Ltd.; trade name: R-5610)

C4FA: 2-(perfluorobutyl)ethyl acrylate (manufactured by Daikin Chemical Sales, Ltd.; trade name: R-1420)

C6FM: 2-(perfluorohexyl)ethyl methacrylate (manufactured by Daikin Chemical Sales, Ltd.; trade name: M-1620)

C6FA: 2-(perfluorohexyl)ethyl acrylate (manufactured by Daikin Chemical Sales, Ltd.; trade name: R-1620)

VEEA: 2-(2-vinyloxyethoxy)ethyl acrylate (manufactured by Nippon Shokubai Co., Ltd.; trade name: VEEA)

GMA: glycidyl methacrylate (manufactured by Junsei Chemical Co., Ltd.)

TESMA: 3-methacryloxypropyltriethoxysilane (manufactured by Shin-Etsu Chemical Co., Ltd.; trade name: KBE-503)

CHMI: cyclohexylmaleimide (manufactured by Tokyo Chemical Industry Co., Ltd.)

BMI: N-benzylmaleimide (manufactured by Tokyo Chemical Industry Co., Ltd.)

MAIB: dimethyl 2,2'-azobisisobutyrate (manufactured by Otsuka Chemical Co., Ltd.; trade name: MAIB)

DCHC: dimethyl 1,1'-azobis(1-cyclohexane carboxylate) (manufactured by Wako Pure Chemical Industries, Ltd.; trade name: VE-073)

AMBN: 2,2'-azobis(2-methylbutyronitrile) (manufactured by Wako Pure Chemical Industries, Ltd.; trade name: V-59)

AF1: 4,4'-azobis(2-(perfluoromethyl)ethyl 4-cyanopentanoate) (manufactured by Wako Pure Chemical Industries, Ltd.; AE-041)

AF6: 4,4'-azobis(2-(perfluorohexyl)ethyl 4-cyanopentanoate) (manufactured by Wako Pure Chemical Industries, Ltd.; ACVA-PFO)

AVCA: 4,4'-azobis(4-cyanopentanoic acid) (manufactured by Wako Pure Chemical Industries, Ltd.; trade name: V-501)

C4FOH: 2-(perfluorobutyl)ethanol (manufactured by Daikin Chemical Sales, Ltd.; trade name: A-1420)

C6FOH: 2-(perfluorohexyl)ethanol (manufactured by Daikin Chemical Sales, Ltd.; trade name: A-1620)

DMAP: 4,4'-dimethylaminopyridine (manufactured by Wako Pure Chemical Industries, Ltd.)

DIC: N,N'-diisopropylcarbodiimide (manufactured by Tokyo Chemical Industry Co., Ltd.)

A-DCP: tricyclodecanedimethanol diacrylate (manufactured by Shin-Nakamura Chemical Co., Ltd.; trade name: A-DCP)

TPTA: trimethylolpropane triacrylate (manufactured by Shin-Nakamura Chemical Co., Ltd.; trade name: A-TMPT)

AD-TMP: ditrimethylolpropane tetraacrylate (manufactured by Shin-Nakamura Chemical Co., Ltd.; trade name: AD-TMP)

Irg. 907: 2-methyl-1-[4-(methylthio)phenyl]-2-morpholinopropane-1-one (manufactured by Ciba Japan K.K.; trade name: Ciba IRGACURE 907)

Irg. 651: 2,2'-dimethoxy-1,2-diphenylethane-1-one (manufactured by Ciba Japan K.K.; trade name: IRGACURE 651)

Irg. 184: 1-hydroxycyclohexyl phenyl ketone (manufactured by Ciba Japan K.K.; trade name: IRGACURE 184)

Dar. 1173: 2-hydroxy-2-methyl-1-phenylpropane-1-one (manufactured by Ciba Japan K.K.; trade name: DAROCURE 1173)

SP-170: cation-based polymerization initiator (manufactured by Adeka Corporation; trade name: ADEKA OPTOMER SP-170)

CP-77: cation-based polymerization initiator (manufactured by Adeka Corporation; trade name: ADEKA OPTOMER CP-77)

ESACURE 1720: cation-based polymerization initiator (manufactured by Lamberti S.p.A.; trade name: ESACURE 1720)

MCHDC: 4-methylcyclohexane-1,2-dicarboxylic anhydride (manufactured by Tokyo Chemical Industry Co., Ltd.)

PLA: poly(lactic acid) (manufactured by Mitsui Chemicals, Inc.; trade name: LACEA; Mw (GPC): 160,000)

PMMA: poly(methyl methacrylate) (manufactured by Wako Pure Chemical Industries, Ltd.; Mw (GPC): 111,000)

CEL 2021P: 3,4-epoxycyclohexenylmethyl 3',4'-epoxycyclohexene carboxylate (manufactured by Daicel Chemical Industries, Ltd.; trade name: Celloxide 2021P)

P22S: thermoplastic polyurethane elastomer (manufactured by Nippon Miractran Co., Ltd.; trade name: P22SRNAT)

N5257: polyurethane solution for coating (manufactured by Nippon Polyurethane Industry Co., Ltd.; trade name: NIPPOLAN N5257)

KR-400: room temperature curable silicone resin (manufactured by Shin-Etsu Chemical Co., Ltd.; trade name: KR-400)

EHPE3150: alicyclic solid epoxy resin (manufactured by Daicel Chemical Industries, Ltd.; trade name: EHPE3150)

157S70: novolac-based epoxy resin (manufactured by Mitsubishi Chemical Corporation; trade name: 157S70)

PAA varnish: poly(amic acid) NMP solution (concentration: 12% by mass, viscosity: 358 mPa·s (20° C.)) obtained from 1,2,3,4-cyclobutanetetracarboxylic dianhydride/4,4'-diaminodiphenyl ether=1/1 (molar ratio)

SPI: soluble polyimide (imidated rate: 86%) obtained from 3,4-dicarboxy-1,2,3,4-tetrahydro-1-naphthalenesuccinic dianhydride/p-phenylenediamine/1,3-diamino-4-octadecyloxybenzene=10/9/1 (molar ratio)

F-552: commercially available fluorinated surface modifier (manufactured by DIC Corporation; trade name: MEGAFAC F-552)

F-554: commercially available fluorinated surface modifier (manufactured by DIC Corporation; trade name: MEGAFAC F-554)

The organic solvents used in Examples are as follows.

Toluene: manufactured by Kanto Chemical Co., Inc.; first grade

Hexane: manufactured by Kanto Chemical Co., Inc.; first grade

THF (tetrahydrofuran): manufactured by Kanto Chemical Co., Inc.; first grade

PGMEA (propylene glycol monomethyl ether acetate): manufactured by Tokyo Chemical Industry Co., Ltd.

EGME (2-methoxyethanol): manufactured by Junsei Chemical Co., Ltd.; special grade HFE (hydrofluoro ether): manufactured by Sumitomo 3M Limited; trade name: Novec HFE-7600

IPE (diisopropyl ether): manufactured by Junsei Chemical Co., Ltd.; special grade Acetone: manufactured by Kanto Chemical Co., Inc.

MEK: manufactured by Kanto Chemical Co., Inc.; special grade

MIBK (4-methyl-2-pentanone): manufactured by Junsei Chemical Co., Ltd.; special grade DMF (N,N-dimethylformamide): manufactured by Kanto Chemical Co., Inc.; first grade DMAc (N,N-dimethylacetamide): manufactured by Junsei Chemical Co., Ltd.; special grade Methanol: manufactured by Kanto Chemical Co., Inc.; special grade Ethanol: manufactured by Kanto Chemical Co., Inc.; Cica first grade IPA (2-propyl alcohol): manufactured by Kanto Chemical Co., Inc.; Cica first grade Chloroform: manufactured by Kanto Chemical Co., Inc.; Cica first grade Cyclopentanone: manufactured by Kanto Chemical Co., Inc.

NMP (N-methyl-2-pyrrolidone): manufactured by Kanto Chemical Co., Inc.

BA (ethylene glycol monobutyl ether): manufactured by Tokyo Chemical Industry Co., Ltd.

Example 1

<Synthesis of Highly Branched Polymer 1 Using EGDMA, C4FHM, and MAIB>

Into a 300 mL reaction flask, 87 g of toluene was charged, and while stirring toluene, nitrogen was flowed into the flask for 5 minutes, followed by heating the flask until the inside liquid was refluxed (at a temperature of about 110° C.).

Separately, into a 200 mL reaction flask, 7.9 g (40 mmol) of EGDMA, 6.0 g (20 mmol) of a fluorine monomer C4FHM, 4.6 g (20 mmol) of MAIB, and 87 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 300 mL reaction flask, the content of the 200 mL reaction flask in which EGDMA, C4FHM, and MAIB were charged was dropped using a dropping pump over 30 minutes. After the completion of dropping, the resultant reaction mixture was aged for 1 hour.

Next, the reaction mixture was charged into 555 g of hexane/toluene (mass ratio: 4:1) to precipitate a polymer in a slurry state. The resultant slurry was filtered under reduced pressure and the filtered substance was re-dissolved in 42 g of THF, followed by charging the resultant polymer THF solution into 555 g of hexane to re-precipitate the polymer in a slurry state. The resultant slurry was filtered under reduced pressure and the filtered substance was vacuum-dried to obtain 9.5 g of the objective substance (highly branched polymer 1) as a white powder.

The results of measuring $^1$H NMR and $^{13}$C NMR spectra of the obtained objective substance are shown in FIG. 1 and FIG. 2.

The weight average molecular weight Mw and the degree of distribution: Mw (weight average molecular weight)/Mn (number average molecular weight), both of which were measured by GPC in terms of polystyrene of the objective substance, were 21,000 and 3.5 respectively.

Example 2

<Synthesis of Highly Branched Polymer 2 Using EGDMA, C4FHM, and MAIB>

In the same manner as in Example 1, except that the charged amount of C4FHM was changed to 12 g (40 mmol), the polymerization and the purification were performed to obtain 8.3 g of the objective substance (highly branched polymer 2) as a white powder.

The results of measuring $^1$H NMR and $^{13}$C NMR spectra of the obtained objective substance are shown in FIG. 3 and FIG. 4.

The weight average molecular weight Mw and the degree of distribution: Mw/Mn, both of which were measured by GPC in terms of polystyrene of the objective substance, were 17,000 and 2.9 respectively.

Example 3

<Synthesis of Highly Branched Polymer 3 Using EGDMA, C4FHA, and MAIB>

Into a 200 mL reaction flask, 32 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 4.0 g (20 mmol) of EGDMA, 5.7 g (20 mmol) of a fluorine monomer C4FHA, 2.3 g (10 mmol) of MAIB, and 32 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 200 mL reaction flask, the content of the 100 mL reaction flask in which EGDMA, C4FHA, and MAIB were charged was dropped using a dropping pump over 30 minutes. After the completion of dropping, the resultant reaction mixture was aged for 1 hour.

Next, the reaction mixture was charged into 277 g of hexane/toluene (mass ratio: 4:1) to precipitate a polymer in a slurry state. The resultant slurry was filtered under reduced pressure and the filtered substance was re-dissolved in 36 g of THF, followed by charging the resultant polymer THF solution into 277 g of hexane to re-precipitate the polymer in a slurry state. The resultant slurry was filtered under reduced pressure and the filtered substance was vacuum-dried to obtain 8.0 g of the objective substance (highly branched polymer 3) as a white powder.

The results of measuring $^1$H NMR and $^{13}$C NMR spectra of the obtained objective substance are shown in FIG. 5 and FIG. 6.

The weight average molecular weight Mw and the degree of distribution: Mw/Mn, both of which were measured by GPC in terms of polystyrene of the objective substance, were 22,000 and 2.9 respectively.

Example 4

<Synthesis of Highly Branched Polymer 4 Using EGDMA, C6FHA, and MAIB>

In the same manner as in Example 3, except that, as the fluorine monomer, 3.9 g (10 mmol) of C6FHA was used, the polymerization and the purification were performed to obtain 4.6 g of the objective substance (highly branched polymer 4) as a white powder.

The results of measuring $^1$H NMR and $^{13}$C NMR spectra of the obtained objective substance are shown in FIG. 7 and FIG. 8.

The weight average molecular weight Mw and the degree of distribution: Mw/Mn, both of which were measured by GPC in terms of polystyrene of the objective substance, were 15,000 and 2.2 respectively.

Example 5

<Synthesis of Highly Branched Polymer 5 Using EGDMA, C4FA, and MAIB>

In the same manner as in Example 3, except that, as the fluorine monomer, 6.4 g (20 mmol) of C4FA was used, the polymerization and the purification were performed to obtain 7.4 g of the objective substance (highly branched polymer 5) as a white powder.

The results of measuring $^1$H NMR and $^{13}$C NMR spectra of the obtained objective substance are shown in FIG. 9 and FIG. 10.

The weight average molecular weight Mw and the degree of distribution: Mw/Mn, both of which were measured by GPC in terms of polystyrene of the objective substance, were 16,000 and 2.2 respectively.

Example 6

<Synthesis of Highly Branched Polymer 6 Using EGDMA, C6FM, and MAIB>

In the same manner as in Example 3, except that, as the fluorine monomer, 4.3 g (10 mmol) of C6FM was used, the polymerization and the purification were performed to obtain 5.6 g of the objective substance (highly branched polymer 6) as a white powder.

The results of measuring $^1$H NMR and $^{13}$C NMR spectra of the obtained objective substance are shown in FIG. 11 and FIG. 12.

The weight average molecular weight Mw and the degree of distribution: Mw/Mn, both of which were measured by GPC in terms of polystyrene of the objective substance, were 17,000 and 2.1 respectively.

Example 7

<Synthesis of Highly Branched Polymer 7 Using EGDMA, C6FM, and MAIB>

In the same manner as in Example 6, except that the charged amount of C6FM was changed to 8.6 g (20 mmol), the polymerization and the purification were performed to obtain 10.1 g of the objective substance (highly branched polymer 7) as a white powder.

The results of measuring $^1$H NMR and $^{13}$C NMR spectra of the obtained objective substance are shown in FIG. 13 and FIG. 14.

The weight average molecular weight Mw and the degree of distribution: Mw/Mn, both of which were measured by GPC in terms of polystyrene of the objective substance, were 16,000 and 1.8 respectively.

Example 8

<Synthesis of Highly Branched Polymer 8 Using EGDMA, C6FA, and MAIB>

In the same manner as in Example 3, except that, as the fluorine monomer, 4.2 g (10 mmol) of C6FA was used, the polymerization and the purification were performed to obtain 4.9 g of the objective substance (highly branched polymer 8) as a white powder.

The results of measuring $^1$H NMR and $^{13}$C NMR spectra of the obtained objective substance are shown in FIG. 15 and FIG. 16.

The weight average molecular weight Mw and the degree of distribution: Mw/Mn, both of which were measured by GPC in terms of polystyrene of the objective substance, were 17,000 and 2.2 respectively.

Example 9

<Synthesis of Highly Branched Polymer 9 Using EGDMA, C6FA, and MAIB>

In the same manner as in Example 8, except that the charged amount of C6FA was changed to 8.4 g (20 mmol), the polymerization and the purification were performed to obtain 9.7 g of the objective substance (highly branched polymer 9) as a white powder.

The results of measuring $^1$H NMR and $^{13}$C NMR spectra of the obtained objective substance are shown in FIG. 17 and FIG. 18.

The weight average molecular weight Mw and the degree of distribution: Mw/Mn, both of which were measured by GPC in terms of polystyrene of the objective substance, were 20,000 and 2.0 respectively.

Example 10

<Synthesis of Highly Branched Polymer 10 Using EGDMA, C6FA, and MAIB>

In the same manner as in Example 8, except that the charged amount of C6FA was changed to 0.84 g (2 mmol), the polymerization and the purification were performed to obtain 4.8 g of the objective substance (highly branched polymer 10) as a white powder.

The results of measuring $^1$H NMR and $^{13}$C NMR spectra of the obtained objective substance are shown in FIG. 19 and FIG. 20.

The weight average molecular weight Mw and the degree of distribution: Mw/Mn, both of which were measured by GPC in terms of polystyrene of the objective substance, were 16,000 and 3.8 respectively.

Example 11

<Synthesis of Highly Branched Polymer 11 Using EGDMA, C6FA, and MAIB>

In the same manner as in Example 8, except that the charged amount of C6FA was changed to 2.5 g (6 mmol), the polymerization and the purification were performed to obtain 5.8 g of the objective substance (highly branched polymer 11) as a white powder.

The results of measuring $^1$H NMR and $^{13}$C NMR spectra of the obtained objective substance are shown in FIG. 21 and FIG. 22.

The weight average molecular weight Mw and the degree of distribution: Mw/Mn, both of which were measured by GPC in terms of polystyrene of the objective substance, were 14,000 and 3.0 respectively.

Comparative Example 1

<Synthesis of Highly Branched Polymer 12 Using EGDMA and MAIB>

Into a 300 mL reaction flask, 79 g of toluene was charged, and while stirring toluene, nitrogen was flowed into the flask for 5 minutes, followed by heating the flask until the inside liquid was refluxed (at a temperature of about 110° C.).

Separately, into a 200 mL reaction flask, 9.9 g (50 mmol) of EGDMA, 5.8 g (84 mmol) of MAIB, and 79.2 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 300 mL reaction flask, the content of the 200 mL reaction flask in which EGDMA and MAIB were charged was dropped using a dropping pump over 90 minutes. After the completion of dropping, the resultant reaction mixture was aged for 1 hour.

Next, the reaction mixture was charged into 748 g of hexane to precipitate a polymer in a slurry state. The resultant slurry was filtered under reduced pressure and the filtered substance was vacuum-dried to obtain 10.6 g of the objective substance (highly branched polymer 12) as a white powder.

The results of measuring $^1$H NMR and $^{13}$C NMR spectra of the obtained objective substance are shown in FIG. 23 and FIG. 24.

The weight average molecular weight Mw and the degree of distribution: Mw/Mn, both of which were measured by GPC in terms of polystyrene of the objective substance, were 17,000 and 4.8 respectively.

Example 18

<Synthesis of Highly Branched Polymer 13 Using EGDMA, C6FA, and MAIB>

Into a 200 mL reaction flask, 43.6 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 4.0 g (20 mmol) of EGDMA, 4.2 g (10 mmol) of a fluorine monomer C6FA, 2.8 g (12 mmol) of MAIB, and 43.6 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 200 mL reaction flask, the content of the 100 mL reaction flask in which EGDMA, C6FA, and MAIB were charged was dropped using a dropping pump over 30 minutes. After the completion of dropping, the resultant reaction mixture was aged for 1 hour.

Next, from the reaction mixture, 75.2 g of toluene was distilled off using a rotary evaporator and the resultant residue was charged into 278 g of hexane to precipitate a polymer in a slurry state. The resultant slurry was filtered under reduced pressure and the filtered substance was vacuum-dried to obtain 4.4 g of the objective substance (highly branched polymer 13) as a white powder.

The results of measuring $^1$H NMR and $^{13}$C NMR spectra of the obtained objective substance are shown in FIG. 26 and FIG. 27.

The weight average molecular weight Mw and the degree of distribution: Mw/Mn, both of which were measured by GPC in terms of polystyrene of the objective substance, were 6,800 and 1.9 respectively.

Example 19

<Synthesis of Highly Branched Polymer 14 Using DVB, C6FA, and MAIB>

Into a 200 mL reaction flask, 29.6 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 1.6 g (12 mmol) of DVB, 7.5 g (18 mmol) of a fluorine monomer C6FA, 2.5 g (11 mmol) of MAIB, and 29.6 g of toluene were charged, and while stirring the resultant reaction mixture, nitrogen was flowed into the flask for 5 minutes to purge the inside of the flask with nitrogen.

Into the refluxed toluene in the 200 mL reaction flask, the content of the 100 mL reaction flask in which DVB, C6FA, and MAIB were charged was dropped using a dropping pump over 30 minutes. After the completion of dropping, the resultant reaction mixture was aged for 1 hour.

Next, into the reaction mixture, 59.2 g of hexane was charged to precipitate a polymer and the supernatant was removed by decantation. To the residual precipitate, 29.6 g of THF was added and the resultant reaction mixture was stirred while heating at 60° C. to dissolve the polymer. THF in the polymer solution was distilled off under reduced pressure with a rotary evaporator and the resultant residue was vacuum-dried to obtain 10.1 g of the objective substance (highly branched polymer 14) as a white powder. The results of measuring $^1$H NMR and $^{13}$C NMR spectra of the obtained objective substance are shown in FIG. 28 and FIG. 29.

The weight average molecular weight Mw and the degree of distribution: Mw/Mn, both of which were measured by GPC in terms of polystyrene of the objective substance, after re-precipitation-purification were 23,000 and 2.0 respectively.

Example 20

<Synthesis of Highly Branched Polymer 15 Using DCP, C6FA, and MAIB>

Into a 200 mL reaction flask, 58 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 7.3 g (20 mmol) of DCP, 4.2 g (10 mmol) of a fluorine monomer C6FA, 2.8 g (12 mmol) of MAIB, and 58 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 200 mL reaction flask, the content of the 100 mL reaction flask in which DCP, C6FA, and MAIB were charged was dropped using a dropping pump over 30 minutes. After the completion of dropping, the resultant reaction mixture was aged for 1 hour.

Next, from the reaction mixture, 51.1 g of toluene was distilled off using a rotary evaporator and the resultant residue was charged into 510 g of hexane to precipitate a polymer in a slurry state. The resultant slurry was filtered under reduced pressure and the filtered substance was vacuum-dried to obtain 5.6 g of the objective substance (highly branched polymer 15) as a white powder.

The results of measuring $^1$H NMR and $^{13}$C NMR spectra of the obtained objective substance are shown in FIG. 30 and FIG. 31.

The weight average molecular weight Mw and the degree of distribution: Mw/Mn, both of which were measured by GPC in terms of polystyrene of the objective substance, were 12,000 and 1.9 respectively.

Example 21

<Synthesis of Highly Branched Polymer 16 Using ADM, C6FA, and MAIB>

Into a 200 mL reaction flask, 31.7 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 6.7 g (20 mmol) of ADM, 4.2 g (10 mmol) of a fluorine monomer C6FA, 2.3 g (10 mmol) of MAIB, and 31.7 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 200 mL reaction flask, the content of the 100 mL reaction flask in which ADM, C6FA, and MAIB were charged was dropped using a dropping pump over 30 minutes. After the completion of dropping, the resultant reaction mixture was aged for 1 hour.

Next, from the reaction mixture, 31.7 g of toluene was distilled off using a rotary evaporator and the resultant residue was charged into 465 g of hexane to precipitate a polymer in a slurry state. The resultant slurry was filtered under reduced pressure and the filtered substance was vacuum-dried to obtain 5.9 g of the objective substance (highly branched polymer 16) as a white powder.

The results of measuring $^1$H NMR and $^{13}$C NMR spectra of the obtained objective substance are shown in FIG. 32 and FIG. 33.

The weight average molecular weight Mw and the degree of distribution: Mw/Mn, both of which were measured by GPC in terms of polystyrene of the objective substance, were 24,000 and 2.6 respectively.

Example 22

<Synthesis of Highly Branched Polymer 17 Using DCP, C6FA, and DCHC>

Into a 200 mL reaction flask, 58.3 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 7.3 g (20 mmol) of DCP, 4.2 g (10 mmol) of a fluorine monomer C6FA, 3.7 g (12 mmol) of DCHC, and 58.3 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 200 mL reaction flask, the content of the 100 mL reaction flask in which DCP, C6FA, and DCHC were charged was dropped using a dropping pump over 30 minutes. After the completion of dropping, the resultant reaction mixture was aged for 1 hour.

Next, from the reaction mixture, 55.4 g of toluene was distilled off using a rotary evaporator and the resultant residue was charged into 510 g of hexane to precipitate a polymer in a slurry state. The resultant slurry was filtered under reduced pressure and the filtered substance was vacuum-dried to obtain 5.2 g of the objective substance (highly branched polymer 17) as a white powder.

The results of measuring $^1$H NMR and $^{13}$C NMR spectra of the obtained objective substance are shown in FIG. 34 and FIG. 35.

The weight average molecular weight Mw and the degree of distribution: Mw/Mn, both of which were measured by GPC in terms of polystyrene of the objective substance, were 20,000 and 2.4 respectively.

Example 23

<Synthesis of Highly Branched Polymer 18 Using DCP, C6FA, and DCHC>

In the same manner as in Example 22, except that the charged amount of toluene was changed to 66.3 g, the polymerization and the purification were performed to obtain 3.8 g of the objective substance (highly branched polymer 18) as a white powder.

The weight average molecular weight Mw and the degree of distribution: Mw/Mn, both of which were measured by GPC in terms of polystyrene of the objective substance, were 7,200 and 2.9 respectively.

Example 24

<Synthesis of Highly Branched Polymer 19 Using EGDMA and AF1>

Into a 200 mL reaction flask, 15.9 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 2.0 g (10 mmol) of EGDMA, 2.2 g (5 mmol) of AF1, and 15.9 g of MIBK were charged, and while stirring the resultant reaction mixture, nitrogen was flowed into the flask for 5 minutes to purge the inside of the flask with nitrogen.

Into the refluxed MIBK in the 200 mL reaction flask, the content of the 50 mL reaction flask in which EGDMA and AF1 were charged was dropped using a dropping pump over 30 minutes. After the completion of dropping, the resultant reaction mixture was aged for 1 hour.

Next, from the reaction mixture, 19.8 g of MIBK was distilled off using a rotary evaporator and the resultant residue was charged into 139 g of methanol to precipitate a polymer in a slurry state. The resultant slurry was filtered under reduced pressure and the filtered substance was vacuum-dried to obtain 2.2 g of the objective substance (highly branched polymer 19) as a white powder.

The results of measuring $^1$H NMR and $^{13}$C NMR spectra of the obtained objective substance are shown in FIG. 36 and FIG. 37.

The weight average molecular weight Mw and the degree of distribution: Mw/Mn, both of which were measured by GPC in terms of polystyrene of the objective substance, were 24,000 and 2.4 respectively.

Example 25

<Synthesis of Highly Branched Polymer 20 Using EGDMA, C6FA, and AF1>

Into a 100 mL reaction flask, 12.7 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 1.6 g (8 mmol) of EGDMA, 1.7 g (4 mmol) of a fluorine monomer C6FA, 1.8 g (4 mmol) of AF1, and 12.7 g of MIBK were charged, and while stirring the resultant reaction mixture, nitrogen was flowed into the flask for 5 minutes to purge the inside of the flask with nitrogen.

Into the refluxed MIBK in the 100 mL reaction flask, the content of the 50 mL reaction flask in which EGDMA, C6FA, and AF1 were charged was dropped using a dropping pump over 30 minutes. After the completion of dropping, the resultant reaction mixture was aged for 1 hour.

Next, from the reaction mixture, 15.9 g of MIBK was distilled off using a rotary evaporator and the resultant residue was charged into 174 g of hexane/acetone (mass ratio: 10:1) to precipitate a polymer. The supernatant was removed by decantation and the resultant residue was re-dissolved in 12 g of THF. The resultant polymer THF solution was charged into 174 g of hexane/acetone (mass ratio: 10:1) to precipitate the polymer again. The supernatant was removed by decantation and the resultant residue was re-dissolved in 12 g of THF, followed by distilling off THF under reduced pressure and vacuum-drying the resultant residue to obtain 2.8 g of the objective substance (highly branched polymer 20) as a white powder.

The results of measuring $^1$H NMR and $^{13}$C NMR spectra of the obtained objective substance are shown in FIG. 38 and FIG. 39.

The weight average molecular weight Mw and the degree of distribution: Mw/Mn, both of which were measured by GPC in terms of polystyrene of the objective substance, were 17,000 and 2.3 respectively.

Example 26

<Synthesis of Highly Branched Polymer 21 Using EGDMA, C6FA, and AF1>

Into a 100 mL reaction flask, 15.9 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 1.9 g (10 mmol) of EGDMA, 6.3 g (15 mmol) of a fluorine monomer C6FA, 2.2 g (5 mmol) of AF1, and 15.9 g of MIBK were charged, and while stirring the resultant reaction mixture, nitrogen was flowed into the flask for 5 minutes to purge the inside of the flask with nitrogen.

Into the refluxed MIBK in the 100 mL reaction flask, the content of the 50 mL reaction flask in which EGDMA, C6FA, and AF1 were charged was dropped using a dropping pump over 30 minutes. After the completion of dropping, the resultant reaction mixture was aged for 1 hour.

Next, from the reaction mixture, 19.9 g of MIBK was distilled off using a rotary evaporator and the resultant residue was charged into 200 g of hexane/acetone (mass ratio: 10:1) to precipitate a polymer. The supernatant was removed by decantation and the resultant residue was re-dissolved in 19 g of THF. The resultant polymer THF solution was charged into 200 g of hexane/acetone (mass ratio: 10:1) to precipitate the polymer again. The supernatant was removed by decantation and the resultant residue was re-dissolved in 12 g of THF, followed by distilling off THF under reduced pressure and vacuum-drying the resultant residue to obtain 2.8 g of the objective substance (highly branched polymer 21) as a white powder.

The results of measuring $^1$H NMR and $^{13}$C NMR spectra of the obtained objective substance are shown in FIG. 40 and FIG. 41.

The weight average molecular weight Mw and the degree of distribution: Mw/Mn, both of which were measured by GPC in terms of polystyrene of the objective substance, were 19,000 and 3.4 respectively.

Example 27

<Synthesis of Highly Branched Polymer 22 Using DVB and AF1>

Into a 200 mL reaction flask, 26.1 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 1.3 g (10 mmol) of DVB, 3.6 g (8 mmol) of AF1, and 26.1 g of MIBK were charged, and while stirring the resultant reaction mixture, nitrogen was flowed into the flask for 5 minutes to purge the inside of the flask with nitrogen.

Into the refluxed MIBK in the 200 mL reaction flask, the content of the 50 mL reaction flask in which DVB and AF1 were charged was dropped using a dropping pump over 30 minutes. After the completion of dropping, the resultant reaction mixture was aged for 1 hour.

Next, from the reaction mixture, 39.1 g of MIBK was distilled off using a rotary evaporator and the resultant residue was charged into 200 g of hexane/acetone (mass ratio: 10:1) to precipitate a polymer in a slurry state. The resultant slurry was filtered under reduced pressure and the filtered substance was vacuum-dried to obtain 2.8 g of the objective substance (highly branched polymer 22) as a white powder.

The results of measuring $^1$H NMR and $^{13}$C NMR spectra of the obtained objective substance are shown in FIG. 42 and FIG. 43.

The weight average molecular weight Mw and the degree of distribution: Mw/Mn, both of which were measured by GPC in terms of polystyrene of the objective substance, were 11,000 and 2.1 respectively.

Example 28

<Synthesis of Highly Branched Polymer 23 Using DVB, C6FA, and AF1>

Into a 100 mL reaction flask, 13.1 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 0.7 g (5 mmol) of DVB, 1.1 g (2.5 mmol) of a fluorine monomer C6FA, 1.8 g (4 mmol) of AF1, and 26.1 g of MIBK were charged, and while stirring the resultant reaction mixture, nitrogen was flowed into the flask for 5 minutes to purge the inside of the flask with nitrogen.

Into the refluxed MIBK in the 100 mL reaction flask, the content of the 50 mL reaction flask in which DVB, C6FA, and AF1 were charged was dropped using a dropping pump over 30 minutes. After the completion of dropping, the resultant reaction mixture was aged for 1 hour.

Next, from the reaction mixture, 19.5 g of MIBK was distilled off using a rotary evaporator and the resultant residue was charged into 72 g of hexane/acetone (mass ratio: 10:1) to precipitate a polymer. The supernatant was removed by decantation and the resultant residue was re-dissolved in 6.5 g of THF. The resultant polymer THF solution was charged into 72 g of hexane/acetone (mass ratio: 10:1) to precipitate the polymer again. The supernatant was removed by decantation and the resultant residue was re-dissolved in 6.5 g of THF, followed by distilling off THF and vacuum-drying the resultant residue to obtain 1.6 g of the objective substance (highly branched polymer 23) as a white powder.

The results of measuring $^1$H NMR and $^{13}$C NMR spectra of the obtained objective substance are shown in FIG. 44 and FIG. 45.

The weight average molecular weight Mw and the degree of distribution: Mw/Mn, both of which were measured by GPC in terms of polystyrene of the objective substance, were 12,000 and 1.9 respectively.

Example 29

<Synthesis of Highly Branched Polymer 24 Using DVB, C6FA, and AF1>

Into a 200 mL reaction flask, 26.1 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 1.3 g (10 mmol) of DVB, 6.3 g (15 mmol) of a fluorine monomer C6FA, 3.6 g (8 mmol) of AF1, and 26.1 g of MIBK were charged, and while stirring the resultant reaction mixture, nitrogen was flowed into the flask for 5 minutes to purge the inside of the flask with nitrogen.

Into the refluxed MIBK in the 200 mL reaction flask, the content of the 50 mL reaction flask in which DVB, C6FA, and AF1 were charged was dropped using a dropping pump over 30 minutes. After the completion of dropping, the resultant reaction mixture was aged for 1 hour.

Next, from the reaction mixture, 39.1 g of MIBK was distilled off using a rotary evaporator and the resultant residue was charged into 200 g of hexane/acetone (mass ratio: 10:1) to precipitate a polymer. The supernatant was removed by decantation and the resultant residue was re-dissolved in 13 g of THF. The resultant polymer THF solution was charged into 200 g of hexane/acetone (mass ratio: 10:1) to precipitate the polymer again. The supernatant was removed by decantation and the resultant residue was re-dissolved in 13 g of THF, followed by distilling off THF under reduced pressure and vacuum-drying the resultant residue to obtain 6.0 g of the objective substance (highly branched polymer 24) as a white powder.

The results of measuring $^1$H NMR and $^{13}$C NMR spectra of the obtained objective substance are shown in FIG. 46 and FIG. 47.

The weight average molecular weight Mw and the degree of distribution: Mw/Mn, both of which were measured by GPC in terms of polystyrene of the objective substance, were 11,000 and 2.3 respectively.

Example 30

<Synthesis of Highly Branched Polymer 25 Using Egdma, C6FA, and AF6>

Into a 100 mL reaction flask, 17.8 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 1.0 g (5 mmol) of EGDMA, 1.1 g (2.5 mmol) of a fluorine monomer C6FA, 1.4 g (1.5 mmol) of AF6, and 17.8 g of MIBK were charged, and while stirring the resultant reaction mixture, nitrogen was flowed into the flask for 5 minutes to purge the inside of the flask with nitrogen.

Into the refluxed MIBK in the 100 mL reaction flask, the content of the 50 mL reaction flask in which EGDMA, C6FA, and AF6 were charged was dropped using a dropping pump over 30 minutes. After the completion of dropping, the resultant reaction mixture was aged for 1 hour.

Next, from the reaction mixture, 29.7 g of MIBK was distilled off using a rotary evaporator and the resultant residue was charged into 109 g of hexane/acetone (mass ratio: 10:1) to precipitate a polymer. The supernatant was removed by decantation and the resultant residue was re-dissolved in 10 g of THF. The resultant polymer THF solution was charged into 109 g of hexane/acetone (mass ratio: 10:1) to precipitate the polymer again. The supernatant was removed by decantation and the resultant residue was re-dissolved in 10 g of THF, followed by distilling off THF and vacuum-drying the resultant residue to obtain 1.2 g of the objective substance (highly branched polymer 25) as a white powder.

The results of measuring $^1$H NMR and $^{13}$C NMR spectra of the obtained objective substance are shown in FIG. 48 and FIG. 49.

The weight average molecular weight Mw and the degree of distribution: Mw/Mn, both of which were measured by GPC in terms of polystyrene of the objective substance, were 12,000 and 1.6 respectively.

Example 31

<Synthesis of Highly Branched Polymer 26 Using DVB and AF6>

Into a 100 mL reaction flask, 23.4 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 0.5 g (4 mmol) of DVB, 1.9 g (2 mmol) of AF6, and 23.4 g of MIBK were charged, and while stirring the resultant reaction mixture, nitrogen was flowed into the flask for 5 minutes to purge the inside of the flask with nitrogen.

Into the refluxed MIBK in the 100 mL reaction flask, the content of the 50 mL reaction flask in which DVB and AF6 were charged was dropped using a dropping pump over 30 minutes. After the completion of dropping, the resultant reaction mixture was aged for 1 hour.

Next, from the reaction mixture, 41.7 g of MIBK was distilled off using a rotary evaporator and the resultant residue was charged into 67 g of hexane/acetone (mass ratio: 10:1) to precipitate a polymer. The supernatant was removed by decantation and the resultant residue was re-dissolved in 5 g of THF. The resultant polymer THF solution was charged into 67 g of hexane/acetone (mass ratio: 10:1) to precipitate the polymer again. The supernatant was removed by decantation and the resultant residue was re-dissolved in 5 g of THF, followed by distilling off THF under reduced pressure and vacuum-drying the resultant residue to obtain 0.5 g of the objective substance (highly branched polymer 26) as a white powder.

The results of measuring $^1$H NMR and $^{13}$C NMR spectra of the obtained objective substance are shown in FIG. 50 and FIG. 51.

The weight average molecular weight Mw and the degree of distribution: Mw/Mn, both of which were measured by GPC in terms of polystyrene of the objective substance, were 16,000 and 1.4 respectively.

Example 32

<Synthesis of Highly Branched Polymer 27 Using DVB, C6FA, and AF6>

Into a 200 mL reaction flask, 23.4 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 0.5 g (4 mmol) of DVB, 0.8 g (2 mmol) of a fluorine monomer C6FA, 1.9 g (2 mmol) of AF6, and 23.4 g of MIBK were charged, and while stirring the resultant reaction mixture, nitrogen was flowed into the flask for 5 minutes to purge the inside of the flask with nitrogen.

Into the refluxed MIBK in the 200 mL reaction flask, the content of the 50 mL reaction flask in which DVB, C6FA, and AF6 were charged was dropped using a dropping pump over 30 minutes. After the completion of dropping, the resultant reaction mixture was aged for 1 hour.

Next, from the reaction mixture, almost the whole amount of MIBK was distilled off using a rotary evaporator and the resultant residue was re-dissolved in 5 g of THF. The resultant polymer THF solution was charged into 67 g of hexane/acetone (mass ratio: 10:1) to precipitate the polymer. The supernatant was removed by decantation and the resultant residue was re-dissolved in 5 g of THF. The resultant polymer THF solution was charged into 67 g of hexane/acetone (mass ratio: 10:1) to precipitate the polymer again. The supernatant was removed by decantation and the resultant residue was re-dissolved in 5 g of THF, followed by distilling off THF under reduced pressure and vacuum-drying the resultant residue to obtain 0.6 g of the objective substance (highly branched polymer 27) as a white powder.

The results of measuring $^1$H NMR and $^{13}$C NMR spectra of the obtained objective substance are shown in FIG. 52 and FIG. 53.

The weight average molecular weight Mw and the degree of distribution: Mw/Mn, both of which were measured by GPC in terms of polystyrene of the objective substance, were 13,000 and 1.2 respectively.

Example 33

<Synthesis of Highly Branched Polymer 28 Using EGDMA, C6FA, and AVCA>

Into a 300 mL reaction flask, 47.6 g of EGME was charged, and while stirring EGME, nitrogen was flowed into the flask for 5 minutes, followed by heating the flask until the inside liquid was refluxed (at a temperature of about 125° C.).

Separately, into a 100 mL reaction flask, 2.4 g (12 mmol) of EGDMA, 2.5 g (6 mmol) of a fluorine monomer C6FA, 1.7 g (9.6 mmol) of AVCA, and 47.6 g of EGME were charged, and while stirring the resultant reaction mixture, nitrogen was flowed into the flask for 5 minutes to purge the inside of the flask with nitrogen.

Into the refluxed EGME in the 300 mL reaction flask, the content of the 100 mL reaction flask in which EGDMA, C6FA, and AVCA were charged was dropped using a dropping pump over 60 minutes. After the completion of dropping, the resultant reaction mixture was aged for 1 hour.

Next, from the reaction mixture, 71.4 g of EGME was distilled off using a rotary evaporator and the resultant residue was charged into 262 g of hexane/ethanol (mass ratio: 10:1) to re-precipitate a polymer in a slurry state. The resultant slurry was filtered under reduced pressure and the resultant solid was re-dissolved in 24 g of THF. The polymer THF solution was charged into 262 g of hexane/ethanol (mass ratio: 10:1) to re-precipitate the polymer in a slurry state. The resultant slurry was filtered under reduced pressure and the filtered substance was vacuum-dried to obtain 2.8 g of the objective substance (highly branched polymer 28) as a white powder.

The results of measuring $^1$H NMR and $^{13}$C NMR spectra of the obtained objective substance are shown in FIG. 54 and FIG. 55.

The weight average molecular weight Mw and the degree of distribution: Mw/Mn, both of which were measured by GPC in terms of polystyrene of the objective substance, were 7,000 and 2.3 respectively.

Example 34

<Synthesis of Highly Branched Polymer 29 Using DVB, C6FA, and AVCA>

Into a 300 mL reaction flask, 31.3 g of EGME was charged, and while stirring EGME, nitrogen was flowed into the flask for 5 minutes, followed by heating the flask until the inside liquid was refluxed (at a temperature of about 125° C.).

Separately, into a 100 mL reaction flask, 1.6 g (12 mmol) of DVB, 2.5 g (6 mmol) of a fluorine monomer C6FA, 2.7 g (9.6 mmol) of AVCA, and 31.3 g of EGME were charged, and while stirring the resultant reaction mixture, nitrogen was flowed into the flask for 5 minutes to purge the inside of the flask with nitrogen.

Into the refluxed EGME in the 300 mL reaction flask, the content of the 100 mL reaction flask in which DVB, C6FA, and AVCA were charged was dropped using a dropping pump over 30 minutes. After the completion of dropping, the resultant reaction mixture was aged for 1 hour.

Next, from the reaction mixture, 46.9 g of EGME was distilled off using a rotary evaporator and the resultant residue was charged into 172 g of hexane/ethanol (mass ratio: 10:1) to re-precipitate a polymer in a slurry state. The resultant slurry was filtered under reduced pressure and the resultant solid was re-dissolved in 16 g of THF. The resultant polymer THF solution was charged into 172 g of hexane/ethanol (mass ratio: 10:1) to re-precipitate the polymer in a slurry state. The resultant slurry was filtered under reduced pressure and the filtered substance was vacuum-dried to obtain 1.9 g of the objective substance (highly branched polymer 29) as a white powder.

The results of measuring $^1$H NMR and $^{13}$C NMR spectra of the obtained objective substance are shown in FIG. 56 and FIG. 57.

The weight average molecular weight Mw and the degree of distribution: Mw/Mn, both of which were measured by GPC in terms of polystyrene of the objective substance, were 47,000 and 3.9 respectively.

Example 35

<Synthesis of Highly Branched Polymer 30 Using Highly Branched Polymer 32 and C4FOH>

In a 100 mL reaction flask, 2.6 g of the highly branched polymer 32 obtained in below-described Comparative Example 2 was dissolved in 26 g of DMF, and thereto, 2.9 g (11 mmol) of a fluorine alcohol C4FOH and 1.3 g (10 mmol) of DMAP were charged, followed by flowing nitrogen into the flask for 5 minutes while stirring the resultant reaction mixture. Into the resultant solution, 1.4 g (11 mmol) of DIC was dropped and the resultant reaction mixture was stirred at room temperature (about 25° C.) for 20 hours.

Next, from the reaction mixture, almost the whole amount of DMF was distilled off using a rotary evaporator and the resultant residue was re-dissolved in 13 g of THF. The resultant polymer THF solution was charged into 282 g of hexane/IPA (mass ratio: 10:1) to precipitate a polymer. The supernatant was removed by decantation and the resultant residue was re-dissolved in 13 g of THF. The resultant polymer THF solution was charged into 282 g of hexane/IPA (mass ratio: 10:1) to precipitate the polymer again. The supernatant was removed by decantation and the resultant residue was re-dissolved in 13 g of THF, followed by distilling off THF under reduced pressure and vacuum-drying the resultant residue to obtain 2.9 g of the objective substance (highly branched polymer 30) as a white powder.

The results of measuring $^1$H NMR and $^{13}$C NMR spectra of the obtained objective substance are shown in FIG. 58 and FIG. 59.

The weight average molecular weight Mw and the degree of distribution: Mw/Mn, both of which were measured by GPC in terms of polystyrene of the objective substance, were 34,000 and 1.8 respectively.

Example 36

<Synthesis of Highly Branched Polymer 31 Using Highly Branched Polymer 32 and C6FOH>

In the same manner as in Example 35, except that, as the fluorine alcohol, 5.5 g (15 mmol) of C6FOH was used, the reaction and the purification were performed to obtain 3.0 g of the objective substance (highly branched polymer 31) as a white powder.

The results of measuring $^1$H NMR and $^{13}$C NMR spectra of the obtained objective substance are shown in FIG. 60 and FIG. 61.

The weight average molecular weight Mw and the degree of distribution: Mw/Mn, both of which were measured by GPC in terms of polystyrene of the objective substance, were 46,000 and 1.6 respectively.

Comparative Example 2

<Synthesis of Highly Branched Polymer 32 Using DVB and AVCA>

Into a 500 mL reaction flask, 200 g of DMAc was charged, and while stirring DMAc, nitrogen was flowed into the flask for 5 minutes, followed by heating the flask until the temperature of the inside liquid became 110° C.

Separately, into a 300 mL reaction flask, 13 g (100 mmol) of DVB, 28 g (100 mmol) of AVCA, and 200 g of DMAc were charged, and while stirring the resultant reaction mixture, nitrogen was flowed into the flask for 5 minutes to purge the inside of the flask with nitrogen.

Into the heated DMAc in the 500 mL reaction flask, the content of the 300 mL reaction flask in which DVB and AVCA were charged was dropped using a dropping pump over 60 minutes. After the completion of dropping, the resultant reaction mixture was aged for 1 hour.

Next, from the reaction mixture, 270 g of DMAc was distilled off using a rotary evaporator and the resultant residue was charged into 1,300 g of chloroform to precipitate a polymer. The supernatant was removed by decantation and the resultant residue was re-dissolved in 130 g of methanol. The resultant polymer methanol solution was charged into 1,300 g of IPE to precipitate the polymer again. The resultant slurry was filtered under reduced pressure and the filtered substance was vacuum-dried to obtain 18 g of the objective substance (highly branched polymer 32) as a white powder.

The results of measuring $^1$H NMR and $^{13}$C NMR spectra of the obtained objective substance are shown in FIG. 62 and FIG. 63.

The weight average molecular weight Mw and the degree of distribution: Mw/Mn, both of which were measured by GPC in terms of polystyrene of the objective substance, were 22,000 and 2.1 respectively.

Comparative Example 3

<Synthesis of Linear Polymer 1 Using MMA and C6FA>

Into a 100 mL reaction flask, 8.0 g (80 mmol) of MMA, 8.4 g (20 mmol) of C6FA, 0.92 g (4 mmol) of MAIB, and 26.9 g of MEK were charged, and while stirring the resultant reaction mixture, the reaction mixture was nitrogen-bubbled for 5 minutes, followed by subjecting the reaction mixture to a polymerization at a temperature of the inside liquid of 80° C. for 7 hours.

The reaction mixture was charged into 662 g of hexane to precipitate a polymer and the supernatant was removed by decantation, followed by re-dissolving the resultant residue in 54 g of THF. The resultant polymer THF solution was charged into 662 g of hexane to precipitate the polymer in a slurry state. The resultant slurry was filtered under reduced pressure and the filtered substance was vacuum-dried to obtain 6.6 g of the objective substance (linear polymer 1) as a white powder.

The results of measuring $^1$H NMR and $^{13}$C NMR spectra of the obtained objective substance are shown in FIG. 64 and FIG. 65.

The weight average molecular weight Mw and the degree of distribution: Mw/Mn, both of which were measured by GPC in terms of polystyrene of the objective substance, were 21,000 and 2.0 respectively.

Comparative Example 4

<Synthesis of Linear Polymer 2 Using MMA and C6FA>

In the same manner as in Comparative Example 3, except that the charged amount of MAIB was changed to 1.8 g (8 mmol), the polymerization and the purification were performed to obtain 6.9 g of the objective substance (linear polymer 2) as a white powder.

The result of measuring $^{13}$C NMR spectrum of the obtained objective substance is shown in FIG. 66.

The weight average molecular weight Mw and the degree of distribution: Mw/Mn, both of which were measured by GPC in terms of polystyrene of the objective substance, were 11,000 and 1.8 respectively.

Comparative Example 5

<Synthesis of Linear Polymer 3 Using MMA and C6FA>

In the same manner as in Comparative Example 3, except that the charged amount of MAIB was changed to 2.8 g (12 mmol), the polymerization and the purification were performed to obtain 5.7 g of the objective substance (linear polymer 3) as a white powder.

The result of measuring $^{13}$C NMR spectrum of the obtained objective substance is shown in FIG. 67.

The weight average molecular weight Mw and the degree of distribution: Mw/Mn, both of which were measured by GPC in terms of polystyrene of the objective substance, were 8,000 and 1.9 respectively.

Example 45

<Synthesis of Highly Branched Polymer 33 Using EGDMA, C6FA, VEEA, and MAIB>

Into a 200 mL reaction flask, 59 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 4.0 g (20 mmol) of EGDMA, 5.2 g (12.5 mmol) of C6FA, 1.9 g (10 mmol) of VEEA, 2.8 g (12 mmol) of MAIB, and 59 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 200 mL reaction flask, the content of the 100 mL reaction flask in which EGDMA, C6FA, VEEA, and MAIB were charged was dropped using a dropping pump over 30 minutes. After the completion of dropping, the resultant reaction mixture was aged for 1 hour.

Next, the reaction mixture was charged into 277 g of hexane to precipitate a polymer in a slurry state. The resultant slurry was filtered under reduced pressure and the filtered substance was vacuum-dried to obtain 6.6 g of the objective substance (highly branched polymer 33) as a white powder.

The results of measuring $^{1}$H NMR and $^{13}$C NMR spectra of the obtained objective substance are shown in FIG. 75 and FIG. 76.

The weight average molecular weight Mw and the degree of distribution: Mw (weight average molecular weight)/Mn (number average molecular weight), both of which were measured by GPC in terms of polystyrene of the objective substance, were 8,400 and 2.5 respectively.

Example 46

<Synthesis of Highly Branched Polymer 34 Using DCP, C6FA, GMA, and DCHC>

Into a 200 mL reaction flask, 66 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 7.3 g (20 mmol) of DCP, 5.4 g (12.5 mmol) of C6FA, 1.4 g (10 mmol) of GMA, 3.7 g (12 mmol) of DCHC, and 66 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 200 mL reaction flask, the content of the 100 mL reaction flask in which DCP, C6FA, GMA, and DCHC were charged was dropped using a dropping pump over 30 minutes. After the completion of dropping, the resultant reaction mixture was aged for 1 hour.

Next, the reaction mixture was charged into 510 g of hexane to precipitate a polymer in a slurry state. The resultant slurry was filtered under reduced pressure and the filtered substance was vacuum-dried to obtain 6.4 g of the objective substance (highly branched polymer 34) as a white powder.

The results of measuring $^{1}$H NMR and $^{13}$C NMR spectra of the obtained objective substance are shown in FIG. 77 and FIG. 78.

The weight average molecular weight Mw and the degree of distribution: Mw (weight average molecular weight)/Mn (number average molecular weight), both of which were measured by GPC in terms of polystyrene of the objective substance, were 8,000 and 1.9 respectively.

Example 47

<Synthesis of Highly Branched Polymer 35 Using PGHM, C6FA, and DCHC>

Into a 200 mL reaction flask, 50 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 4.6 g (20 mmol) of PGHM, 4.2 g (10 mmol) of C6FA, 3.7 g (12 mmol) of DCHC, and 50 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 200 mL reaction flask, the content of the 100 mL reaction flask in which PGHM, C6FA, and DCHC were charged was dropped using a dropping pump over 30 minutes. After the completion of dropping, the resultant reaction mixture was aged for 1 hour.

Next, the reaction mixture was charged into 320 g of hexane to precipitate a polymer in a slurry state. The resultant slurry was filtered under reduced pressure and the filtered substance was vacuum-dried to obtain 6.2 g of the objective substance (highly branched polymer 35) as a white powder.

The results of measuring $^{1}$H NMR and $^{13}$C NMR spectra of the obtained objective substance are shown in FIG. 79 and FIG. 80.

The weight average molecular weight Mw and the degree of distribution: Mw (weight average molecular weight)/Mn (number average molecular weight), both of which were measured by GPC in terms of polystyrene of the objective substance, were 7,000 and 3.1 respectively.

Example 48

<Synthesis of Highly Branched Polymer 36 Using EGDMA, C6FA, TESMA, and MAIB>

Into a 100 mL reaction flask, 16 g of toluene was charged, and while stirring toluene, nitrogen was flowed into the flask for 5 minutes, followed by heating the flask until the inside liquid was refluxed (at a temperature of about 110° C.).

Separately, into a 50 mL reaction flask, 2.0 g (10 mmol) of EGDMA, 2.1 g (5 mmol) of C6FA, 1.5 g (5 mmol) of TESMA, 1.2 g (5 mmol) of MAIB, and 16 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 100 mL reaction flask, the content of the 50 mL reaction flask in which EGDMA, C6FA, TESMA, and MAIB were charged was dropped using a dropping pump over 30 minutes. After the completion of dropping, the resultant reaction mixture was aged for 1 hour.

Next, from the reaction mixture, 28 g of toluene was distilled off using a rotary evaporator, and then the reaction mixture was charged into 198 g of hexane to precipitate a polymer in a slurry state. The resultant slurry was filtered under reduced pressure and the filtered substance was vacuum-dried to obtain 3.4 g of the objective substance (highly branched polymer 36) as a white powder.

The results of measuring $^1$H NMR and $^{13}$C NMR spectra of the obtained objective substance are shown in FIG. 81 and FIG. 82.

The weight average molecular weight Mw and the degree of distribution: Mw (weight average molecular weight)/Mn (number average molecular weight), both of which were measured by GPC in terms of polystyrene of the objective substance, were 18,000 and 2.2 respectively.

Example 49

<Synthesis of Highly Branched Polymer 37 Using DVB, C6FA, TESMA, and MAIB>

Into a 300 mL reaction flask, 37 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 2.0 g (15 mmol) of DVB, 3.1 g (7.5 mmol) of C6FA, 2.4 g (8.2 mmol) of TESMA, 3.1 g (14 mmol) of MAIB, and 37 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 300 mL reaction flask, the content of the 100 mL reaction flask in which DVB, C6FA, TESMA, and MAIB were charged was dropped using a dropping pump over 30 minutes. After the completion of dropping, the resultant reaction mixture was aged for 1 hour.

Next, from the reaction mixture, 59 g of toluene was distilled off using a rotary evaporator, and then the reaction mixture was charged into 195 g of methanol to precipitate a polymer in a slurry state. The resultant slurry was filtered under reduced pressure and the filtered substance was vacuum-dried to obtain 2.0 g of the objective substance (highly branched polymer 37) as a white powder.

The results of measuring $^1$H NMR and $^{13}$C NMR spectra of the obtained objective substance are shown in FIG. 83 and FIG. 84.

The weight average molecular weight Mw and the degree of distribution: Mw (weight average molecular weight)/Mn (number average molecular weight), both of which were measured by GPC in terms of polystyrene of the objective substance, were 23,000 and 1.4 respectively.

Example 50

<Synthesis of Highly Branched Polymer 38 Using EGDMA, C6FA, TESMA, and AF1>

Into a 100 mL reaction flask, 16 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 2.0 g (10 mmol) of EGDMA, 5.0 g (12 mmol) of C6FA, 1.5 g (5 mmol) of TESMA, 1.1 g (2.5 mmol) of AF1, and 16 g of MIBK were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed MIBK in the 100 mL reaction flask, the content of the 50 mL reaction flask in which EGDMA, C6FA, TESMA, and AF1 were charged was dropped using a dropping pump over 30 minutes. After the completion of dropping, the resultant reaction mixture was aged for 1 hour.

Next, from the reaction mixture, 28 g of MIBK was distilled off using a rotary evaporator, and then the reaction mixture was charged into 150 g of hexane/ethanol (mass ratio: 10:1) to precipitate a polymer in a slurry state. The resultant slurry was filtered under reduced pressure and the filtered substance was vacuum-dried to obtain 5.4 g of the objective substance (highly branched polymer 38) as a white powder.

The results of measuring $^1$H NMR and $^{13}$C NMR spectra of the obtained objective substance are shown in FIG. 85 and FIG. 86.

The weight average molecular weight Mw and the degree of distribution: Mw (weight average molecular weight)/Mn (number average molecular weight), both of which were measured by GPC in terms of polystyrene of the objective substance, were 36,000 and 2.7 respectively.

Example 54

<Synthesis of Highly Branched Polymer 39 Using DVB, C6FA, CHMI, and AF1>

Into a 100 mL reaction flask, 25 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 1.3 g (10 mmol) of DVB, 3.1 g (7.5 mmol) of C6FA, 0.9 g (5 mmol) of CHMI, 3.6 g (8 mmol) of AF1, and 25 g of MIBK were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed MIBK in the 100 mL reaction flask, the content of the 50 mL reaction flask in which DVB, C6FA, CHMI, and AF1 were charged was dropped using a dropping pump over 30 minutes. After the completion of dropping, the resultant reaction mixture was aged for 1 hour.

Next, from the reaction mixture, 42 g of MIBK was distilled off using a rotary evaporator and the resultant residue was charged into 130 g of methanol to precipitate a polymer in a slurry state. The resultant slurry was filtered under reduced pressure and the filtered substance was vacuum-dried to obtain 4.3 g of the objective substance (highly branched polymer 39) as a white powder.

The results of measuring $^1$H NMR and $^{13}$C NMR spectra of the obtained objective substance are shown in FIG. 87 and FIG. 88.

The weight average molecular weight Mw and the degree of distribution: Mw (weight average molecular weight)/Mn (number average molecular weight), both of which were measured by GPC in terms of polystyrene of the objective substance, were 21,000 and 1.8 respectively.

Example 55

<Synthesis of Highly Branched Polymer 40 Using DVB, C6FA, CHMI, and AF1>

Into a 100 mL reaction flask, 25 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 1.3 g (10 mmol) of DVB, 4.2 g (10 mmol) of C6FA, 1.8 g (10 mmol) of CHMI, 3.6 g (8 mmol) of AF1, and 25 g of MIBK were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed MIBK in the 100 mL reaction flask, the content of the 50 mL reaction flask in which DVB, C6FA, CHMI, and AF1 were charged was dropped using a dropping pump over 30 minutes. After the completion of dropping, the resultant reaction mixture was aged for 1 hour.

Next, from the reaction mixture, 42 g of MIBK was distilled off using a rotary evaporator and the resultant residue was charged into 130 g of methanol to precipitate a polymer in a slurry state. The resultant slurry was filtered under reduced pressure and the filtered substance was vacuum-dried to obtain 7.2 g of the objective substance (highly branched polymer 40) as a white powder.

The results of measuring $^1$H NMR and $^{13}$C NMR spectra of the obtained objective substance are shown in FIG. 89 and FIG. 90.

The weight average molecular weight Mw and the degree of distribution: Mw (weight average molecular weight)/Mn (number average molecular weight), both of which were measured by GPC in terms of polystyrene of the objective substance, were 32,000 and 2.5 respectively.

Example 56

<Synthesis of Highly Branched Polymer 41 Using DVB, C6FA, BMI, and AF1>

Into a 100 mL reaction flask, 25 g of MIBK was charged, and while stirring MIBK, nitrogen was flowed into the flask for 5 minutes, followed by heating the flask until the inside liquid was refluxed (at a temperature of about 116° C.).

Separately, into a 50 mL reaction flask, 1.3 g (10 mmol) of DVB, 3.1 g (7.5 mmol) of C6FA, 0.9 g (5 mmol) of BMI, 3.6 g (8 mmol) of AF1, and 25 g of MIBK were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed MIBK in the 100 mL reaction flask, the content of the 50 mL reaction flask in which DVB, C6FA, BMI, and AF1 were charged was dropped using a dropping pump over 30 minutes. After the completion of dropping, the resultant reaction mixture was aged for 1 hour.

Next, from the reaction mixture, 42 g of MIBK was distilled off using a rotary evaporator and the resultant residue was charged into 130 g of methanol to precipitate a polymer in a slurry state. The resultant slurry was filtered under reduced pressure and the filtered substance was vacuum-dried to obtain 4.8 g of the objective substance (highly branched polymer 41) as a white powder.

The results of measuring $^1$H NMR and $^{13}$C NMR spectra of the obtained objective substance are shown in FIG. 91 and FIG. 92.

The weight average molecular weight Mw and the degree of distribution: Mw (weight average molecular weight)/Mn (number average molecular weight), both of which were measured by GPC in terms of polystyrene of the objective substance, were 22,000 and 1.9 respectively.

Example 57

<Synthesis of Highly Branched Polymer 42 Using DVB, C6FA, CHMI, and AMBN>

Into a 200 mL reaction flask, 39 g of MIBK was charged, and while stirring MIBK, nitrogen was flowed into the flask for 5 minutes, followed by heating the flask until the inside liquid was refluxed (at a temperature of about 116° C.).

Separately, into a 100 mL reaction flask, 1.3 g (10 mmol) of DVB, 4.2 g (10 mmol) of C6FA, 1.8 g (10 mmol) of CHMI, 1.9 g (10 mmol) of AMBN, and 39 g of MIBK were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed MIBK in the 200 mL reaction flask, the content of the 100 mL reaction flask in which DVB, C6FA, CHMI, and AMBN were charged was dropped using a dropping pump over 30 minutes. After the completion of dropping, the resultant reaction mixture was aged for 1 hour.

Next, from the reaction mixture, 70 g of MIBK was distilled off using a rotary evaporator and the resultant residue was charged into 130 g of methanol to precipitate a polymer in a slurry state. The resultant slurry was filtered under reduced pressure and the filtered substance was vacuum-dried to obtain 5.6 g of the objective substance (highly branched polymer 42) as a white powder.

The results of measuring $^1$H NMR and $^{13}$C NMR spectra of the obtained objective substance are shown in FIG. 93 and FIG. 94.

The weight average molecular weight Mw and the degree of distribution: Mw (weight average molecular weight)/Mn (number average molecular weight), both of which were measured by GPC in terms of polystyrene of the objective substance, were 13,000 and 2.2 respectively.

Example 58

<Synthesis of Highly Branched Polymer 43 Using DVB, C6FA, and AMBN>

Into a 200 mL reaction flask, 62 g of toluene was charged, and while stirring toluene, nitrogen was flowed into the flask for 5 minutes, followed by heating the flask until the inside liquid was refluxed (at a temperature of about 110° C.).

Separately, into a 100 mL reaction flask, 3.3 g (25 mmol) of DVB, 5.2 g (12.5 mmol) of C6FA, 3.8 g (20 mmol) of AMBN, and 62 g of toluene were charged, and while stirring the resultant reaction mixture, nitrogen was flowed into the flask for 5 minutes to purge the inside of the flask with nitrogen, followed by cooling down the reaction mixture to 0° C. in an ice bath.

Into the refluxed toluene in the 200 mL reaction flask, the content of the 100 mL reaction flask in which DVB, C6FA, and AMBN were charged was dropped using a dropping pump over 30 minutes. After the completion of dropping, the resultant reaction mixture was aged for 1 hour.

Next, from the reaction mixture, 104 g of toluene was distilled off using a rotary evaporator and the resultant residue was charged into 130 g of hexane to precipitate a polymer in a slurry state. The resultant slurry was filtered under reduced pressure and the filtered substance was vacuum-dried to obtain 6.9 g of the objective substance (highly branched polymer 43) as a white powder.

The results of measuring $^1$H NMR and $^{13}$C NMR spectra of the obtained objective substance are shown in FIG. 95 and FIG. 96.

The weight average molecular weight Mw and the degree of distribution: Mw (weight average molecular weight)/Mn (number average molecular weight), both of which were measured by GPC in terms of polystyrene of the objective substance, were 17,000 and 2.6 respectively.

The weight average molecular weight and the degree of distribution of the highly branched polymers 1 to 43 and the linear polymers 1 to 3 prepared in Examples 1 to 11, 18 to 36, 45 to 50, and 54 to 58 and Comparative Examples 1 to 5, the fluorine monomer introduced amount of each highly branched polymer calculated from $^{13}$C NMR spectrum, the fluorine atom content of each highly branched polymer calculated from the element analysis, and the like are shown in Table 1.

TABLE 1

| Produced polymer | | Used unsaturated Monomer | Used fluorine Monomer | Polymerization initiator | Fluorine monomer charged amount relative to unsaturated monomer [eq. (mol)] | Mn | Mw/Mn | Fluorine monomer introduced amount calculated from $^{13}$C NMR [wt %] | Fluorine atom content calculated from element analysis [wt %] | Yield (%) |
|---|---|---|---|---|---|---|---|---|---|---|
| Highly branched polymer | 1 | EGDMA | C4FHM | MAIB | 0.5 | 21,000 | 3.5 | 21 | 11 | 53 |
| | 2 | EGDMA | C4FHM | MAIB | 1.0 | 17,000 | 2.9 | 37 | 21 | 46 |
| | 3 | EGDMA | C4FHA | MAIB | 1.0 | 22,000 | 2.9 | 38 | 27 | 68 |
| | 4 | EGDMA | C6FHA | MAIB | 0.5 | 15,000 | 2.2 | 19 | 22 | 56 |
| | 5 | EGDMA | C4FA | MAIB | 1.0 | 16,000 | 2.2 | 42 | 29 | 47 |
| | 6 | EGDMA | C6FM | MAIB | 0.5 | 17,000 | 2.1 | 17 | 20 | 54 |
| | 7 | EGDMA | C6FM | MAIB | 1.0 | 16,000 | 1.8 | 33 | 30 | 69 |
| | 8 | EGDMA | C6FA | MAIB | 0.5 | 17,000 | 2.2 | 25 | 25 | 48 |
| | 9 | EGDMA | C6FA | MAIB | 1.0 | 20,000 | 2.0 | 38 | 35 | 68 |
| | 10 | EGDMA | C6FA | MAIB | 0.1 | 16,000 | 3.8 | 8 | 7 | 70 |
| | 11 | EGDMA | C6FA | MAIB | 0.3 | 14,000 | 3.0 | 15 | 17 | 68 |
| | 13 | EGDMA | C6FA | MAIB | 0.5 | 6,800 | 1.9 | 25 | 23 | 43 |
| | 14 | DVB | C6FA | MAIB | 1.5 | 23,000 | 2.0 | 50 | 44 | 89 |
| | 15 | DCP | C6FA | MAIB | 0.5 | 12,000 | 1.9 | 25 | 17 | 40 |
| | 16 | ADM | C6FA | MAIB | 0.5 | 24,000 | 2.6 | 28 | 21 | 46 |
| | 17 | DCP | C6FA | DCHC | 0.5 | 20,000 | 2.4 | 23 | 17 | 45 |
| | 18 | DCP | C6FA | DCHC | 0.5 | 7,200 | 2.9 | Not measured | Not measured | 33 |
| | 19 | EGDMA | | AF1 | | 24,000 | 2.4 | | 8 | 64 |
| | 20 | EGDMA | C6FA | AF1 | 0.5 | 17,000 | 2.3 | 44 | 31 | 57 |
| | 21 | EGDMA | C6FA | AF1 | 1.5 | 19,000 | 3.4 | 50 | 32 | 63 |
| | 22 | DVB | | AF1 | | 11,000 | 2.1 | | 15 | 63 |
| | 23 | DVB | C6FA | AF1 | 0.5 | 12,000 | 1.9 | 25 | 27 | 48 |
| | 24 | DVB | C6FA | AF1 | 1.5 | 11,000 | 2.3 | 42 | 35 | 55 |
| | 25 | EGDMA | C6FA | AF6 | 0.5 | 12,000 | 1.6 | 29 | 38 | 35 |
| | 26 | DVB | | AF6 | | 16,000 | 1.4 | | 34 | 22 |
| | 27 | DVB | C6FA | AF6 | 0.5 | 13,000 | 1.2 | 19 | 43 | 19 |
| | 28 | EGDMA | C6FA | AVCA | 0.5 | 7,000 | 2.3 | 37 | 21 | 44 |
| | 29 | DVB | C6FA | AVCA | 0.5 | 47,000 | 3.9 | 37 | 23 | 42 |
| | 30 | DVB | C4FOH | AVCA | 1.1 | 34,000 | 1.8 | 33 | 23 | 57 |
| | 31 | DVB | C6FOH | AVCA | 1.5 | 46,000 | 1.6 | 32 | 31 | 59 |
| | 33 | EGDMA | C6FA | MAIB | 0.63 | 8,400 | 2.5 | 21 | 21 | 65 |
| | 34 | DCP | C6FA | DCHC | 0.64 | 8,000 | 1.9 | 19 | 17 | 40 |
| | 35 | PGHM | C6FA | DCHC | 0.5 | 7,000 | 3.1 | 29 | 19 | 55 |
| | 36 | EGDMA | C6FA | MAIB | 0.5 | 18,000 | 2.2 | 18 | 19 | 51 |
| | 37 | DVB | C6FA | MAIB | 0.5 | 23,000 | 1.4 | 21 | 20 | 20 |
| | 38 | EGDMA | C6FA | AF1 | 1.2 | 36,000 | 2.7 | 39 | 33 | 57 |
| | 39 | DVB | C6FA | AF1 | 0.75 | 21,000 | 1.8 | 20 | 29 | 49 |
| | 40 | DVB | C6FA | AF1 | 1.0 | 32,000 | 2.5 | 24 | 29 | 68 |
| | 41 | DVB | C6FA | AF1 | 0.75 | 22,000 | 1.9 | 19 | 28 | 55 |
| | 42 | DVB | C6FA | AMBN | 1.0 | 13,000 | 2.2 | 21 | 24 | 63 |
| | 43 | DVB | C6FA | AMBN | 0.5 | 17,000 | 2.6 | 17 | 27 | 65 |
| | 12 | EGDMA | | MAIB | | 17,000 | 4.8 | 0 | 0 | 65 |
| | 32 | DVB | | AVCA | | 22,000 | 2.1 | 0 | 0 | 70 |
| Linear polymer | 1 | MMA | C6FA | MAIB | 0.25 | 21,000 | 2.0 | 15 | 26 | 40 |
| | 2 | MMA | C6FA | MAIB | 0.25 | 11,000 | 1.8 | 14 | 25 | 42 |
| | 3 | MMA | C6FA | MAIB | 0.25 | 8,000 | 1.9 | 15 | 24 | 35 |

Example 12

<Solubility of Highly Branched Polymers 1 to 43 and Linear Polymers 1 to 3 in Organic Solvent>

The solubilities of the highly branched polymers 1 to 43 and linear polymers 1 to 3 prepared in Examples 1 to 11, 18 to 36, 45 to 50, and 54 to 58, and Comparative Examples 1 to 5 in organic solvents were evaluated. 10 mg of each of the highly branched polymers 1 to 43 and the linear polymers 1 to 3 was dissolved in 90 mg of each of the organic solvents shown in Table 2 to evaluate the solubility. The results thereof are shown in Table 2.

[Evaluation Criteria]
A . . . state of complete dissolution
B . . . state with the undissolved remaining

TABLE 2

| Produced polymer | | Acetone | THF | Toluene | DMF | Hexane | Methanol | Water |
|---|---|---|---|---|---|---|---|---|
| Highly branched polymer | 1 | A | A | A | A | B | B | B |
| | 2 | A | A | A | A | B | B | B |
| | 3 | A | A | A | A | B | B | B |
| | 4 | A | A | A | A | B | B | B |
| | 5 | A | A | A | A | B | B | B |
| | 6 | A | A | A | A | B | B | B |
| | 7 | A | A | A | A | B | B | B |
| | 8 | A | A | A | A | B | B | B |
| | 9 | A | A | A | A | B | B | B |
| | 10 | A | A | A | A | B | B | B |
| | 11 | A | A | A | A | B | B | B |
| | 13 | A | A | A | A | B | B | B |
| | 14 | B | B | B | B | B | B | B |
| | 15 | A | A | A | A | B | B | B |
| | 16 | A | A | A | B | B | B | B |
| | 17 | A | A | A | B | B | B | B |
| | 18 | A | A | A | B | B | B | B |
| | 19 | A | A | B | A | B | B | B |
| | 20 | A | A | B | A | B | B | B |
| | 21 | A | A | B | B | B | B | B |
| | 22 | A | A | B | A | B | B | B |
| | 23 | A | A | B | A | B | B | B |
| | 24 | A | A | B | A | B | B | B |
| | 25 | A | A | B | B | B | B | B |
| | 26 | A | A | B | B | B | B | B |
| | 27 | B | B | B | B | B | B | B |
| | 28 | A | A | B | A | B | B | B |
| | 29 | A | A | B | A | B | A | B |
| | 30 | A | A | B | A | B | B | B |
| | 31 | A | A | B | B | B | B | B |
| | 33 | A | A | A | A | B | B | B |
| | 34 | A | A | A | A | B | B | B |
| | 35 | A | A | B | A | B | B | B |
| | 36 | A | A | A | A | B | B | B |
| | 37 | A | A | A | B | A | B | B |
| | 38 | A | A | A | B | B | B | B |
| | 39 | A | A | A | B | B | B | B |
| | 40 | A | A | A | B | B | B | B |
| | 41 | A | A | A | A | B | B | B |
| | 42 | A | A | A | B | B | B | B |
| | 43 | A | A | A | B | B | B | B |
| | 12 | A | A | A | A | B | B | B |
| | 32 | A | A | B | A | B | A | B |
| Linear polymer | 1 | A | A | A | B | B | B | B |
| | 2 | A | A | A | B | B | B | B |
| | 3 | A | A | A | B | B | B | B |

Example 13

<Thin Film Formation and Physical Properties Evaluation of Highly Branched>Polymers 1 to 43 and Linear Polymers 1 to 3

0.25 g of each of the highly branched polymers 1 to 43 and the linear polymers 1 to 3 obtained in Examples 1 to 11, 18 to 36, 45 to 50, and 54 to 58 and Comparative Examples 1 to 5 was dissolved in 4.75 g of each of the solvents described in Table 3 and the resultant solution was filtered with a filter to prepare each highly branched polymer solution or each linear polymer solution. A silicon wafer was spin-coated (slope 5 seconds, 1,500 rpm 30 seconds, slope 5 seconds) with the highly branched polymer solution or the linear polymer solution and the resultant coating was subjected to thermal treatment at 100° C. for 30 minutes to evaporate the solvent and to form a film.

The refractive index at a wavelength of 633 nm and the contact angle relative to water and diiodomethane of the obtained thin film were evaluated. From the result of measuring the contact angle, the surface energy was calculated. Further, the glass transition temperature (Tg) and the 5% weight loss temperature ($Td_5$%) of each highly branched polymer powder or each linear polymer powder were measured. The obtained results are shown in Table 3.

TABLE 3

| Produced polymer | | Solvent | Td$_{5\%}$ [° C.] | Tg [° C.] | Film thickness [nm] | Refractive index [633 nm] | Contact angle relative to water [degree] | Contact angle relative to diiodomethane [degree] | Surface energy [mJ/m$^2$] |
|---|---|---|---|---|---|---|---|---|---|
| Highly branched polymer | 1 | PGMEA | 257.8 | 96.6 | 120.0 | 1.463 | 82.4 | 52.8 | 34.4 |
| | 2 | PGMEA | 252.8 | 97.1 | 107.8 | 1.459 | 86.9 | 59.7 | 30.2 |
| | 3 | PGMEA | 282.7 | 95.1 | 108.0 | 1.449 | 86.6 | 60.3 | 30.0 |
| | 4 | PGMEA | 282.7 | 95.1 | 99.4 | 1.455 | 103.7 | 76.0 | 19.7 |
| | 5 | PGMEA | 272.4 | 78.0 | 102.8 | 1.445 | 103.6 | 69.8 | 23.0 |
| | 6 | PGMEA | 258.1 | 86.6 | 108.7 | 1.465 | 100.7 | 72.6 | 21.7 |
| | 7 | PGMEA | 252.9 | 78.8 | 103.0 | 1.442 | 107.1 | 86.9 | 14.5 |
| | 8 | PGMEA | 272.1 | 79.6 | 106.9 | 1.452 | 104.4 | 76.1 | 19.6 |
| | 9 | PGMEA | 268.8 | 75.5 | 106.9 | 1.442 | 107.4 | 79.6 | 17.7 |
| | 10 | PGMEA | 278.8 | 101.2 | 104.4 | 1.487 | 88.4 | 60.9 | 29.3 |
| | 11 | PGMEA | 281.1 | 97.0 | 95.4 | 1.466 | 99.6 | 69.8 | 23.2 |
| | 13 | PGMEA | 278.0 | 74.7 | 108.1 | 1.45 | 105 | 78.2 | 18.6 |
| | 14 | HFE | 268.0 | 73.0 | 100.1 | 1.412 | 111 | 79.8 | 16.4 |
| | 15 | Toluene | 305.0 | 127.0 | 116.6 | 1.488 | 100.1 | 69.5 | 23.9 |
| | 16 | Toluene | 296.2 | 145.0 | 184.5 | 1.463 | 101.3 | 67.5 | 24.3 |
| | 17 | Toluene | 284.1 | 130.6 | 93.2 | 1.492 | 103.7 | 66.9 | 24.6 |
| | 18 | Toluene | 262.7 | 134.5 | 205.7 | 1.488 | 102.1 | 72.8 | 21.4 |
| | 19 | MIBK | 262.7 | 87.0 | 174.2 | 1.486 | 74.7 | 49.3 | 38.4 |
| | 20 | MIBK | 272.4 | 60.1 | 149.6 | 1.442 | 108.0 | 90.3 | 13.1 |
| | 21 | HFE | 270.3 | 49.4 | 131.7 | 1.417 | 111.4 | 90.8 | 12.5 |
| | 22 | MIBK | 313.5 | 99.3 | 174.2 | 1.508 | 82.6 | 54.8 | 33.5 |
| | 23 | MIBK | 318.4 | 96.1 | 153.9 | 1.475 | 108.0 | 85.0 | 15.2 |
| | 24 | HFE | 268.7 | 67.1 | 137.0 | 1.435 | 112.6 | 82.2 | 16.4 |
| | 25 | MIBK | 273.0 | 89.3 | 142.2 | 1.439 | 103.3 | 84.9 | 15.9 |
| | 26 | MIBK | 317.6 | None | 153.4 | 1.476 | 106.4 | 83.6 | 16.0 |
| | 27 | HFE | 296.1 | 132.2 | 266.9 | 1.451 | 109.5 | 88.0 | 13.8 |
| | 28 | MIBK | 280.6 | 117.1 | 178.1 | 1.495 | 108.0 | 85.3 | 15.1 |
| | 29 | MIBK | 278.9 | None | 178.1 | 1.495 | 101.7 | 76.3 | 19.8 |
| | 30 | MIBK | 219.1 | None | 172.2 | 1.499 | 95.8 | 81.7 | 18.8 |
| | 31 | MIBK | 201.3 | None | 172.2 | 1.499 | 106.1 | 87.7 | 14.4 |
| | 33 | Toluene | 261.2 | 64.6 | 185.2 | 1.459 | 104.2 | 70.9 | 22.4 |
| | 34 | Toluene | 271.5 | 96.8 | 194.4 | 1.483 | 106.6 | 65.4 | 25.7 |
| | 35 | PGME | 259.1 | 84.2 | 162.6 | 1.472 | 107.2 | 79.8 | 17.7 |
| | 36 | MIBK | 262.2 | 68.4 | 167.7 | 1.457 | 104.1 | 76.4 | 19.5 |
| | 37 | MIBK | 298.1 | 61.3 | 176.5 | 1.476 | 101.4 | 76.8 | 19.6 |
| | 38 | MIBK | 264.1 | 54.0 | 148.0 | 1.427 | 107.0 | 77.0 | 19.1 |
| | 39 | MIBK | 319.5 | None | 159.4 | 1.475 | 109.3 | 75.0 | 20.2 |
| | 40 | MIBK | 310.9 | None | 154.2 | 1.473 | 109.8 | 76.5 | 19.3 |
| | 41 | MIBK | 304.4 | None | 152.3 | 1.484 | 108.8 | 80.0 | 17.5 |
| | 42 | MIBK | 266.2 | None | 168.0 | 1.488 | 108.5 | 69.3 | 23.5 |
| | 43 | MIBK | 271.2 | None | 175.4 | 1.489 | 104.8 | 69.6 | 23.1 |
| | 13 | PGMEA | 266.8 | 118.0 | 118.4 | 1.498 | 73.4 | 35.1 | 45.6 |
| | 32 | PGMEA | None | 136.5 | 142.2 | 1.439 | 57.3 | 30.8 | 52.0 |
| Linear polymer | 1 | Toluene | 253.0 | 61.0 | 106.8 | 1.431 | 109.8 | 77.5 | 18.8 |
| | 2 | Toluene | 257.8 | 71.5 | 198.8 | 1.444 | 104.5 | 84.9 | 15.7 |
| | 3 | Toluene | 250.6 | 67.1 | 189.2 | 1.444 | 96.8 | 75.3 | 21.0 |

Example 14

<Surface Modification of Photocured Resin Using Highly Branched Polymer 2, 4, 8>

A-DCP as a photopolymerizable compound (monomer), the highly branched polymer 2, 4, or 8 as a highly branched polymer, Irg. 907 as a photopolymerization initiator, and PGMEA as an organic solvent were blended each in a blending amount described in Table 4, and the resultant mixture was filtered with a filter to prepare each photopolymerizable composition. A silicon wafer was spin-coated (slope 5 seconds, 1,500 rpm 30 seconds, slope 5 seconds) with the composition and the resultant coating was subjected to thermal treatment at 60° C. for 1 minute to perform pre-drying and to prepare the thin films of Application Examples 1 to 12. As comparative examples, there were prepared a thin film in which no highly branched polymer was blended (Application Example 13), a thin film in which, instead of a highly branched polymer, the linear polymer 1 prepared in Comparative Example 3 was blended (Application Example 14), and a thin film in which, instead of a highly branched polymer, a commercially available fluorinated surface modifier F-552 was blended (Application Example 15).

Each of the obtained thin films (Application Examples 1 to 15) was exposed to light using a UV irradiation apparatus at an exposure dose of 16 mW/cm$^2$ for 10 minutes. The exposed thin film was subjected to thermal treatment at 150° C. for 20 minutes to prepare a photocured thin film.

With respect to each of the obtained photocured thin films, there were measured the film thickness measured by a high-precision microfigure measuring instrument, the refractive index at a wavelength of 633 nm measured by ellipsometry, the total light transmittance and the haze measured by a haze meter, and the contact angle relative to water and diiodomethane. The obtained results are shown in Table 5.

TABLE 4

|  |  | A-DCP [g] | Highly branched polymer [g] | Irg. 907 [mg] | PGMEA [g] | Total resin concentration* [wt %] | Blending amount of highly branched polymer based on mass of whole resin [wt %] |
|---|---|---|---|---|---|---|---|
| Application Example 1 | Highly branched polymer 2 | 4.50 | 0.50 | 50 | 15.0 | 25 | 10 |
| Application Example 2 | Highly branched polymer 4 | 4.50 | 0.50 | 50 | 15.0 | 25 | 10 |
| Application Example 3 | Highly branched polymer 8 | 4.50 | 0.50 | 50 | 15.0 | 25 | 10 |
| Application Example 4 | Highly branched polymer 2 | 4.75 | 0.25 | 50 | 10.0 | 33 | 5 |
| Application Example 5 | Highly branched polymer 4 | 4.75 | 0.25 | 50 | 10.0 | 33 | 5 |
| Application Example 6 | Highly branched polymer 8 | 4.75 | 0.25 | 50 | 10.0 | 33 | 5 |
| Application Example 7 | Highly branched polymer 2 | 4.95 | 0.05 | 50 | 10.0 | 33 | 1 |
| Application Example 8 | Highly branched polymer 4 | 4.95 | 0.05 | 50 | 10.0 | 33 | 1 |
| Application Example 9 | Highly branched polymer 8 | 4.95 | 0.05 | 50 | 10.0 | 33 | 1 |
| Application Example 10 | Highly branched polymer 2 | 4.975 | 0.025 | 50 | 10.0 | 33 | 0.5 |
| Application Example 11 | Highly branched polymer 8 | 4.975 | 0.025 | 50 | 10.0 | 33 | 0.5 |
| Application Example 12 | Highly branched polymer 8 | 9.990 | 0.010 | 100 | 10.0 | 33 | 0.1 |
| Application Example 13 | — | 5.00 | — | 50 | 15.0 | 25 | 0.0 |
| Application Example 14 | Linear polymer 1 | 9.990 | 0.010 | 100 | 10.0 | 50 | 0.1 |
| Application Example 15 | F-552 | 9.990 | 0.010 | 100 | 10.0 | 50 | 0.1 |

*expresses the blending amount (% by mass) of the whole resin (A-DCP and highly branched polymer), based on the total mass of the resin composition.

TABLE 5

|  |  | Film thickness [μm] | Total light transmittance [%] | Haze | Refractive index (633 nm) | Contact angle [degree] | |
|---|---|---|---|---|---|---|---|
|  |  |  |  |  |  | Water | Diiodomethane |
| Application Example 1 | Highly branched polymer 2 | 0.890 | 100.0 | 0.00 | 1.527 | 76.7 | 56.2 |
| Application Example 2 | Highly branched polymer 4 | 0.792 | 100.0 | 0.04 | 1.510 | 106.6 | 74.0 |
| Application Example 3 | Highly branched polymer 8 | 0.862 | 100.0 | 0.00 | 1.504 | 107.2 | 78.8 |
| Application Example 4 | Highly branched polymer 2 | 1.353 | 100.0 | 0.14 | 1.531 | 78.9 | 56.2 |
| Application Example 5 | Highly branched polymer 4 | 1.313 | 100.0 | 0.06 | 1.525 | 108.1 | 72.1 |
| Application Example 6 | Highly branched polymer 8 | 1.326 | 100.0 | 0.04 | 1.510 | 107.6 | 74.0 |
| Application Example 7 | Highly branched polymer 2 | 1.156 | 100.0 | 0.07 | 1.530 | 77.4 | 50.9 |
| Application Example 8 | Highly branched polymer 4 | 1.384 | 100.0 | 0.05 | 1.530 | 100.5 | 67.9 |
| Application Example 9 | Highly branched polymer 8 | 1.391 | 100.0 | 0.39 | 1.530 | 102.0 | 70.8 |
| Application Example 10 | Highly branched polymer 2 | 1.321 | 100.0 | 0.00 | 1.530 | 73.7 | 46.7 |
| Application Example 11 | Highly branched polymer 8 | 1.422 | 100.0 | 0.11 | 1.530 | 95.7 | 65.3 |
| Application Example 12 | Highly branched polymer 8 | 3.504 | 100.0 | 0.00 | 1.530 | 90.5 | 65.0 |
| Application Example 13 | — | 0.770 | 100.0 | 0.12 | 1.531 | 64.8 | 28.4 |
| Application Example 14 | Linear polymer 1 | 1.301 | 100.0 | 0.10 | 1.530 | 77.4 | 50.7 |
| Application Example 15 | F-552 | 2.580 | 100.0 | 0.15 | 1.530 | 87.5 | 29.2 |

As shown in Table 5, each of the photocured thin films of Application Examples 1 to 12 in which the highly branched polymer 2, 4, or 8 was blended exhibited a high total light transmittance and a low haze, as with the photocured thin film of Application Example 13 in which no highly branched polymer was blended.

While the photocured thin film (Application Example 13) of A-DCP alone in which no highly branched polymer was blended exhibited a contact angle relative to water of 64.8 degrees and a contact angle relative to diiodomethane of 28.4 degrees, the photocured thin films (Application Examples 1 to 12) in which a highly branched polymer was blended exhibited high contact angles such as a contact angle relative to water of 73.7 to 108.1 degrees and a contact angle relative to diiodomethane of 46.7 to 78.8 degrees. From these results, it became apparent that by blending a highly branched polymer, a water-repellent/oil-repellent property was imparted.

Further, in comparison with a case where the linear polymer 1 was blended (Application Example 14) and a case where F-552 was blended (Application Example 15), the photocured thin film (Application Example 12) in which the highly branched polymer 8 was blended exhibited a high contact angle. From this result, it became apparent that the highly branched polymer of the present invention in which a branched structure was introduced in a positive manner exhibited particle-like behaviors and was easily concentrated in the surface of a photocured thin film, so that exhibited a high contact angle.

Example 15

<Surface Modification of Thermoplastic Resin Using Highly Branched Polymer 2, 4, or 8>

PMMA or PLA as a thermoplastic resin, the highly branched polymer 2, 4, or 8, and THF (when using PMMA) or chloroform (when using PLA) as an organic solvent were blended each in a blending amount described in Table 6, and the resultant mixture was filtered with a filter to prepare a thermoplastic resin composition. The composition was cast on a glass substrate and the resultant coating was dried at 20° C. for 16 hours to prepare the cast films of Application Examples 16 to 31. As comparative examples, there were prepared cast films in which no highly branched polymer was blended (Application Examples 32 and 33).

Each of the obtained cast films was subjected to thermal treatment under vacuum at 50° C. for 8 hours.

With respect to each of the films that were subjected to thermal treatment, there were measured the film thickness measured by a high-precision microfigure measuring instrument, the total light transmittance and the haze measured by a haze meter, and the contact angle relative to water or diiodomethane. The results thereof are shown in Table 7.

TABLE 6

| | Used highly branched polymer | Used thermoplastic resin | Blending amount | | | Total resin concentration* [wt %] | Blending amount of highly branched polymer based on mass of whole resin [wt %] |
| --- | --- | --- | --- | --- | --- | --- | --- |
| | | | Thermoplastic resin [g] | Highly branched polymer [g] | Organic solvent [g] | | |
| Application Example 16 | 2 | PMMA | 0.500 | 0.005 | 9.5 | 5.0 | 1 |
| Application Example 17 | 4 | PMMA | 0.500 | 0.005 | 9.5 | 5.0 | 1 |
| Application Example 18 | 8 | PMMA | 0.500 | 0.005 | 9.5 | 5.0 | 1 |
| Application Example 19 | 2 | PMMA | 1.000 | 0.005 | 19.0 | 5.0 | 0.5 |
| Application Example 20 | 4 | PMMA | 1.000 | 0.005 | 19.0 | 5.0 | 0.5 |
| Application Example 21 | 8 | PMMA | 1.000 | 0.005 | 19.0 | 5.0 | 0.5 |
| Application Example 22 | 2 | PMMA | 1.000 | 0.001 | 19.0 | 5.0 | 0.1 |
| Application Example 23 | 8 | PMMA | 1.000 | 0.001 | 19.0 | 5.0 | 0.1 |
| Application Example 24 | 2 | PLA | 0.500 | 0.005 | 19.5 | 2.5 | 1 |
| Application Example 25 | 4 | PLA | 0.500 | 0.005 | 19.5 | 2.5 | 1 |
| Application Example 26 | 8 | PLA | 0.500 | 0.005 | 19.5 | 2.5 | 1 |
| Application Example 27 | 2 | PLA | 1.000 | 0.005 | 39.0 | 2.5 | 0.5 |
| Application Example 28 | 4 | PLA | 1.000 | 0.005 | 39.0 | 2.5 | 0.5 |
| Application Example 29 | 8 | PLA | 1.000 | 0.005 | 39.0 | 2.5 | 0.5 |
| Application Example 30 | 2 | PLA | 1.000 | 0.001 | 39.0 | 2.5 | 0.1 |
| Application Example 31 | 8 | PLA | 1.000 | 0.001 | 39.0 | 2.5 | 0.1 |
| Application Example 32 | — | PMMA | 0.500 | 0.005 | 9.5 | 5.0 | 0 |
| Application Example 33 | — | PLA | 0.500 | 0.005 | 19.5 | 2.5 | 0 |

*expresses the blending amount (% by mass) of the whole resin (thermoplastic resin and highly branched polymer), based on the total mass of the resin composition.

TABLE 7

| | Highly branched polymer | Thermo-plastic resin | Film thickness [μm] | Total light transmittance | Haze | Contact angle [degree] Water | Contact angle [degree] Diiodomethane |
|---|---|---|---|---|---|---|---|
| Application Example 16 | 2 | PMMA | 8.02 | 100.0 | 0.06 | 86.2 | 57.4 |
| Application Example 17 | 4 | PMMA | 10.38 | 100.0 | 0.40 | 103.2 | 75.4 |
| Application Example 18 | 8 | PMMA | 12.48 | 100.0 | 0.68 | 103.9 | 79.1 |
| Application Example 19 | 2 | PMMA | 6.48 | 100.0 | 0.04 | 84.8 | 53.8 |
| Application Example 20 | 4 | PMMA | 8.18 | 100.0 | 0.06 | 100.7 | 77.8 |
| Application Example 21 | 8 | PMMA | 6.24 | 100.0 | 0.17 | 103.0 | 79.2 |
| Application Example 22 | 2 | PMMA | 7.97 | 100.0 | 0.02 | 83.8 | 56.3 |
| Application Example 23 | 8 | PMMA | 10.95 | 100.0 | 0.13 | 101.1 | 76.9 |
| Application Example 24 | 2 | PLA | 9.23 | 100.0 | 0.00 | 85.8 | 59.0 |
| Application Example 25 | 4 | PLA | 6.52 | 100.0 | 0.04 | 103.6 | 78.5 |
| Application Example 26 | 8 | PLA | 5.56 | 100.0 | 0.01 | 104.5 | 80.1 |
| Application Example 27 | 2 | PLA | 7.91 | 100.0 | 0.00 | 83.7 | 60.9 |
| Application Example 28 | 4 | PLA | 7.98 | 100.0 | 0.00 | 102.9 | 79.6 |
| Application Example 29 | 8 | PLA | 8.38 | 100.0 | 0.04 | 103.4 | 81.5 |
| Application Example 30 | 2 | PLA | 8.85 | 100.0 | 0.00 | 85.1 | 60.7 |
| Application Example 31 | 8 | PLA | 9.97 | 100.0 | 0.02 | 101.4 | 81.9 |
| Application Example 32 | — | PMMA | 8.86 | 100.0 | 0.12 | 75.5 | 39.6 |
| Application Example 33 | — | PLA | 10.53 | 100.0 | 0.11 | 75.7 | 43.7 |

As shown in Table 7, each of the cast films of Application Examples 16 to 31 in which the highly branched polymer 2, 4, or 8 was blended exhibited a high total light transmittance and a low haze, as with the cast films of Application Examples 32 and 33 in which no highly branched polymer was blended.

While the cast film (Application Example 32) of PMMA alone in which no highly branched polymer was blended exhibited a contact angle relative to water of 75.5 degrees and a contact angle relative to diiodomethane of 39.6 degrees, each of the PMMA cast films (Application Examples 16 to 23) in which a highly branched polymer was blended exhibited high contact angles such as a contact angle relative to water of 83.8 to 103.9 degrees and a contact angle relative to diiodomethane of 53.8 to 79.2 degrees. Further, while the cast film (Application Example 33) of PLA alone in which no highly branched polymer was blended exhibited a contact angle relative to water of 75.7 degrees and a contact angle relative to diiodomethane of 43.7 degrees, each of the PLA cast films (Application Examples 24 to 31) in which a highly branched polymer was blended exhibited high contact angles such as a contact angle relative to water of 83.7 to 104.5 degrees and a contact angle relative to diiodomethane of 59.0 to 81.9 degrees. From these results, it became apparent that also with respect to any one resin of PMMA and PLA, by blending a highly branched polymer, a water-repellent/oil-repellent property was imparted.

Example 16

<Surface Analysis of Highly Branched Polymer 3/PMMA-Blended Thin Film>

The highly branched polymer 3 and PMMA (manufactured by Polymer Source, Inc.; product No. P88-MMA; Mw: 19,300, Mw/Mn: 1.06) were blended so that the mass ratio between them became 5/95, and then 4.5 parts by mass of the resultant mixture was dissolved in 95.5 parts by mass of toluene (substrate concentration: 4.5% by mass). A silicon wafer was spin-coated (1,300 rpm, 60 seconds) with the resultant toluene solution and the resultant coating was dried at 25° C. for 12 hours to prepare a highly branched polymer 3/PMMA-blended thin film (Application Example 34) having a film thickness of about 200 nm. As a comparative example, a thin film of the highly branched polymer 3 alone (Application Example 35) in which no PMMA was blended was prepared.

Each of the obtained thin films was subjected to thermal treatment in vacuum at 150° C. for 24 hours.

Each thin film before and after the thermal treatment was subjected to the XPS measurement with respect to a C atom, an O atom, and a F atom in the outermost surface (in a range of from the surface to about the depth of around 10 nm) of the thin film. From the obtained results, an intensity ratio of F atom/C atom in each thin film was calculated and the fraction of the highly branched polymer 3 in the outermost surface of the blended thin film of Application Example 34 was obtained. The result thereof is shown in Table 8.

TABLE 8

|  | Used polymer | F atom/C atom intensity ratio | | Fraction of highly branched polymer 3 in outermost surface [%]* | |
|---|---|---|---|---|---|
|  |  | Before thermal treatment | After thermal treatment | Before thermal treatment | After thermal treatment |
| Application Example 34 | Highly branched polymer 3/PMMA | 0.57 | 1.25 | 33.7 | 60.1 |
| Application Example 35 | Highly branched polymer alone | 1.69 | 2.08 | 100 | 100 |

*expresses a ratio relative to the F/C ratio of Application Example 35.

As shown in Table 8, the fraction of the highly branched polymer 3 in the outermost surface of the highly branched polymer 3/PMMA-blended thin film was significantly changed between before and after the thermal treatment and it was confirmed that the highly branched polymer 3 existed in a greater amount in the outermost surface of the highly branched polymer 3/PMMA-blended thin film that had been subjected to the thermal treatment.

Example 17

<Peeling Strength Test of Highly Branched Polymer 3/PMMA Bulk Film>

The highly branched polymer 3 and poly(methyl methacrylate) (manufactured by Aldrich Corp.; CAS No. 9011-147; Mw: 350,000) were blended so that the mass ratio between them became 5/95, and then 2 parts by mass of the resultant mixture was dissolved in 98 parts by mass of toluene (substrate concentration: 2% by mass). The resultant solution was subjected to re-precipitation in hexane having a volume of 80 times the volume of the solution and the deposited solid was filtered and dried. The resultant solid was press-molded at 210° C. under 40 MPa for 10 minutes and then was further maintained at 140° C. for 10 minutes to prepare a highly branched polymer 3/PMMA bulk film having a thickness of 100 μm. As a comparative example, a film of PMMA alone having a thickness of 100 μm in which the highly branched polymer 3 was not blended was prepared in the same manner.

Separately, a commercially available polycarbonate was press-molded at 255° C. under 40 MPa for 10 minutes to prepare a polycarbonate film having a thickness of 40 μm.

The prepared highly branched polymer 3/PMMA bulk film was layered with the prepared polycarbonate film and the resultant laminate was thermally compressed using a pressing machine at 140° C. while applying a pressure of 30 MPa thereto. In the same manner, the film of PMMA alone and the polycarbonate film were layered and the resultant laminate was thermally compressed.

With respect to each of the obtained laminated films, a laminated film cut out into a size of 8 mm width was pulled at a rate of 300 mm/min according to the 180-degree peeling test (JIS K6854) using a tension tester to evaluate the peeling strength of the laminated film. The result thereof is shown in FIG. 25.

As shown in FIG. 25, in comparison with the case of the film of PMMA alone, the highly branched polymer 3/PMMA bulk film exhibited a lower peeling strength. That is, there was obtained such a result that by blending the highly branched polymer 3, the peeling property of the PMMA film was enhanced.

Example 37

<Solubility in Multifunctional Acrylic Monomer>

The solubility of each of the polymers obtained in Examples 8, 18, and 45 and Comparative Examples 3 to 5 in the multifunctional acrylic monomers TPTA and AD-TMP was evaluated. The solubility of the commercially available fluorinated surface modifiers F-552 and F-554 in the multifunctional acrylic monomers was also evaluated in the same manner. 0.1 g of each polymer, F-552, or F-554 was charged into 9.9 g of each multifunctional acrylic monomer and the resultant mixture was stirred while heating at 80° C. in a screw tube for 3 hours to evaluate the solubility thereof. The obtained results are shown in Table 9.

[Evaluation Criteria]
A . . . a state of complete dissolution
C . . . a state of dissolution with cloudiness
B . . . a state with the undissolved remaining

TABLE 9

|  |  | TPTA | AD-TMP |
|---|---|---|---|
| Application Example 36 | Highly branched polymer 8 | B | B |
| Application Example 37 | Highly branched polymer 13 | A | A |
| Application Example 38 | Highly branched polymer 33 | A | A |
| Application Example 39 | Linear polymer 1 | C | C |
| Application Example 40 | Linear polymer 2 | B | B |
| Application Example 41 | Linear polymer 3 | B | B |
| Application Example 42 | F-552 | B | B |
| Application Example 43 | F-554 | B | B |

As shown in Table 9, the highly branched polymers 13 and 33 exhibited advantageous solubilities in TPTA and AD-TMP, so that it was confirmed that even without using a solvent, the highly branched polymer can be directly blended in the resin. On the other hand, none of the linear polymers 1 to 3 was dissolved. The commercially available fluorinated surface modifiers were not dissolved either.

Example 38

<Surface Modification of Photocured Resin Using Highly Branched Polymers 13 and 33>

In TPTA or AD-TMP as a multifunctional acrylic monomer, the highly branched polymer 13 or 33 in a blending amount shown in Table 10 was blended so that the total mass of the acrylic monomer and the highly branched polymer became 10.0 g and the resultant mixture was stirred while heating at 80° C. for 3 hours to dissolve the highly branched polymer. Then, the resultant solution was cooled down to room temperature (about 25° C.), and thereto, 0.1 g of a photopolymerization initiator described in Table 10 was added, followed by stirring the resultant mixture at room temperature (about 25° C.) for 1 hour to dissolve the photopolymerization initiator. The resultant solution was injected onto a glass substrate using a silicone resin having a thickness of 1 mm as a spacer and the resultant coating was exposed to light using a UV irradiation apparatus at an exposure dose of 16 mW/cm$^2$ for 10 minutes to prepare a photocured resin having a thickness of 1 mm. As a comparative example, a photocured resin in which no highly branched polymer was blended was prepared in the same manner.

With respect to each of the obtained photocured resins, the total light transmittance and the haze measured by a haze meter and the contact angle relative to water were measured. The obtained results are shown in Table 10.

TABLE 10

| | Highly branched polymer No. | Acrylic monomer | Blending amount of highly branched polymer relative to acrylic monomer [wt %] | Photo-polymerization initiator | Total light transmittance [%] | Haze | Contact angle relative to water [degree] |
|---|---|---|---|---|---|---|---|
| Application Example 44 | 13 | TPTA | 1 | Irg. 907 | 86.4 | 28.1 | 105.3 |
| Application Example 45 | 13 | TPTA | 0.5 | Irg. 907 | 81.8 | 30.3 | 99.1 |
| Application Example 46 | 13 | TPTA | 0.1 | Irg. 907 | 81.0 | 28.2 | 94.7 |
| Application Example 47 | 33 | TPTA | 1 | Irg. 907 | 93.7 | 21.4 | 100.1 |
| Application Example 48 | 13 | AD-TMP | 1 | Irg. 184 | 89.5 | 11.2 | 105.5 |
| Application Example 49 | 13 | AD-TMP | 1 | Irg. 651 | 87.4 | 21.3 | 104.2 |
| Application Example 50 | 13 | AD-TMP | 1 | Irg. 907 | 83.1 | 20.1 | 105.3 |
| Application Example 51 | 13 | AD-TMP | 1 | Dar. 1173 | 88.9 | 18.0 | 105.2 |
| Application Example 52 | 33 | AD-TMP | 1 | Irg. 907 | 88.5 | 31.8 | 103.3 |
| Application Example 53 | — | TPTA | — | Irg. 907 | 80.6 | 29.6 | 74.0 |
| Application Example 54 | — | AD-TMP | — | Irg. 907 | 85.4 | 14.8 | 73.9 |

As shown in Table 10, each of the photocured resins (Application Examples 44 to 47) in which the highly branched polymer 13 or 33 was blended with TPTA exhibited a high total light transmittance and a low haze, as with the photocured resin (Application Example 53) in which no highly branched polymer was blended.

While the photocured resin (Application Example 53) of TPTA alone in which no highly branched polymer was blended exhibited a contact angle relative to water of 74.0 degrees, each of the photocured resins (Application Examples 44 to 47) in which a highly branched polymer was blended exhibited a high contact angle such as a contact angle relative to water of 94.7 to 105.3 degrees. From this result, it became apparent that by blending a highly branched polymer, a water-repellent property was imparted.

On the other hand, the photocured resins (Application Examples 50 and 52) using Irg. 907 as a photopolymerization initiator in which the highly branched polymer 13 or 33 was blended with AD-TMP exhibited a high total light transmittance and a low haze, as with the photocured resin (Application Example 54) using the same photopolymerization initiator Irg. 907 in which no highly branched polymer was blended.

While the photocured resin (Application Example 54) of AD-TMP alone in which no highly branched polymer was blended exhibited a contact angle relative to water of 73.9 degrees, each of the photocured resins (Application Examples 50 and 52) in which a highly branched polymer was blended exhibited a high contact angle such as a contact angle relative to water of 103.3 to 105.3 degrees. From this result, it became apparent that by blending a highly branched polymer, a water-repellent property was imparted.

Further, also in the cases where another photopolymerization initiator was used (Application Examples 48, 49, and 51), the photocurable resin exhibited a high contact angle relative to water such as 104.2 to 105.5 degrees.

Example 39

<Solubility in Epoxy Resin>

The solubility of each of the polymers obtained in Examples 8, 18, 20 to 23, 46, and 47 and Comparative Examples 3 to 5 in an epoxy resin CEL 2021P was evaluated. The solubility of commercially available fluorinated surface modifiers F-552 and F-554 in CEL 2021P was also evaluated. 0.1 g of each polymer, F-552, or F-554 was blended with 9.9 g of CEL 2021P and the resultant mixture was stirred while heating at 70° C. in a screw tube for 3 hours to evaluate the solubility thereof. The obtained results are shown in Table 11.
[Evaluation Criteria]
A . . . a state of complete dissolution
C . . . a state of dissolution with cloudiness
B . . . a state with the undissolved remaining

TABLE 11

| | | Solubility in CEL 2021P |
|---|---|---|
| Application Example 55 | Highly branched polymer 8 | B |
| Application Example 56 | Highly branched polymer 13 | B |
| Application Example 57 | Highly branched polymer 15 | C |
| Application Example 58 | Highly branched polymer 16 | C |
| Application Example 59 | Highly branched polymer 17 | A |
| Application Example 60 | Highly branched polymer 18 | A |
| Application Example 61 | Highly branched polymer 34 | A |
| Application Example 62 | Highly branched polymer 35 | A |
| Application Example 63 | Linear polymer 1 | B |
| Application Example 64 | Linear polymer 2 | B |
| Application Example 65 | Linear polymer 3 | B |
| Application Example 66 | F-552 | B |
| Application Example 67 | F-554 | B |

As shown in Table 11, the highly branched polymers 17, 18, 34, and 35 (Application Examples 59 to 62) exhibited advantageous solubilities in CEL 2021P. On the other hand, none of the linear polymers 1 to 3 (Application Examples 63 to 65) was dissolved in CEL 2021P. The commercially available fluorinated surface modifiers (Application Examples 66 and 67) were not dissolved either.

Example 40

<Surface Modification of Photocured Epoxy Resin Using Highly Branched Polymers 15 to 18, 34, and 35>

With CEL 2021P as an epoxy resin, each of the highly branched polymers 15 to 18, 34, and 35 in a blending amount shown in Table 12 was blended so that the total mass became 10.0 g and the resultant mixture was stirred while heating at 70° C. for 3 hours to dissolve each highly branched polymer. Then, the resultant solution was cooled down to room temperature (about 25° C.), and thereto, 0.6 g of CP-77 that is a cation-based polymerization initiator was added and the resultant mixture was stirred at room temperature (about 25° C.) for 1 hour to dissolve CP-77. The resultant solution was injected onto a glass substrate using a silicone resin having a thickness of 1 mm as a spacer and the resultant coating was exposed to light using a UV irradiation apparatus at an exposure dose of 16 mW/cm$^2$ for 10 minutes to prepare a photocured epoxy resin having a thickness of 1 mm. As a comparative example, a photocured epoxy resin in which no highly branched polymer was blended was prepared in the same manner.

With respect to each of the obtained photocured epoxy resins, the total light transmittance and the haze measured by a haze meter and the contact angle relative to water were measured. The results thereof are shown in Table 12.

TABLE 12

| | Highly branched polymer | Blending amount of highly branched polymer relative to CEL 2021P [wt %] | Total light transmittance [%] | Haze | Contact angle relative to water [degree] |
|---|---|---|---|---|---|
| Application Example 68 | 15 | 1 | 85.8 | 56.8 | 97.0 |
| Application Example 69 | 16 | 1 | 87.7 | 69.2 | 94.7 |
| Application Example 70 | 17 | 1 | 86.9 | 24.1 | 100.7 |
| Application Example 71 | 18 | 1 | 85.7 | 20.2 | 101.2 |
| Application Example 72 | 34 | 1 | 85.5 | 23.6 | 104.4 |
| Application Example 73 | 35 | 1 | 89.4 | 7.4 | 99.1 |
| Application Example 74 | 18 | 0.5 | 89.7 | 13.6 | 94.6 |
| Application Example 75 | 18 | 0.1 | 90.5 | 12.3 | 87.7 |
| Application Example 76 | — | — | 87.6 | 17.5 | 63.0 |

As shown in Table 12, each of the photocured epoxy resins (Application Examples 70 to 75) in which the highly branched polymer 17, 18, 34, or 35 was blended with CEL 2021P exhibited a high total light transmittance and a low haze, as with the photocured epoxy resin (Application Example 76) in which no highly branched polymer was blended.

While the photocured resin (Application Example 76) of CEL 2021P alone in which no highly branched polymer was blended exhibited a contact angle relative to water of 63.0 degrees, each of the photocured epoxy resins (Application Examples 68 to 75) in which a highly branched polymer was blended exhibited a high contact angle such as a contact angle relative to water of 87.7 to 104.4 degrees. From this result, it became apparent that by blending a highly branched polymer, a water-repellent property was imparted.

Example 41

<Surface Modification of Thermoplastic Polyurethane Elastomer Using Highly Branched Polymer 8, 23>

P22S as a thermoplastic polyurethane elastomer, the highly branched polymer 8 or 23 as a highly branched polymer, and THF as an organic solvent were blended each in a blending amount described in Table 13, and the resultant mixture was filtered with a filter to prepare each thermoplastic resin composition. The composition was cast on a glass substrate and the resultant coating was dried at 20° C. for 24 hours to prepare the cast films of Application Examples 77 to 82. As comparative examples, there were prepared the cast films (Application Examples 83 to 85) in which, instead of a highly branched polymer, a commercially available fluorinated surface modifier F-552 was blended and the cast film (Application Example 86) in which no highly branched polymer was blended.

The film thickness measured by a prism coupler, the total light transmittance and the haze measured by a haze meter, and the contact angle relative to water were measured. The results thereof are shown in Table 14.

TABLE 13

| | | Blending amount | | | Blending amount of highly branched polymer based on mass of whole resin [wt %] |
|---|---|---|---|---|---|
| | | P22S [g] | Highly branched polymer/surface modifier [g] | THF [g] | Total resin concentration* [wt %] | |
| Application Example 77 | Highly branched polymer 8 | 0.500 | 0.005 | 19.5 | 2.5 | 1.0 |
| Application Example 78 | Highly branched polymer 8 | 1.000 | 0.005 | 39.0 | 2.5 | 0.5 |
| Application Example 79 | Highly branched polymer 8 | 1.000 | 0.001 | 39.0 | 2.5 | 0.1 |
| Application Example 80 | Highly branched polymer 23 | 0.500 | 0.005 | 19.5 | 2.5 | 1.0 |
| Application Example 81 | Highly branched polymer 23 | 1.000 | 0.005 | 39.0 | 2.5 | 0.5 |
| Application Example 82 | Highly branched polymer 23 | 1.000 | 0.001 | 39.0 | 2.5 | 0.1 |
| Application Example 83 | F-552 | 0.500 | 0.005 | 19.5 | 2.5 | 1.0 |
| Application Example 84 | F-552 | 1.000 | 0.005 | 39.0 | 2.5 | 0.5 |
| Application Example 85 | F-552 | 1.000 | 0.001 | 39.0 | 2.5 | 0.1 |
| Application Example 86 | — | 0.500 | — | 19.5 | 2.5 | 0.0 |

*expresses the blending amount (% by mass) of the whole resin (P22S and highly branched polymer or surface modifier), based on the total mass of the resin composition.

TABLE 14

| | | Film thickness [μm] | Total light transmittance [%] | Haze | Contact angle relative to water [degree] |
|---|---|---|---|---|---|
| Application Example 77 | Highly branched polymer 8 | 5.11 | 91.5 | 14.90 | 106.1 |
| Application Example 78 | Highly branched polymer 8 | 7.11 | 91.3 | 2.15 | 105.4 |
| Application Example 79 | Highly branched polymer 8 | 11.14 | 91.1 | 0.50 | 105.3 |
| Application Example 80 | Highly branched polymer 23 | 6.39 | 91.2 | 1.30 | 106.9 |
| Application Example 81 | Highly branched polymer 23 | 7.47 | 91.4 | 0.70 | 106.1 |
| Application Example 82 | Highly branched polymer 23 | 8.87 | 91.4 | 0.40 | 105.0 |
| Application Example 83 | F-552 | 8.97 | 91.4 | 5.70 | 77.5 |
| Application Example 84 | F-552 | 6.36 | 91.4 | 1.30 | 77.0 |
| Application Example 85 | F-552 | 9.98 | 91.1 | 0.70 | 79.1 |
| Application Example 86 | — | 4.65 | 91.1 | 0.60 | 88.9 |

As shown in Table 14, each of the cast films (Application Examples 80 to 82) in which the highly branched polymer 23 was blended exhibited a high total light transmittance and a low haze, as with the cast film (Application Example 86) in which no highly branched polymer was blended.

While the cast film (Application Example 86) of P22S alone in which no highly branched polymer was blended exhibited a contact angle relative to water of 88.9 degrees, each of the cast films (Application Examples 77 to 82) in which a highly branched polymer was blended exhibited a high contact angle such as a contact angle relative to water of 105.0 to 106.9 degrees. From this result, it became apparent that by blending a highly branched polymer, a water-repellent property was imparted.

Further, in comparison with the cast films (Application Examples 83 to 85) in which, instead of a highly branched polymer, F-552 was blended, each of the cast films (Application Examples 77 to 82) in which a highly branched polymer was blended exhibited a high contact angle.

Example 42

<Surface Modification of Polyurethane Resin by Polyurethane Solution for Coating Using Highly Branched Polymers 8 and 23>

NIPPOLAN N5257 as a polyurethane solution for coating, the highly branched polymer 8 or 23 as a highly branched polymer, and MEK as a diluting solvent were blended each in a blending amount described in Table 15 to prepare a polyurethane resin composition. The composition was spread on a glass substrate using a doctor blade and the resultant coating was dried at 80° C. for 1 hour to prepare the polyurethane coating films of Application Examples 87 to 92. As comparative examples, there were prepared the polyurethane coating films (Application Examples 93 to 95) in which, instead of a highly branched polymer, a commercially available fluorinated surface modifier F-552 was blended and the polyurethane coating film (Application Example 96) in which no highly branched polymer was blended.

The film thickness by ellipsometry, the total light transmittance and the haze by a haze meter, and the contact angle relative to water were measured. The results thereof are shown in Table 16.

TABLE 15

| | | N5257 [g] | Blending amount Highly branched polymer/surface modifier [g] | MEK [g] | Blending amount of highly branched polymer based on mass of whole resin [wt %] |
|---|---|---|---|---|---|
| Application Example 87 | Highly branched polymer 8 | 5.000 | 0.030 | 5.0 | 1.0 |
| Application Example 88 | Highly branched polymer 8 | 10.000 | 0.015 | 5.0 | 0.5 |
| Application Example 89 | Highly branched polymer 8 | 10.000 | 0.003 | 5.0 | 0.1 |
| Application Example 90 | Highly branched polymer 23 | 5.000 | 0.030 | 5.0 | 1.0 |
| Application Example 91 | Highly branched polymer 23 | 10.000 | 0.015 | 5.0 | 0.5 |
| Application Example 92 | Highly branched polymer 23 | 10.000 | 0.003 | 5.0 | 0.1 |
| Application Example 93 | F-552 | 5.000 | 0.030 | 5.0 | 1.0 |
| Application Example 94 | F-552 | 10.000 | 0.015 | 5.0 | 0.5 |
| Application Example 95 | F-552 | 10.000 | 0.003 | 5.0 | 0.1 |
| Application Example 96 | — | 5.000 | — | 5.0 | 0.0 |

* expresses the blending amount (% by mass) of the whole resin (N5257 and highly branched polymer or surface modifier), based on the total mass of the resin composition.

TABLE 16

| | | Film thickness [μm] | Total light transmittance [%] | Haze | Contact angle relative to water [degree] |
|---|---|---|---|---|---|
| Application Example 87 | Highly branched polymer 8 | 443.6 | 91.6 | 0.2 | 104.8 |
| Application Example 88 | Highly branched polymer 8 | 433.2 | 91.6 | 0.3 | 102.9 |
| Application Example 89 | Highly branched polymer 8 | 417.5 | 91.4 | 0.2 | 83.5 |
| Application Example 90 | Highly branched polymer 23 | 386.7 | 91.7 | 0.2 | 102.1 |
| Application Example 91 | Highly branched polymer 23 | 310.1 | 91.6 | 0.3 | 103.0 |

TABLE 16-continued

|  |  | Film thickness [μm] | Total light transmittance [%] | Haze | Contact angle relative to water [degree] |
|---|---|---|---|---|---|
| Application Example 92 | Highly branched polymer 23 | 310.2 | 91.4 | 0.3 | 78.4 |
| Application Example 93 | F-552 | 336.3 | 91.6 | 0.2 | 95.4 |
| Application Example 94 | F-552 | 385.1 | 91.6 | 0.2 | 97.3 |
| Application Example 95 | F-552 | 311.3 | 91.4 | 0.2 | 82.4 |
| Application Example 96 | — | 353.0 | 91.1 | 0.2 | 69.8 |

As shown in Table 16, each of the coating films (Application Examples 87 to 92) in which the highly branched polymer 8 or 23 was blended exhibited a high total light transmittance and a low haze, as with the coating film (Application Example 96) in which no highly branched polymer was blended.

While the coating film (Application Example 96) in which no highly branched polymer was blended exhibited a contact angle relative to water of 69.8 degrees, each of the coating films (Application Examples 87 to 92) in which a highly branched polymer was blended exhibited a high contact angle such as a contact angle relative to water of 78.4 to 104.8 degrees. From this result, it became apparent that by blending a highly branched polymer, a water-repellent property was imparted.

Further, also in comparison with the coating films (Application Examples 93 to 95) in which, instead of a highly branched polymer, F-552 was blended, each of the coating films (Application Examples 87 to 92) in which a highly branched polymer was blended exhibited a high contact angle.

Example 43

<Test of Photocure Nano Imprint in which Highly Branched Polymer 8 was Blended>

9.9 g of A-DCP as a multifunctional acrylic monomer, 0.1 g of the highly branched polymer 8 as an internal mold release agent, 0.1 g of Irg. 907 as a photopolymerization initiator, and 20.0 g of PGMEA as a solvent were blended to prepare a varnish of a photopolymerizable resin composition. A quartz substrate was spin-coated (500 rpm, 30 seconds) with the varnish and the resultant coating was dried on a hot plate of 60° C. for 1 minute to form a film (thickness: about 1 μm). On the film on the quartz substrate, a silicon mold having a size of about 2 cm×2 cm was placed and the substrate and the mold were set on a stage of a nano-imprinting apparatus. Then, the substrate and the mold were subjected to pressurization at 25° C. under 1,000 N for 90 seconds and subsequently exposure to light at 25° C. under a pressurized pressure of 1,000 N with 45 mW for 30 seconds to form a fine pattern by photo nano imprint.

When the obtained fine pattern was observed under an optical microscope, as shown in FIG. 68, the pattern of a mold shown in FIG. 74 was clearly transferred.

Comparative Example 6

<Test of Photocure Nano Imprint in which No Highly Branched Polymer 8 was Blended>

10.0 g of A-DCP as a multifunctional acrylic monomer, 0.1 g of Irg. 907 as a photopolymerization initiator, and 20.0 g of PGMEA as a solvent were blended to prepare a varnish of a photopolymerizable resin composition containing no highly branched polymer 8. Using the varnish, under the same condition as in Example 43, a fine pattern by photo nano imprint was formed on a quartz substrate.

When the obtained fine pattern was observed under an optical microscope, as shown in FIG. 69, the pattern of a mold shown in FIG. 74 was not transferred at all.

Example 44

<Test of Thermal Nano Imprint in which Highly Branched Polymer 8 was Blended>

0.99 g of PMMA as a thermoplastic resin, 0.01 g of the highly branched polymer 8 as an internal mold release agent, and 9.0 g of o-dichlorobenzene as a solvent were blended to prepare a varnish of a thermoplastic resin composition. A silicon wafer was spin-coated (2,000 rpm, 60 seconds) with the varnish and the resultant coating was dried on a hot plate of 150° C. for 1 minute to form a film (thickness: about 1 μm). On the film on the silicon wafer, a silicon mold having a size of about 2 cm×2 cm was placed and the wafer and the mold were set on a stage of a nano-imprinting apparatus. Then, the wafer and the mold were subjected to pressurization at 25° C. under 1,500 N for 300 seconds, and subsequently heating at 150° C. under a pressurized pressure of 1,500 N for 300 seconds to form a fine pattern by thermal nano imprint.

When the obtained fine pattern was observed under an optical microscope, as shown in FIGS. 70 and 71, the pattern of a mold shown in FIG. 74 was clearly transferred.

Comparative Example 7

<Test of Thermal Nano Imprint in which No Highly Branched Polymer 8 was Blended>

1.0 g of PMMA as a thermoplastic resin and 9.0 g of o-dichlorobenzene as a solvent were blended to prepare a varnish of a thermoplastic resin composition containing no highly branched polymer 8. Using the varnish, under the same condition as in Example 44, a fine pattern by thermal nano imprint was formed on a silicon wafer.

When the obtained fine pattern was observed under an optical microscope, as shown in FIGS. 72 and 73, as seen on the left side of each photo, the pattern was fragmented and the pattern of a mold shown in FIG. 74 was not clearly transferred.

Example 51

<Surface Modification of Thermoset Epoxy Resin Using Highly Branched Polymer 35 by Acid Anhydride>

4.95 g of CEL 2021P as an epoxy resin, 4.95 g of MCHDC as an acid anhydride, and 0.1 g of the highly branched polymer 35 were blended and the resultant mixture was stirred while heating at 70° C. for 3 hours to dissolve the highly branched polymer. Then, the resultant solution was cooled down to room temperature (about 25° C.) and was then dropped onto a glass substrate. The glass substrate was heated on a hot plate of 100° C. for 1 hour, and then the temperature was raised to 150° C., followed by heating the glass substrate at 150° C. for 3 hours to prepare a thermoset epoxy resin. As a comparative example, a thermoset epoxy resin in which no highly branched polymer was blended was prepared in the same manner.

With respect to the obtained thermoset epoxy resin, the total light transmittance and the haze measured by a haze meter and the contact angle relative to water were measured. The obtained results are shown in Table 17.

TABLE 17

|  | Blending amount of highly branched polymer relative to CEL 2021P/MCHDC | Total light transmittance [%] | Haze | Contact angle relative to water [degree] |
|---|---|---|---|---|
| Application Example 97 | 1 | 85.7 | 0.37 | 104.0 |
| Application Example 98 | 0 | 85.5 | 0.34 | 76.5 |

As shown in Table 17, the thermoset epoxy resin (Application Example 97) in which the highly branched polymer 35 was blended with CEL 2021P and MCHDC exhibited a high total light transmittance and a low haze, as with the thermoset epoxy resin (Application Example 98) in which no highly branched polymer was blended.

While the thermoset resin (Application Example 98) of only CEL 2021P and MCHDC in which no highly branched polymer was blended exhibited a contact angle relative to water of 76.5 degrees, the thermoset epoxy resin (Application Example 97) in which a highly branched polymer was blended exhibited a high contact angle such as a contact angle relative to water of 104.0 degrees. From this result, it became apparent that by blending a highly branched polymer, a water-repellent property was imparted.

Example 52

<Solubility in Silicone Resin>

The solubility of each of the highly branched polymers 8, 36, and 37 obtained in Examples 8, 48, and 49 in a silicone resin KR-400 was evaluated. The solubility of a commercially available fluorinated surface modifier F-552 in KR-400 was also evaluated in the same manner. 0.1 g of each polymer or F-552 was blended with 9.9 g of KR-400 and the resultant mixture was stirred in a screw tube at room temperature (about 25° C.) for 3 hours to evaluate the solubility thereof. The obtained results are shown in Table 18.

[Evaluation Criteria]
A . . . a state of complete dissolution
C . . . a state of dissolution with cloudiness
B . . . a state with the undissolved remaining

TABLE 18

|  | Highly branched polymer | Solubility in KR-400 |
|---|---|---|
| Application Example 99 | Highly branched polymer 8 | B |
| Application Example 100 | Highly branched polymer 36 | A |
| Application Example 101 | Highly branched polymer 37 | A |
| Application Example 102 | F-552 | A |

As shown in table 18, the highly branched polymers 36 and 37 (Application Examples 100 and 101) exhibited advantageous solubilities in KR-400.

Example 53

<Surface Modification of Silicone Resin Using Highly Branched Polymer 36 or 37>

0.1 g of the highly branched polymer 36 or 37 was blended with 9.9 g of a silicone resin KR-400 and the resultant mixture was stirred at room temperature (about 25° C.) for 3 hours to dissolve the highly branched polymer. A glass substrate was spin-coated (slope 5 seconds, followed by 500 rpm, 30 seconds, and slope 5 seconds) with the resultant solution. The resultant coating film was left stand still at room temperature (about 25° C.) for 1 hour to cure the coating film and to prepare a silicone resin film. As comparative examples, a silicone resin film in which 0.1 g of F-552 instead of a highly branched polymer was blended and a silicone resin film in which no highly branched polymer was blended were prepared in the same manner.

With respect to the obtained silicone resin films, the contact angle relative to water and the contact angle relative to hexadecane were measured. The obtained results are shown in Table 19.

TABLE 19

|  | Highly branched polymer | Contact angle relative to water [degree] | Contact angle relative to hexadecane [degree] |
|---|---|---|---|
| Application Example 103 | Highly branched polymer 36 | 94.5 | 55.0 |
| Application Example 104 | Highly branched polymer 37 | 96.5 | 56.9 |
| Application Example 105 | F-552 | 95.3 | 13.8 |

TABLE 19-continued

| Highly branched polymer | Contact angle relative to water [degree] | Contact angle relative to hexadecane [degree] |
|---|---|---|
| Application Example 106 | — | 78.5 | 40.3 |

As shown in Table 19, while the silicone resin (Application Example 106) in which no highly branched polymer was blended exhibited a contact angle relative to water of 78.5 degrees, the silicone resins (Application Examples 103 and 104) in which a highly branched polymer was blended exhibited a high contact angle such as a contact angle relative to water of 94.5 to 96.5 degrees. From this result, it became apparent that by blending a highly branched polymer, a water-repellent property was imparted.

While the silicone resin (Application Example 106) in which no highly branched polymer was blended exhibited a contact angle relative to hexadecane of 40.3 degrees, the silicone resins (Application Examples 103 and 104) in which a highly branched polymer was blended exhibited a high contact angle such as a contact angle relative to hexadecane of 55.0 to 56.9 degrees. From this result, it became apparent that by blending a highly branched polymer, an oil repelling property was also imparted. Further, the silicone resin (Application Example 105) in which F-552 instead of a highly branched polymer was blended exhibited a contact angle relative to hexadecane that was significantly lowered from the contact angle relative to hexadecane that the silicone resin (Application Example 106) in which no highly branched polymer was blended exhibited, so that it was found that by F-552, an oil repelling property was not imparted.

Example 59

<Surface Modification of Epoxy Resin EHPE3150>

2.5 g of an epoxy resin EHPE3150, 25 mg of the highly branched polymer 18, 34, or 35, 0.1 g of SP-170, and 2.5 g of MIBK were blended to prepare a varnish of an epoxy resin composition. A silicon wafer was spin-coated (slope 5 seconds, followed by 500 rpm, 30 seconds, and slope 5 seconds) with the varnish. The resultant coating film was heated on a hot plate of 90° C. for 1 minute. The obtained thin film was exposed to light using a UV irradiation apparatus at an exposure dose of 16 mW/cm² for 10 minutes and then was further heated on a hot plate of 120° C. for 5 minutes to prepare an epoxy resin photocured film. As a comparative example, an epoxy resin photocured film in which no highly branched polymer was blended was prepared in the same manner.

With respect to each of the obtained photocured films, the contact angle relative to water was measured. The obtained result is shown in Table 20.

TABLE 20

| | Highly branched polymer | Contact angle relative to water [degree] |
|---|---|---|
| Application Example 107 | Highly branched polymer 18 | 100.3 |
| Application Example 108 | Highly branched polymer 34 | 100.6 |
| Application Example 109 | Highly branched polymer 35 | 97.0 |
| Application Example 110 | — | 62.1 |

As shown in Table 20, while the epoxy resin photocured film (Application Example 110) in which no highly branched polymer was blended exhibited a contact angle relative to water of 62.1 degrees, the epoxy resin photocured films (Application Examples 107 to 109) in which a highly branched polymer was blended exhibited a high contact angle such as a contact angle relative to water of 97.0 to 100.6 degrees. From this result, it became apparent that by blending a highly branched polymer, a water-repellent property was imparted.

Example 60

<Surface Modification of Epoxy Resin 157S70>

An epoxy resin 157S70, the highly branched polymer 18, 34, or 35, ESACURE 1720, and cyclopentanone each in a blending amount described in Table 21 were blended and the resultant mixture was filtered with a filter to prepare a varnish of an epoxy resin composition. A silicon wafer was spin-coated (slope 5 seconds, followed by 500 rpm, 30 seconds, and slope 5 seconds) with the varnish. The resultant coating film was heated on a hot plate of 90° C. for 1 minute. The obtained thin film was exposed to light using a UV irradiation apparatus at an exposure dose of 16 mW/cm² for 10 minutes and then was further heated on a hot plate of 120° C. for 5 minutes to prepare an epoxy resin photocured film. As a comparative example, an epoxy resin photocured film in which no highly branched polymer was blended was prepared in the same manner.

With respect to each of the obtained photocured films, the contact angle relative to water was measured. The obtained result is shown in Table 21.

TABLE 21

| | Highly branched polymer | Highly branched polymer [g] | 157S70 [g] | ESACURE 1720 [g] | Cyclopentanone [g] | Contact angle relative to water [degree] |
|---|---|---|---|---|---|---|
| Application Example 111 | 18 | 0.025 | 2.5 | 0.050 | 7.5 | 99.1 |
| Application Example 112 | 34 | 0.025 | 2.5 | 0.050 | 7.5 | 96.7 |
| Application Example 113 | 35 | 0.025 | 2.5 | 0.050 | 7.5 | 96.2 |

TABLE 21-continued

| | Highly branched polymer | Highly branched polymer [g] | 157S70 [g] | ESACURE 1720 [g] | Cyclopentanone [g] | Contact angle relative to water [degree] |
|---|---|---|---|---|---|---|
| Application Example 114 | 18 | 0.030 | 3.0 | 0.060 | 7.0 | 101.6 |
| Application Example 115 | 34 | 0.030 | 3.0 | 0.060 | 7.0 | 106.2 |
| Application Example 116 | 35 | 0.030 | 3.0 | 0.060 | 7.0 | 103.1 |
| Application Example 117 | 18 | 0.040 | 4.0 | 0.080 | 6.0 | 104.4 |
| Application Example 118 | 34 | 0.040 | 4.0 | 0.080 | 6.0 | 107.0 |
| Application Example 119 | 35 | 0.040 | 4.0 | 0.080 | 6.0 | 102.8 |
| Application Example 120 | — | — | 2.5 | 0.050 | 7.5 | 56.4 |
| Application Example 121 | — | — | 3.0 | 0.060 | 7.0 | 71.2 |
| Application Example 122 | — | — | 4.0 | 0.080 | 6.0 | 73.8 |

As shown in Table 21, while the epoxy resin photocured films (Application Examples 120 to 122) in which no highly branched polymer was blended exhibited a contact angle relative to water of 56.4 to 73.8 degrees, the epoxy resin photocured films (Application Examples 111 to 119) in which a highly branched polymer was blended exhibited a high contact angle such as a contact angle relative to water of 96.2 to 107.0 degrees. From this result, it became apparent that by blending a highly branched polymer, a water-repellent property was imparted.

Example 61

<Surface Modification of Polyimide Resin>

5 mg of each of the highly branched polymers 39 to 43, 4.1 g of a PAA varnish, 6.5 g of NMP, and 1.6 g of BA were blended to prepare a varnish of a poly(amic acid) composition. A glass substrate was spin-coated (slope 5 seconds, followed by 500 rpm, 30 seconds, and slope 5 seconds) with the varnish. The resultant coating film was heated on a hot plate of 210° C. for 30 minutes to prepare a polyimide resin film. As a comparative example, a polyimide resin film in which no highly branched polymer was blended was prepared in the same manner.

With respect to each of the obtained polyimide resin films, the contact angle relative to water was measured. The obtained results are shown in Table 22.

As shown in Table 22, while the polyimide resin film (Application Example 128) in which no highly branched polymer was blended exhibited a contact angle relative to water of 53.2 degrees, the polyimide resin films (Application Examples 123 to 127) in which a highly branched polymer was blended exhibited a high contact angle such as a contact angle relative to water of 92.5 to 102.2 degrees. From this result, it became apparent that by blending a highly branched polymer, a water-repellent property was imparted.

Example 62

<Surface Modification of Polyimide Resin>

5 mg of each of the highly branched polymers 39 to 43, 0.50 g of SPI, 7.6 g of NMP, and 1.9 of BA were blended to prepare a varnish of a soluble polyimide resin composition. A glass substrate was spin-coated (slope 5 seconds, followed by 500 rpm, 30 seconds, and slope 5 seconds) with the varnish. The resultant coating film was heated on a hot plate of 210° C. for 30 minutes to prepare a polyimide resin film. As a comparative example, a polyimide resin film in which no highly branched polymer was blended was prepared in the same manner.

With respect to each of the obtained polyimide resin films, the contact angle relative to water was measured. The obtained results are shown in Table 23.

TABLE 22

| Application Example | Highly branched polymer | Contact angle relative to water [degree] |
|---|---|---|
| Application Example 123 | Highly branched polymer 39 | 101.4 |
| Application Example 124 | Highly branched polymer 40 | 97.0 |
| Application Example 125 | Highly branched polymer 41 | 99.5 |
| Application Example 126 | Highly branched polymer 42 | 102.2 |
| Application Example 127 | Highly branched polymer 43 | 92.5 |
| Application Example 128 | — | 53.2 |

TABLE 23

| Application Example | Highly branched polymer | Contact angle relative to water [degree] |
|---|---|---|
| Application Example 129 | Highly branched polymer 39 | 100.7 |
| Application Example 130 | Highly branched polymer 40 | 99.1 |
| Application Example 131 | Highly branched polymer 41 | 98.5 |
| Application Example 132 | Highly branched polymer 42 | 99.0 |
| Application Example 133 | Highly branched polymer 43 | 97.4 |
| Application Example 134 | — | 78.2 |

As shown in Table 23, while the polyimide resin film (Application Example 134) in which no highly branched polymer was blended exhibited a contact angle relative to water of 78.2 degrees, the polyimide resin films (Application Examples 129 to 133) in which a highly branched polymer was blended exhibited a high contact angle such as a contact angle relative to water of 97.4 to 100.7 degrees. From this result, it became apparent that by blending a highly branched polymer, a water-repellent property was imparted.

The invention claimed is:

1. A photopolymerizable composition comprising:
   a fluorine-containing highly branched polymer (a) obtained by polymerizing a monomer A having two or more radical polymerizable double bonds in the molecule thereof with a monomer B having a fluoroalkyl group and at least one radical polymerizable double bond in the molecule thereof in the presence of a polymerization initiator C in a content of 15% by mol or more and 200% by mol or less, based on a total molar amount of the monomer A and the monomer B, wherein
   the monomer A is a divinyl compound or a di(meth)acrylate compound, and
   the monomer B is a compound of Formula [1]:

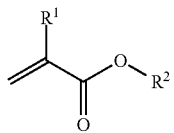

[1]

wherein:
   $R^1$ is a hydrogen atom or a methyl group; and
   $R^2$ is a $C_{2-12}$ fluoroalkyl group that is optionally substituted with a hydroxy group;
   a photopolymerizable compound (b); and
   a photopolymerization initiator (c).

2. The photopolymerizable composition according to claim 1, wherein the photopolymerizable compound (b) is a multifunctional (meth)acrylate compound.

3. The photopolymerizable composition according to claim 2, wherein the photopolymerizable compound (b) is tricyclodecanedimethanol di(meth)acrylate.

4. The photopolymerizable composition according to claim 1, wherein the content of the fluorine-containing highly branched polymer (a) is 0.01% by mass to 20% by mass, based on the total mass of the photopolymerizable compound (b).

5. The photopolymerizable composition according to claim 1, wherein
   the monomer A and the monomer B are polymerized with a monomer E having at least one radical polymerizable double bond and no fluoroalkyl group in the molecule thereof in the presence of the polymerization initiator C.

6. The photopolymerizable composition according to claim 1, wherein the monomer A does not contain a silicon atom.

7. A resin-molded article produced by photopolymerizing the photopolymerizable composition according to claim 1.

8. The resin-molded article according to claim 7, wherein
   the monomer A and the monomer B are polymerized with a monomer E having at least one radical polymerizable double bond and no fluoroalkyl group in the molecule thereof in the presence of the polymerization initiator C.

9. A resin composition comprising
   a fluorine-containing highly branched polymer (a) obtained by polymerizing a monomer A having two or more radical polymerizable double bonds in the molecule thereof with a monomer B having a fluoroalkyl group and at least one radical polymerizable double bond in the molecule thereof in the presence of a polymerization initiator C in a content of 15% by mol or more and 200% by mol or less, based on a total molar amount of the monomer A and the monomer B, wherein
   the monomer A is a divinyl compound or a di(meth)acrylate compound, and
   the monomer B is a compound of Formula [1]:

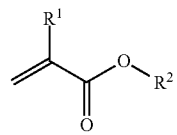

[1]

wherein:
   $R^1$ is a hydrogen atom or a methyl group; and
   $R^2$ is a $C_{2-12}$ fluoroalkyl group that is optionally substituted with a hydroxy group; and
   a thermoplastic resin or thermosetting resin (d).

10. The resin composition according to claim 9, wherein the thermoplastic resin (d) is a poly(methyl methacrylate) resin.

11. The resin composition according to claim 9, wherein the thermoplastic resin (d) is a poly(lactic acid) resin.

12. The resin composition according to claim 9, wherein the content of the fluorine-containing highly branched polymer (a) is 0.01% by mass to 20% by mass, based on the total mass of the thermoplastic resin or thermosetting resin (d).

13. The resin composition according to claim 9, wherein
   the monomer A and the monomer B are polymerized with a monomer E having at least one radical polymerizable double bond and no fluoroalkyl group in the molecule thereof in the presence of the polymerization initiator C.

14. A resin-molded article produced from the resin composition according to claim 9.

15. The resin-molded article according to claim 14, wherein
   the monomer A and the monomer B are polymerized with a monomer E having at least one radical polymerizable double bond and no fluoroalkyl group in the molecule thereof in the presence of the polymerization initiator C.

* * * * *